US012338681B1

(12) United States Patent
Bickel et al.

(10) Patent No.: US 12,338,681 B1
(45) Date of Patent: Jun. 24, 2025

(54) RETRACTABLE FLEXIBLE GATE

(71) Applicant: Regalo International, LLC, Burnsville, MN (US)

(72) Inventors: Shannon R. Bickel, Lakeville, MN (US); Michael P. Lane, Chaska, MN (US)

(73) Assignee: Regalo International, LLC, Burnsville, MN (US)

( * ) Notice: Subject to any disclaimer, the term of this patent is extended or adjusted under 35 U.S.C. 154(b) by 245 days.

(21) Appl. No.: 17/882,503

(22) Filed: Aug. 5, 2022

Related U.S. Application Data

(60) Provisional application No. 63/393,822, filed on Jul. 29, 2022.

(51) Int. Cl.
*E06B 9/00* (2006.01)
*E06B 9/08* (2006.01)

(52) U.S. Cl.
CPC .......... *E06B 9/08* (2013.01); *E06B 2009/002* (2013.01)

(58) Field of Classification Search
CPC ................. E06B 2009/002; E06B 9/08; E06B 2009/543; E06B 11/026; E06B 9/13; E06B 9/0692; E06B 9/60; E01F 13/028
See application file for complete search history.

(56) References Cited

U.S. PATENT DOCUMENTS 6,375,165 B1 * 4/2002 Sherratt .................... E06B 9/08 256/1
7,219,709 B1 * 5/2007 Williams .............. E01F 13/028 160/24
9,598,896 B1 * 3/2017 Pichik ........................ E06B 9/13
11,066,871 B2 * 7/2021 Wang ......................... E06B 9/13
2002/0179257 A1 * 12/2002 Britto ......................... E06B 9/08 160/294
2008/0121352 A1 * 5/2008 Cheng ........................ E06B 9/08 160/238
2008/0121354 A1 * 5/2008 Cheng ................... E01F 13/028 160/290.1
2015/0041075 A1 * 2/2015 Henderson ................ E06B 9/08 242/382.5
2015/0376942 A1 * 12/2015 Henderson ................ E06B 9/08 160/192
2017/0284154 A1 * 10/2017 Reiner ....................... E06B 9/78
2023/0151643 A1 * 5/2023 Huang ................ E05B 65/0014 160/304.1

FOREIGN PATENT DOCUMENTS

GB 2077334 A * 12/1981 ............... E06B 9/60
WO WO-2013129915 A1 * 9/2013 ............... E06B 9/42

* cited by examiner

*Primary Examiner* — Daniel P Cahn
*Assistant Examiner* — Jeremy C Ramsey

(57) ABSTRACT

A manually pullable out and automatically retractable flexible barrier apparatus for engagement between first and second surfaces having a base that includes a foot, a head, and a spool portion between the foot and the head that spools in and spools out the flexible barrier. A coil spring is wound about a nonrotatable support tube in the spool, is fixed to the top of the nonrotatable support tube, and is further fixed to a lower cap in the spool that rotates with the spool. An upper cap in the spool, rotating with the spool, is lockable and unlockable to a rotating control knob in the head.

15 Claims, 27 Drawing Sheets

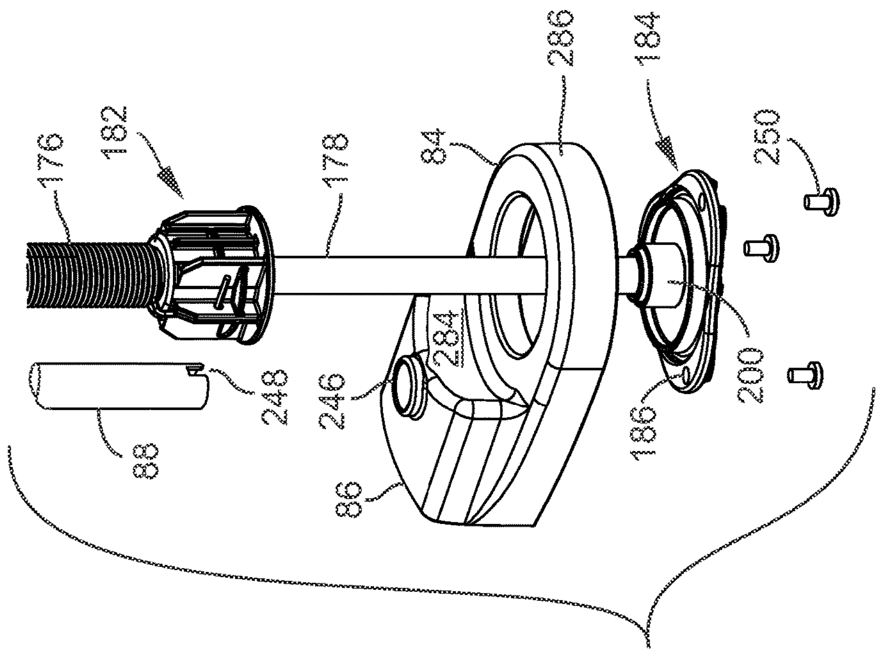
FIG. 13B
FIG. 13A
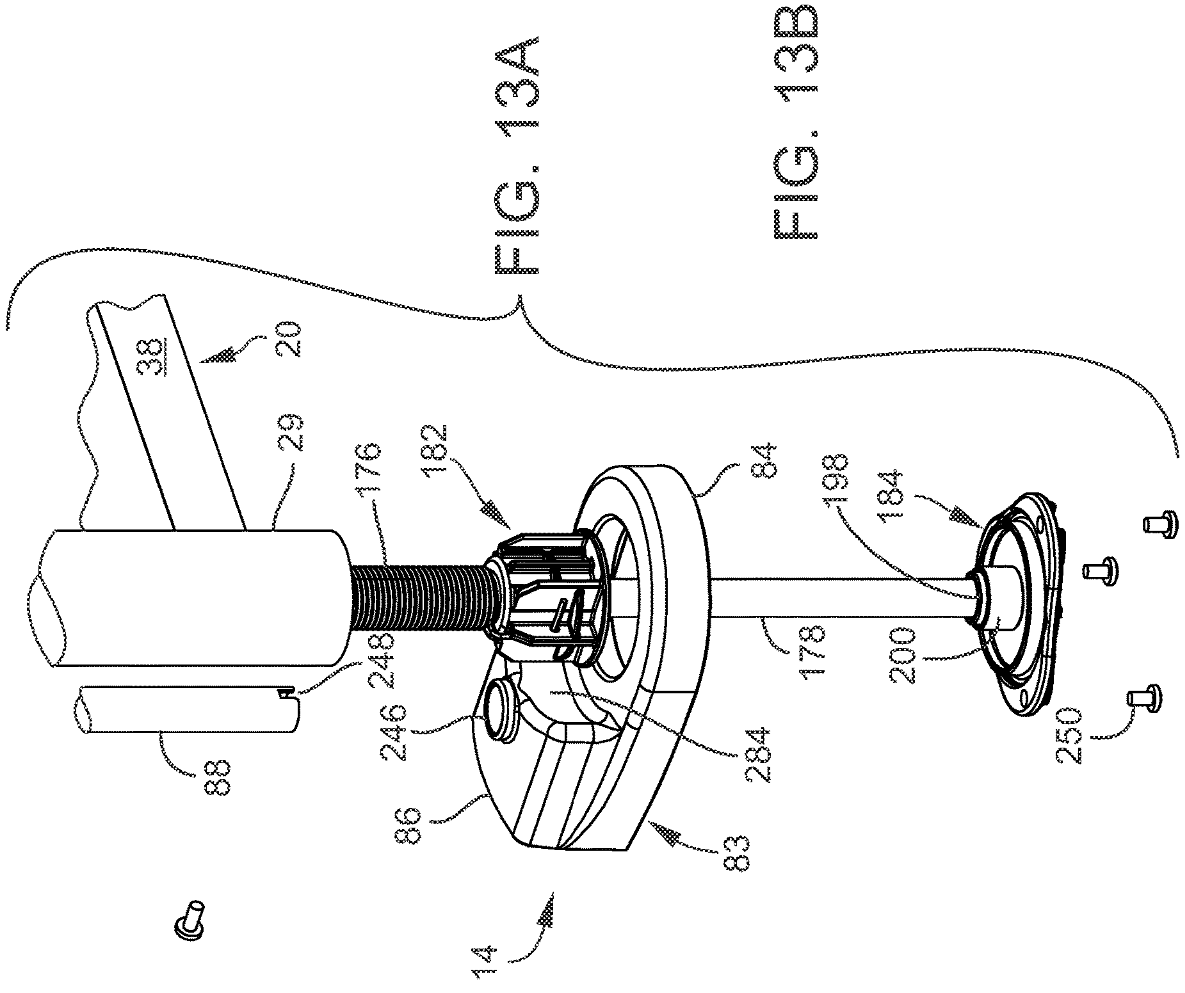

RETRACTABLE FLEXIBLE GATE

This application claims the benefit under 35 U.S.C. 119 (e) of U.S. Provisional Patent Application No. 63/393,822 filed Jul. 29, 2022, which application is hereby incorporated by reference in its entirety into this application.

FIELD OF THE INVENTION

The present invention relates to a barrier, particularly to a barrier having a flexible gate, and more specifically to a manually pull out and automatically retractable flexible barrier apparatus.

BACKGROUND OF THE INVENTION

A standard residential gate for use inside of a house has metal, plastic, or wooden parts that traverse a passageway. The metal, plastic, or wooden parts may swing into the passageway and swing out of the passageway. Whether the metal, plastic, or wooden parts have swung into or out of the passageway, the metal, plastic, or wooden parts still take up space. Space is precious in any home and such metal, plastic, or wooden parts cannot simply disappear.

SUMMARY OF THE INVENTION

A feature of the present invention is the provision in a retractable flexible gate apparatus, of a flexible barrier that effectively disappears when not in use.

Another feature of the present invention is the provision in a retractable flexible gate apparatus, of a manually pullable out and automatically retractable flexible barrier apparatus for engagement between first and second surfaces.

Another feature of the present invention is the provision in a retractable flexible gate apparatus, of a base having a foot portion, a head portion, and a spool portion, where the base is engagable to the first surface. Another feature of the present invention is the provision in a retractable flexible gate apparatus, of a flexible barrier having proximal and distal ends, where the proximal end of the flexible barrier is engaged to the spool portion and where the distal end is engagable to the second surface.

Another feature of the present invention is the provision in a retractable flexible gate apparatus, of the flexible barrier having a retracted form and an extended form, where the flexible barrier in the retracted form is rolled up about the spool portion, and where the flexible barrier in the extended form is engaged to the second surface and defines a plane.

Another feature of the present invention is the provision in a retractable flexible gate apparatus, of the spool portion having upper and lower caps, where the upper cap is rotatable with the spool portion and engages the head, and where the lower cap is rotatable with the spool portion and engages the foot portion.

Another feature of the present invention is the provision in a retractable flexible gate apparatus, of a first nonrotatable support member, where the first nonrotatable support member is in the spool portion and engages the foot and where the first nonrotatable support member includes an upper end portion and a lower end portion.

Another feature of the present invention is the provision in a retractable flexible gate apparatus, of a coil spring wound about the first nonrotatable support member and being fixedly engaged to the upper end portion of the first nonrotatable support member and fixedly engaged to the lower cap of the spool portion.

Another feature of the present invention is the provision in a retractable flexible gate apparatus, of when the flexible barrier is drawn out from the retracted form, the lower cap rotates to twist the coil spring and build up pressure in the coil spring prior to when the distal end of the flexible barrier is engaged to the second surface.

Another feature of the present invention is the provision in a retractable flexible gate apparatus, of when the flexible barrier is disengaged from the second surface, the coil spring automatically retracts the flexible barrier into the retracted form where the flexible barrier is rolled up about the spool portion.

Another feature of the present invention is the provision in a retractable flexible gate apparatus, of the upper cap being lockable to the head such that the flexible barrier is locked against being drawn out from the retracted form to the extended form.

Another feature of the present invention is the provision in a retractable flexible gate apparatus, of the upper cap being lockable to the head such that the flexible barrier is locked against being drawn in from the extended form to the retracted form.

Another feature of the present invention is the provision in a retractable flexible gate apparatus, of the spool portion including a tube, where at least a portion of the upper cap is engaged in an upper portion of the tube, where at least a portion of the lower cap is engaged in a lower portion of the tube, and where the upper and lower caps are fixedly engaged in the tube such that when the tube rotates the upper and lower caps rotate and such that when the upper and lower caps rotate the tube rotates.

Another feature of the present invention is the provision in a retractable flexible gate apparatus, of a) the head including a rotatable knob, b) the rotatable knob including first, second, third, and fourth positions, where the rotatable knob is axially slideable from the first position to the second position, where the rotatable knob is rotatable from the second position to the third position, and where the rotatable knob is axially slideable from the third position to the fourth position, c) the flexible barrier being drawable in and drawable out when the rotatable knob is in the first position, and d) the flexible barrier being locked when the rotatable knob is in the second, third, and fourth positions.

Another feature of the present invention is the provision in a retractable flexible gate apparatus, of a) the head including a rotatable knob, b) the rotatable knob including first, second, third, and fourth positions, where the rotatable knob is axially slidable from the first position to the second position, where the rotatable knob is rotatable from the second position to the third position, and where the rotatable knob is axially slideable from the third position to the fourth position, c) the rotatable knob being engaged to a first set of teeth that that slide axially with the rotatable knob, d) the upper cap including a second set of teeth, and e) the first and second sets of teeth including a disengagement state where 360 degree rotation of the second set of teeth is permitted to permit the flexible barrier to be drawn in to or out from the spool portion, where the first and second sets of teeth are in the disengagement state when the rotatable knob is in the first position.

Another feature of the present invention is the provision in a retractable flexible gate apparatus, of in the disengagement state the second set of teeth may rotate at least 720 degrees.

Another feature of the present invention is the provision in a retractable flexible gate apparatus, of in the disengagement state the second set of teeth may rotate at least 1080 degrees.

Another feature of the present invention is the provision in a retractable flexible gate apparatus, of a) the spool portion including an axially extending slot extending from a top portion of spool portion to a bottom end of the spool portion, b) the flexible barrier including a proximal end and a distal end, where the proximal end is engaged in the axially extending slot, c) the axially extending slot being defined by first and second axially extending integral edge portions adjacent to the axially extending slot, and d) a bypass support extending from the first axially extending integral edge portion to the second axially extending integral edge portion, where the bypass support is in the spool portion, where the bypass portion extends inwardly into the spool portion from the first axially extending integral edge portion, and where the bypass portion extends inwardly into the spool portion from the second axially extending integral edge portion.

Another feature of the present invention is the provision in a retractable flexible gate apparatus, of a second nonrotatable support member, where the second nonrotatable support member is outside of and spaced from the spool portion and first nonrotatable first support member, where the second nonrotatable support member is parallel to the first nonrotatable support member, and where the second nonrotatable support member extends from the foot to the head.

Another feature of the present invention is the provision in a retractable flexible gate apparatus, of the flexible barrier including a distal end portion, where the distal end portion is engagable to the second surface, where the distal end portion includes a rigid support extending from an upper edge of the flexible barrier to a lower edge of the flexible barrier, where the flexible barrier includes a hand opening at a location immediately adjacent to the rigid support such that one hand of a user can hold the rigid support at the location and draw the flexible barrier out of the spool portion such that the rigid support exerts pressure up and down the distal end portion to and between the upper and lower edges of the flexible barrier when the flexible barrier is drawn out of the spool portion by such one hand.

Another feature of the present invention is the provision in a retractable flexible gate apparatus, of a) the head including a first piece and a second piece, where the first piece is rigidly engaged to the head, and where the second piece is axially slideable relative to the head, b) the upper cap including a first set of teeth, where the upper cap is rotatably engaged to the first piece that is rigidly engaged to the head, and where the first piece includes an opening through which the first set of teeth extends, and c) the second piece including a second set of teeth, where the second set of teeth axially slides on an axis to mesh with the first set of teeth to control a drawing in and drawing out of the flexible barrier.

Another feature of the present invention is the provision in a retractable flexible gate apparatus, of when in the retracted form, the flexible barrier is lockable from being drawn out, and where when in the extended form when engaged to the second surface, the flexible barrier is lockable from being drawn out further or from being retracted in to the retracted form.

Another feature of the present invention is the provision in a retractable flexible gate apparatus, of a wind up piece, where the wind up piece is removably engaged to the foot, where the wind up piece is fixedly engaged to a lower end portion of the first nonrotatable support member such that, when the wind up piece is disengaged from the foot and the lower cap is held stationary, the wind up piece may be rotated to rotate an upper end portion of the first nonrotatable support member to in turn rotate an upper end portion of the coil spring to in turn twist the coil spring to a greater or lesser degree of tension, and where the wind up piece is then engaged back on the foot to fix the coil spring at the greater or lesser degree of tension.

Another feature of the present invention is the provision in a retractable flexible gate apparatus, of first, second, third, and fourth wall mounts and respective first, second, third, and fourth quick connects, where the first quick connect is engaged to the foot and engages the foot to the first wall mount, where the second quick connect is engaged to the head and engages the head to the second wall mount, where the third quick connect is engaged to a distal upper end portion of the flexible barrier and engages the distal upper end portion of the flexible barrier to the third wall mount, and where the fourth quick connect is engaged to a distal lower end portion of the flexible barrier and engages the distal lower end portion of the flexible barrier to the fourth wall mount.

Another feature of the present invention is the provision in a retractable flexible gate apparatus, of the head including a sidewall and a window in the sidewall, where a first part is viewable through the window when the flexible barrier may be drawable in or drawable out, where a second part is viewable through the window when the flexible barrier is locked against being drawn in or drawn out.

Another feature of the present invention is the provision in a retractable flexible gate apparatus, of the second part being viewable through the window after the second part has been pushed downwardly and rotated relative to the first part, and where the second part is rotated between the window and the first part.

Another feature of the present invention is the provision in a retractable flexible gate apparatus, of a) the first nonrotatable support member including a lower end portion engaging the foot, b) the first nonrotatable support member including an upper end portion spaced from the upper cap of the spool portion, c) the upper cap engaged to the spool portion rotatably engaging a first piece that in turn rigidly engages the head such that the spool portion supports the head relative to the foot, and d) the upper end portion of the first nonrotatable member being engaged by a rotatable piece or stabilizer that engages an inner cylindrical surface of the spool portion.

Another feature of the present invention is the provision in a retractable flexible gate apparatus, of a set of ball bearings being engaged between the upper cap and the first piece.

Another feature of the present invention is the provision in a retractable flexible gate apparatus, of a) a rotatable and axially slideable knob and a toothed piece engaged inwardly of and to the rotatable and axially slideable knob, where the toothed piece includes teeth that engage teeth of the upper cap to lock and unlock rotation of the spool portion, and where the toothed piece includes at least one prong having at least one foot, and b) a structure nonrotatably fixed in the head, where the structure includes a retainer that receives the foot of the prong, where the retainer guides up and down movement of the foot, toothed piece, and rotatable and axially slideable knob.

An advantage of the present retractable flexible gate is that it takes up a minimum of space. One feature contributing to this advantage is that, in the retracted form, substantially all of the flexible gate is wound about the spool. Another feature contributing to this advantage is that the far wall mounts, that engage the distal end of the flexible barrier in the extended form of the flexible barrier, protrude minimally from the far or opposing wall. Another feature contributing to this advantage is the near wall mounts, that engage the foot and head of the apparatus, protrude minimally from the near wall. Another feature contributing to this advantage is that the foot and head protrude minimally from the near wall and extend minimally from an outmost portion of the spool.

Another advantage of the present retractable flexible gate is safety. The spool that automatically retracts the flexible gate may be locked such that the retractable flexible gate is not retractable. For example, the flexible gate may be engaged to the far wall such that the flexible gate is in an extended form. At this position on the far wall and in this extended form, the rotatable control knob may pressed down and turned, whereupon an internal coil spring in the head pushes up on the rotatable control knob to lock the flexible barrier in the extended form. The same spool that permits an unspooling or extension of the flexible gate may be locked such that the flexible gate may not be unspooled, extended, or drawn out such as from the fully spooled in state. In each of the examples, such locking begins when the rotatable control knob is pushed down, a first step. Such locking continues when the rotatable control knob is turned, a second step. Such locking continues when the user lets up on the rotatable control knob, a third step, which permits the internal coil spring in the head to push a tab of the rotatable control knob into a window or receptor formed in the head, out of which the rotatable control knob cannot exit unless it is pushed down and turned. Teeth from the upper cap and teeth from a piece axially slideable with the rotatable control knob engage each other during the first, second, and third steps. A rotatable control knob tab rotates between an unlocking window and a locking window. The unlocking window has a top edge of a sufficient height to permit the internal coil spring to push up the toothed structure to an elevation where the teeth of the toothed structure are free of the teeth of the upper cap of the spool. The locking window has a top edge of a lower height, which lower height does not permit the teeth of the toothed structure to disengage from the teeth of the upper cap of the spool portion. Such lower height of the top edge maintains the teeth of the lower structure at an elevation where the respective sets of teeth are still in a state of engagement with each other.

Another advantage of the present retractable flexible gate is that it may be quickly set up. Mounting hardware engages wall surfaces with pin connectors such as screws and anchors. Such mounting hardware has unique and different quick connect portions for engaging the foot and base of the retractable flexible gate and unique quick connect portions for engaging the distal end of the pull out flexible barrier. Each of the foot and base has cooperating quick connect portions. The pull out flexible barrier has upper and lower cooperating quick connect portions.

Another advantage of the present retractable flexible gate is that the pressure of the coil spring in the spool portion that provides for automatic return of the flexible barrier may be adjusted by a wind up mechanism. The wind up mechanism is not utilized during daily use. The wind up mechanism is normally engaged to the foot. However, when it is desirable to increase or lessen the pressure in the coil spring when the flexible barrier is pulled out, the wind up mechanism is disengaged from the foot. Then, while holding the spool portion or locking the rotatable knob to keep the toothed portion of the rotatable knob engaged with the teeth of the upper cap so as to lock the spool portion, the wind up mechanism is turned so as to rotate the usually nonrotatable support member, so as to turn or twist the upper end of the coil spring affixed to the top of the usually nonrotatable support member, so as to twist the coil spring as a whole. Then when the desired greater or lesser pressure is attained, depending upon which way the usually nonrotatable support member is turned, the wind up mechanism is re-engaged with the foot.

Another advantage of the present retractable flexible gate is that it is easy to operate. To lock the flexible barrier from being drawn out to the extended form or drawn in the retracted form, the rotatable control knob is pushed down, turned, and released. When released, an internal coil spring pushes the rotatable control knob upwards. To unlock the flexible barrier so as permit the flexible barrier to be spooled in or spooled out, the rotatable control knob is pushed down, turned the other way, and released. When released, an internal coil spring pushes the rotatable control knob upwards.

Another advantage of the present retractable flexible gate is that the quick connect portions between the distal end of the flexible barrier and the wall connections have a friction fit component. Here each of the upper and lower quick connect portions on the wall has a connection path from an entrance (or exit) to a seat. Here each of the upper and lower quick connect portions on upper and lower portions of the distal end of the flexible barrier has generally the shape of a U. The base of the U has a thickness greater than or equal to the whole of the connection path of the quick connect portions of the wall connections from the entrance (or exit) to the seat and back to the entrance (or exit) such that there is a friction fit between the base of the U along the whole of the connection path as the base of the U travels from the entrance (or exit) to the seat and back to the entrance (or exit). Thus, there is an immediate connection between the base of the U and the entrance. Thus, there is a connection between the base of the U and the exit until the very last second to minimize accidental slippage of the base of the U out of the connection path.

BRIEF DESCRIPTION OF THE DRAWINGS

FIG. 13A is a detail perspective view of a lower portion of the spring assembly of the base of FIG. 11A.

FIG. 13B is a detail perspective view of a lower portion of the spring assembly of the base of FIG. 11A.

DESCRIPTION

Figure 1:
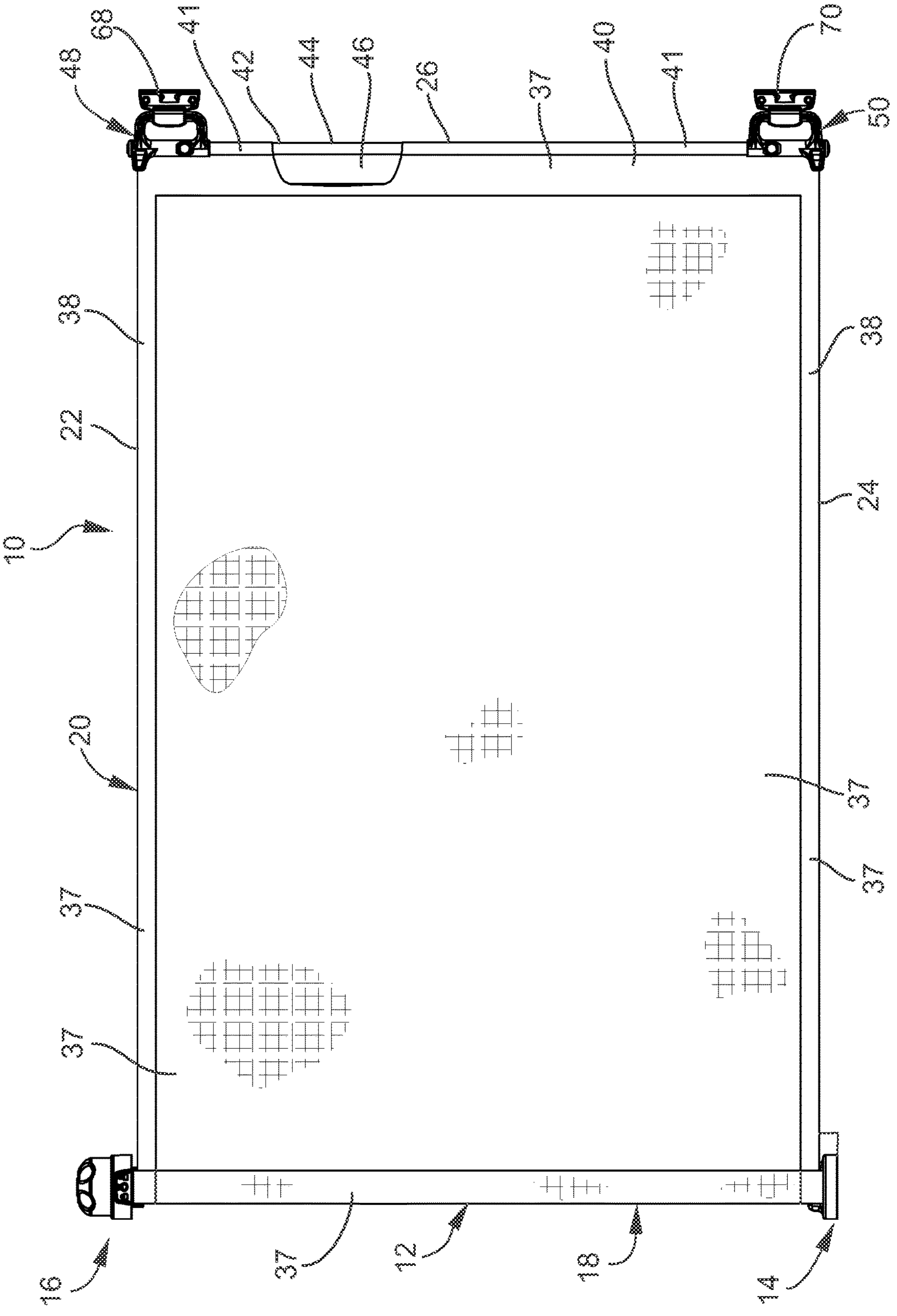
FIG. 1 is an elevation view of the retractable flexible gate when the retractable flexible gate is engaged to first and second spaced apart co-planar surfaces, with the retractable flexible gate being shown in a fully extended or fully pulled out form where a flexible barrier is pulled out of a base.

As shown in FIG. 1, the present retractable flexible gate apparatus is indicated by the reference number 10. Gate apparatus 10 includes a base 12 that includes a foot 14, a head 16, and a spool portion 18. The spool portion 18 includes a flexible barrier 20.

Figure 18B:
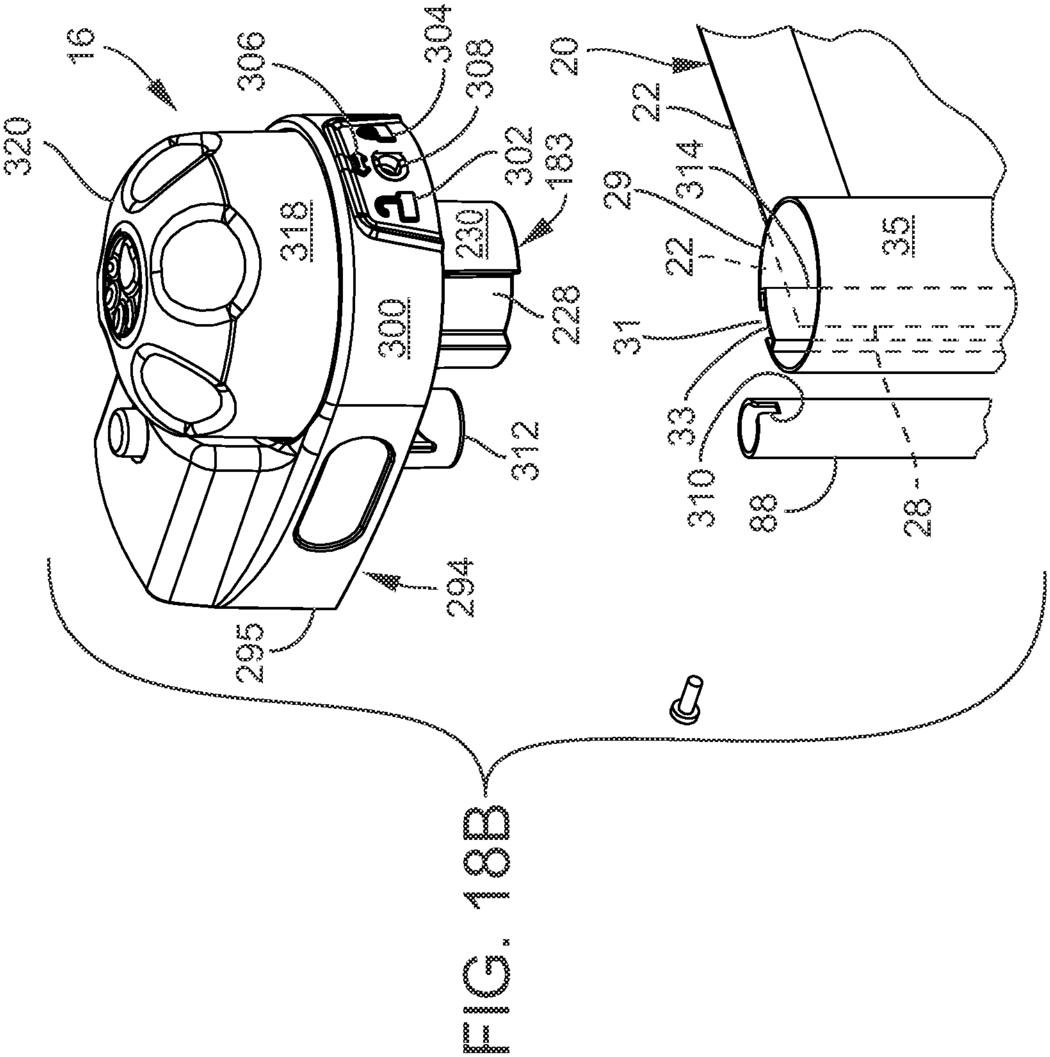
FIG. 18B is a detail view of the head of FIG. 18A disengaged from a metal tube of the spool portion and further disengaged from one of the support tubes of the retractable flexible gate of FIG. 2B.

Flexible barrier 20 is generally rectangular in an extended form so as to include an upper horizontal edge 22, a lower horizontal edge 24, a distal vertical edge 26, and a proximal vertical edge 28, shown in FIG. 18B. Proximal vertical edge 28 and an adjacent parallel vertical edge portion 98, shown in FIG. 3, of the flexible barrier 20 are engaged to a metal tube 29 upon which the flexible barrier 20 is retracted. Metal tube 29 includes a vertical slot 31 and an integral metal receptor 33 inwardly of the vertical slot 31. Integral metal receptor 33 ties together the vertical tube edges of metal tube 29 that form vertical slot 31. Such vertical tube edges of metal tube 29 form the integral metal receptor 33 by running or extending inwardly into metal tube 29 from the vertical slot 31. Vertical slot 31 runs the axial length, or height, of the metal tube 29. Integral metal receptor 33 runs the axial length of the vertical slot 31 and metal tube 29 from the bottommost portion of the metal tube 29 to the topmost portion of the metal tube 29. Proximal vertical edge 28 is engaged in the receptor 33 such as by gluing. An engagement in the receptor 33 permits a flat or nonfolding roll-up of the flexible barrier 20 on the outer cylindrical surface 35 of the metal tube 29. Integral metal receptor 33 takes a dovetail form but may take other forms as a byway structure, running from one vertical slot edge or a location adjacent to such vertical slot edge, then running inwardly into the interior of the tube 29, and then running outwardly to the other vertical slot edge or a location adjacent to such other vertical slot edge. Such other forms as a byway structure is, instead of a dovetail structure in section, a semi-circle structure in section or a rectangular or square structure in section.

Figure 27:
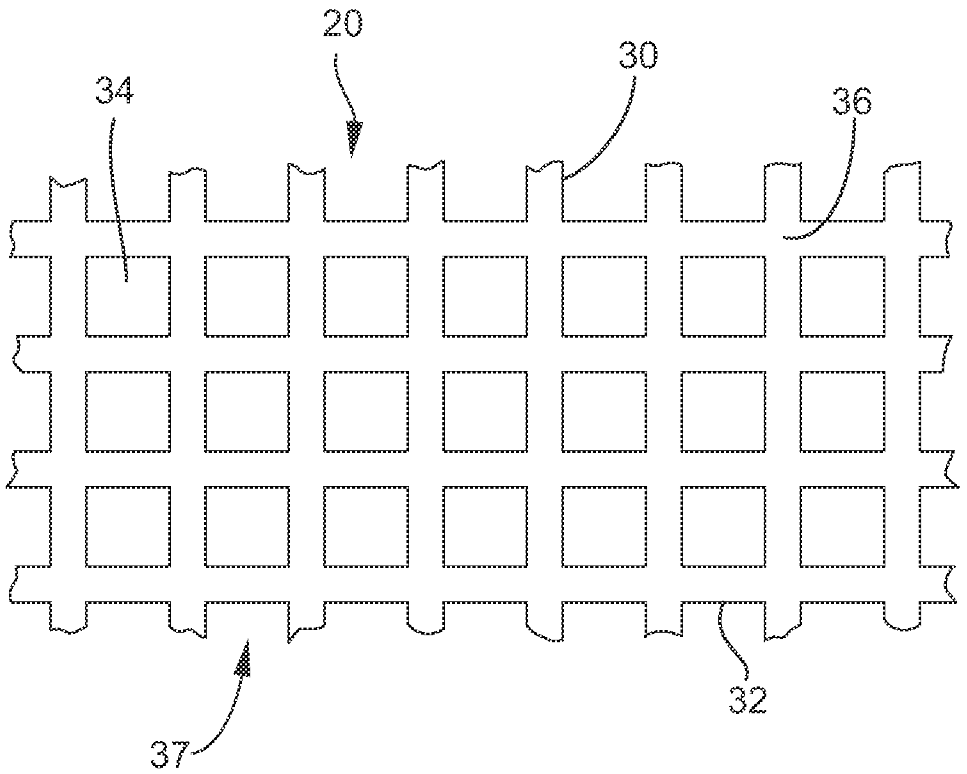
FIG. 27 is a detail elevation view of a mesh portion of the flexible barrier of the retractable flexible gate of FIG. 1.

The flexible barrier 20 from its upper edge 22 to its lower edge 24, and from the distal edge 26 to the proximal edge 28 is a mesh 37. As shown in FIG. 27, the mesh 37 includes vertically running threads or elongate flexible members 30 and horizontally running threads or elongate flexible members 32. Threads 30, 32 take the form of miniature straps with flat front and back faces. Generally square or rectangular openings 34 are formed by the threads 30, 32. Threads 30, 32 form intersections 36. At each of the intersections 36 of the vertically running threads 30 and horizontally running threads 32, such intersection 36 is integral and one-piece with the remainder of the mesh 37 and flexible barrier 20. Each of the vertically running threads and horizontally running threads 32 may be formed of a plastic, polymer, co-polymer, nylon, fabric, textile, or fiberglass. The mesh 37 is folded over or doubled or includes an extra layer at horizontal portions 38 and at vertical distal portion 40. Such a folded over or doubled or extra layer mesh portion also defines the proximal vertical edge 28 inside of the metal tube 29. The remainder of the flexible barrier 20 is a single layer of mesh 37. The single layer of mesh 37 is flexible. The double layer of mesh 37 is flexible. Mesh 37, prior to being in the form of the flexible barrier 20, or after being in the form of the flexible barrier 20, may be coated with a plastic, polymer, co-polymer, or resin coating. After such a coating step, mesh 37 and flexible barrier 20 remain flexible so as to be retracted onto or rolled up onto metal tube 29 and so as to be pulled off or rolled off metal tube 29. The coating engages the threads 30, 32 and leaves the openings 34 open. The flexible barrier 20 may wrap around the tube between about 5 times and about 15 times. If the desired wrap around is 10 times, this means that the tube 29 and the upper cap 183 rotate 10×360 degrees for 3,600 degrees of rotation where one time is 360 degrees for a complete single rotation.

Vertical distal portion 40 defines a sleeve 41 that receives a rigid tube 42. Tube 42 includes a tube handle portion 44. By pulling on tube handle portion 44, the flexible barrier 20 is pulled out of the spool portion 18 when the spool portion 18 is unlocked. Flexible barrier 20 includes a handle opening 46 that is free of mesh 37 and that exposes the tube handle portion 44 to touch, for being manually gripped or grasped by the user. Sleeve 41 runs from the top of handle opening 46 to upper horizontal edge 22 and from the bottom of handle opening 46 to the lower horizontal edge 24. Sleeve 41 is single layered about the tube 42. Such single layers engage each other to form the double layer 40 that extends from the upper horizontal edge 22 to the lower horizontal edge 24. Mesh 37 is single layered between the double layered portions 38 and between the double layered portions 40, one of which is found adjacent to the proximal vertical edge 28. Flexible barrier and its mesh 37 are see-through.

Figure 10A:
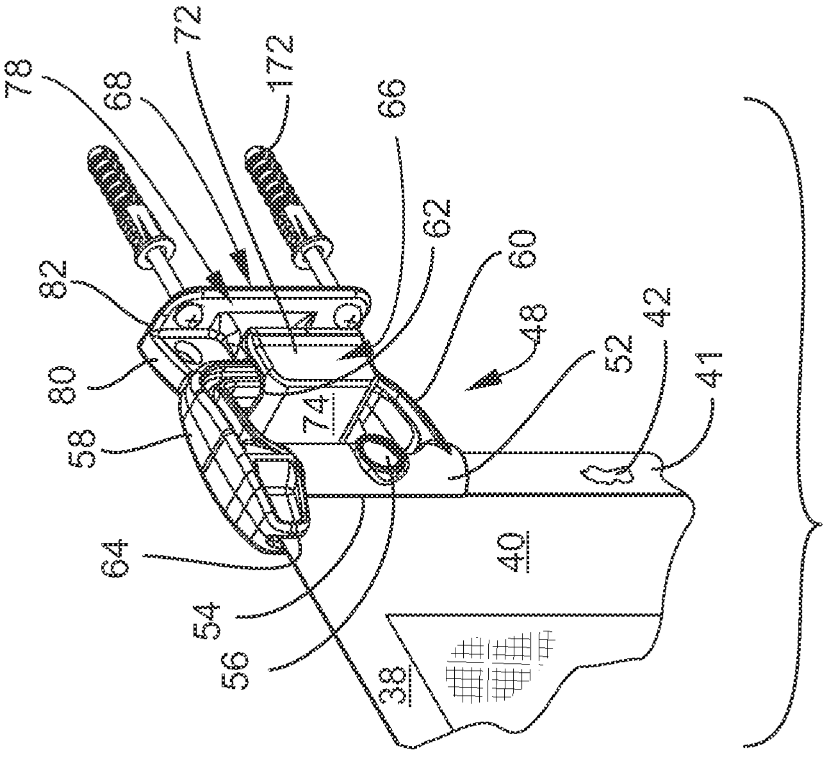
FIG. 10A is a perspective view of the upper wall connector or quick connect of FIG. 8A engaged to the upper handle or quick connect of the flexible barrier of the retractable flexible gate of FIG. 2B.
Figure 10B:
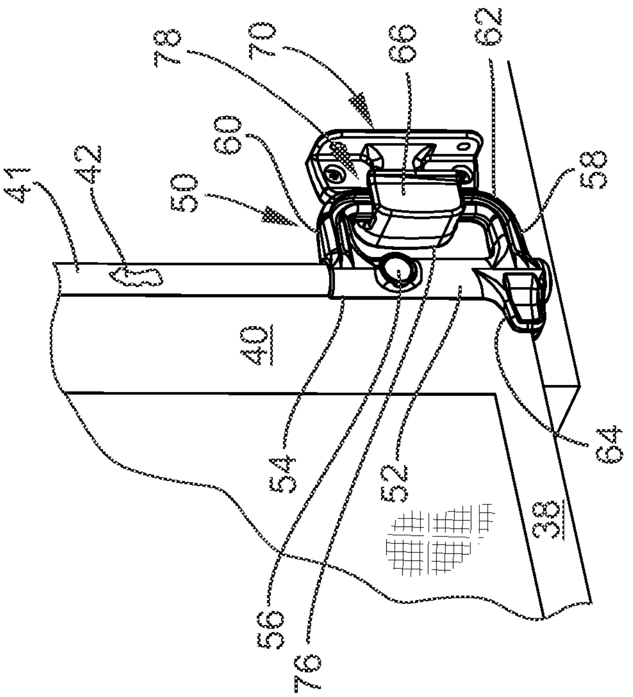
FIG. 10B is a perspective view of the lower wall connector or quick connect of FIG. 8B engaged to the lower handle or quick connect of the flexible barrier of the retractable flexible gate of FIG. 2B.

Flexible barrier 20 is engaged to an upper handle 48 and a lower handle 50. Handles 48, 50 are identical but flipped in orientation. As shown in FIGS. 10A and 10B, each of the handles 48, 50 includes first, second, third, and fourth handle portions 52, 58, 60, 62, which portions are integral with each other. The first portion 52 is tubular with a vertical slot or channel 54 running between the upper and lower ends of the tubular first portion 52. Tubular first handle portion 52 receives the tube 42 with the sleeve 41 pinched between the outer cylindrical surface of the tube 42 and the inner cylindrical surface of the tubular first handle portion 52. The vertical slot 54 permits the mesh 37 to extend out of the tubular first handle portion 52 from the sleeve 42 to the double layer portion 40. A pin connector 56 engages the tubular first handle portion 52 and tube 42 to each other. Pin connector 56 is preferably a rivet.

Integral with the tubular first handle portion 52 are an outer horizontal handle portion 58, an inner horizontal handle portion 60, and a vertical handle portion 62 such that each of the first and second handles 48, 50 includes the tubular first handle portion 52, the outer horizontal handle portion 58, the inner horizontal handle portion 60, and the vertical handle portion 62 such that the second, third, and fourth handle portions 58, 60, and 62 form the shape of a U.

Outer horizontal handle portion 58 of each of the handles 48, 50 includes a slot 64 that receives the mesh 37, particularly the junction of the double layer portion 38 and double layer portion 40. The slot 64 extends from a proximal portion of second handle portion 58 to the slot 54 of the first handle portion 52. Outer horizontal handle portion 58 is integrally joined to the tubular first handle portion 52 at an outer end of the tubular first handle portion 52.

Inner horizontal handle portion 60 of each of the handles 48, 50 is integrally joined to the tubular first handle portion 52 at an inner end of the tubular first handle portion 52. The location of the junction between the tubular first handle portion 52 and inner horizontal handle portion 60 is inwardly of the pin connector 56.

Vertical handle portion 62 of the handles 48, 50 is integrally joined to the outer horizontal handle portion 58 and the inner horizontal handle portion 60 such that the outer horizontal handle portion 58, inner horizontal handle portion 60, and vertical handle portion 62 are U-shaped. The lateral thickness of the vertical handle portion 62 is sufficiently great so as to be friction fit into hook or catch 66 of upper wall connector 68 and the hook or catch of lower wall connector 70 such that some manual effort is required pull flexible barrier 20 in the direction away from the base 12 to disengage the upper and lower handles 58, 60 from their respective upper and lower wall connectors 68, 70. To provide for such manual effort or friction fit, the size or width of the vertical handle portion 62, which is the base of the U-shaped portion of handles 48, 50, is about equal to or slightly greater than the size or width of a connection path formed in wall connectors or mounts or quick connects 68, 70, where the connection path is defined as the path from the entry 78 formed in such quick connects 68, 70 to the seat formed in such quick connects 68, 70, where the seat is formed by the junction of catch portions 72, 74, 76 and where the entry or exit is opening 78. The sizing of the connection path may also take into account the heads of pin connectors engaging holes 110, 112.

Figure 8B:
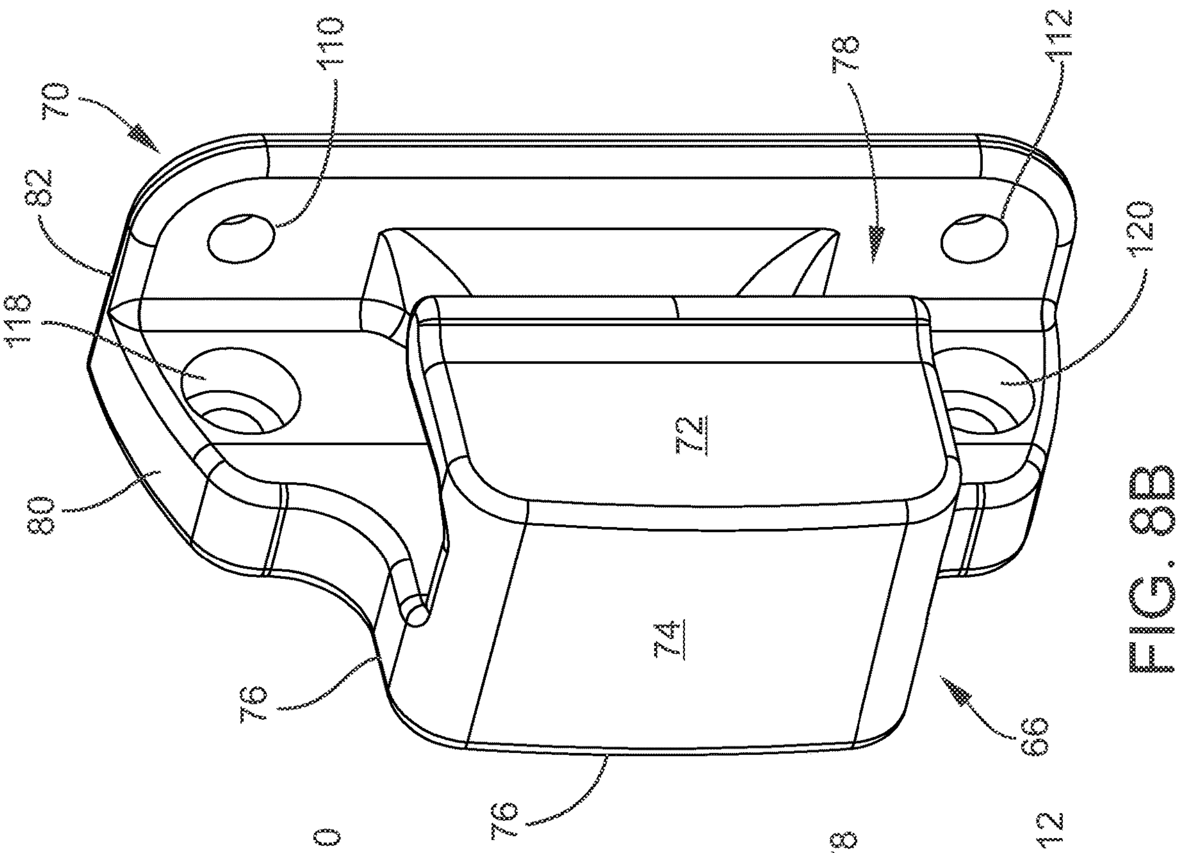
FIG. 8B is a perspective detail view of the lower wall connector or mount or quick connect that is disposed between a wall and the lower handle of the flexible barrier of FIG. 1, with the upper and lower wall connectors of FIGS. 8A and 8B being identical.
Figure 8A:
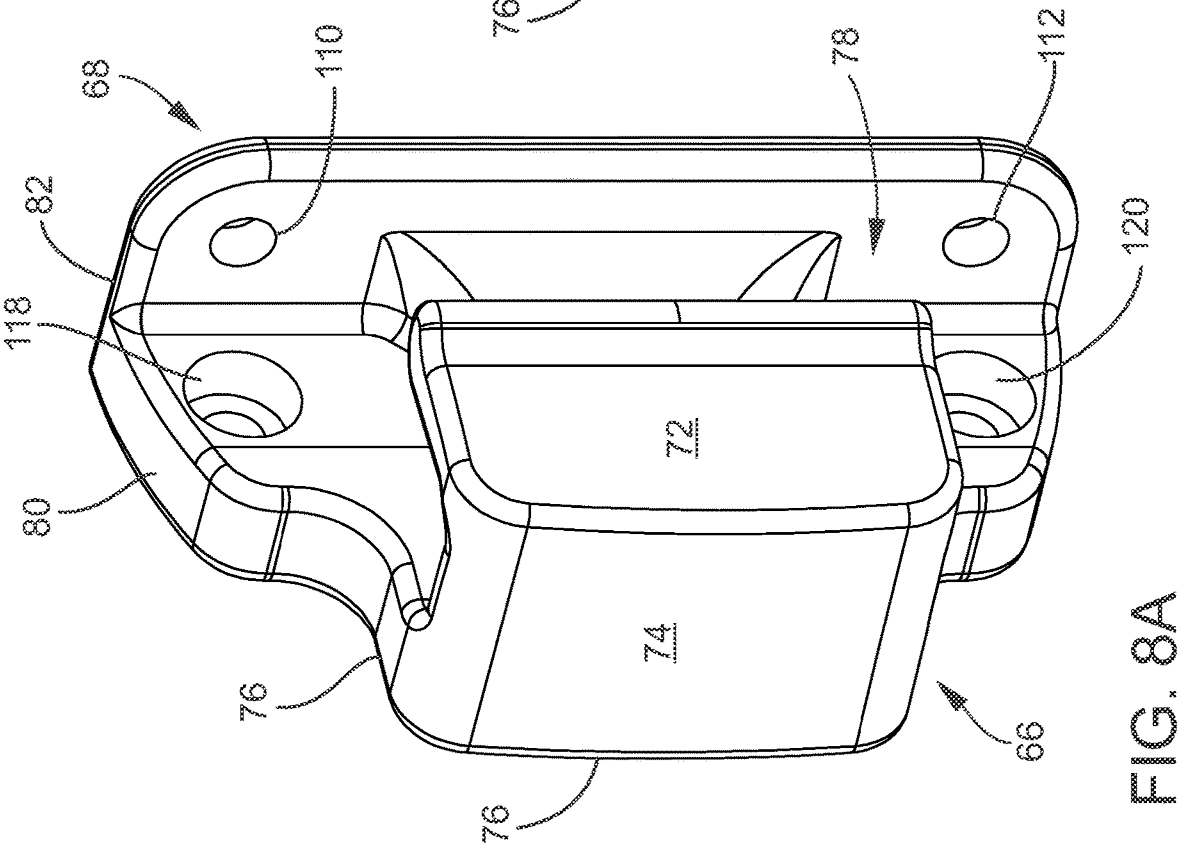
FIG. 8A is a perspective detail view of the upper wall connector or mount or quick connect that is disposed between a wall and the upper handle of the flexible barrier of FIG. 1.

As shown in FIGS. 8A and 8B, upper and lower wall connectors 68, 70 are identical to each other. Each of the connectors 68, 70 includes the aforementioned hook or catch 66. The catch 66 includes a front catch or wall portion 72, an end catch or wall portion 74, and a back catch or wall portion 76. The distance between the inner surface of the back catch or wall portion 76 and the inner surface of the front catch or wall portion 72 is slightly less than the lateral thickness of the vertical handle portion 62 of the handles 58, 60 to provide for the aforementioned manual effort to pull the vertical handle portion 62 in the direction away from the base 12 to disengage the vertical handle portion 62 from between the back wall portion 76 and the front wall portion 72 to draw the vertical handle portion 62 toward an opening 78, whereupon the vertical handle portion 62 is drawn sideways, albeit with the aforementioned friction fit, out of the opening 78, whereupon the flexible barrier 20 can automatically be retracted or spooled up by the base 12.

Each of the wall connectors 68, 70 includes first and second wall portions 80, 82. Wall portion 80 is co-planar with and integral with catch or wall portion 76. Wall portion 82 is set at a right angle to wall portion 80 and wall portion 76. Wall portion 80 includes upper and lower pin connector thru holes 118, 120. Wall portion 82 includes first and second thru holes 110, 112. The pin connector holes 118, 120 of wall portion 80 are used when the retractable flexible gate 10 engages first and second co-planar surfaces. The pin connector holes 110, 112 of wall portion 82 are used when the retractable flexible gate 10 engages first and second opposing surfaces. The distal edge of catch or wall portion 72 of catch 66 is spaced from the proximal surface of wall portion 82 so as to define space 78 that permits the vertical fourth handle portion 62 to be drawn sideways out of the wall connectors 58, 60. For such a draw sideways out of opening 78 by the vertical handle portion 62, the longitudinal thickness of the vertical handle portion 62 is slightly greater than or about equal to the distance between the distal vertical edge of front wall portion 72 and the front surface of wall portion 82 such that manual force is desired to work handle portion 62 out of opening 78, to flex front wall portion 72, to slow down the exit of handle portion 62 out of opening 78 such that the user's hands remain on handle portion 62 as long as possible to minimize a slippage of the handle portion 62 from wall mounts or quick connects 68, 70, an action that may result in an unintended spooling up of the flexible barrier 20.

Figure 2C:
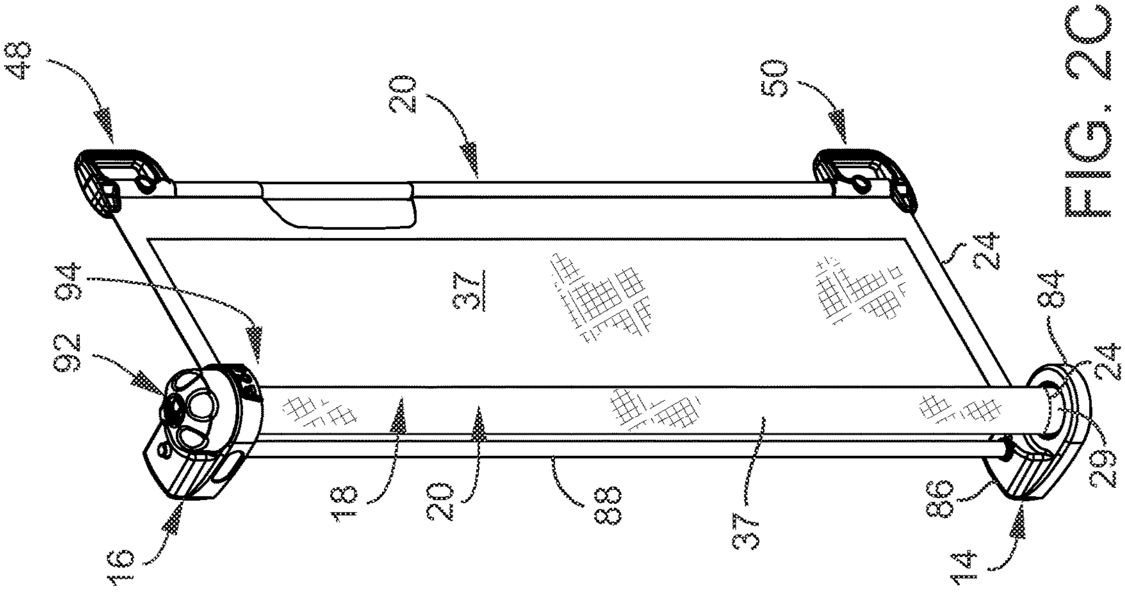
FIG. 2C is a perspective view of the retractable flexible gate of FIG. 1 with the flexible barrier being partially pulled out and being pulled out further than what is shown in FIG. 2B, and in which position the flexible barrier may be locked or unlocked by the base.
Figure 2B:
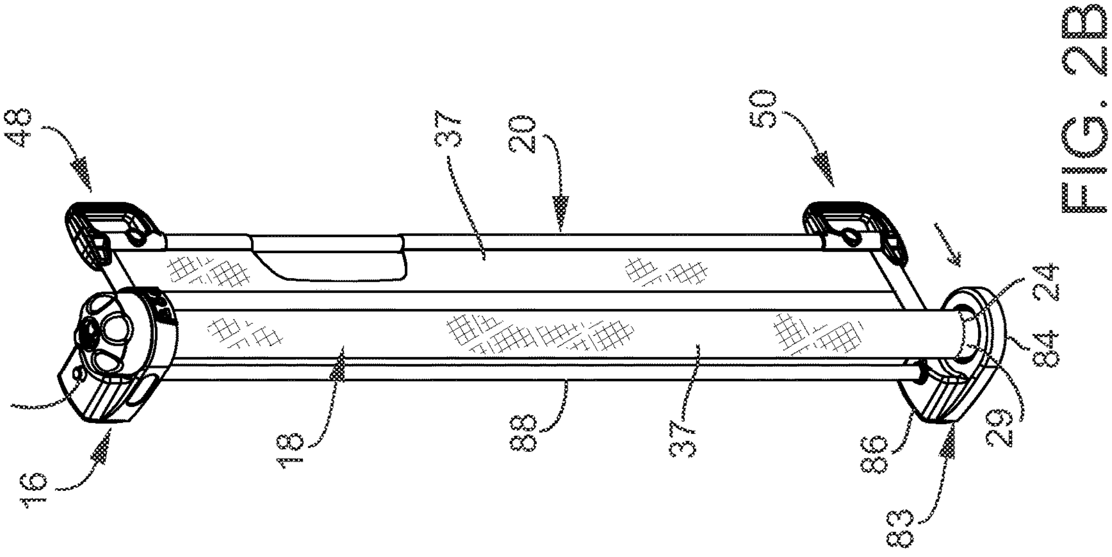
FIG. 2B is a perspective view of the retractable flexible gate of FIG. 1 with the flexible barrier being partially pulled out, and in which position the flexible barrier may be locked or unlocked by the base.

FIG. 2B shows that foot 14 of the base 12 includes a two level mount 83 having a lower mount portion 84 and a higher mount portion 86. Lower and higher mount portions 84, 86 are integral with each other such that two level mount 83 is one-piece. Lower mount portion 84 is a mount or support for the spool portion 18, which spool portion 18 includes the flexible barrier 20 and the metal tube 29 upon which the flexible barrier 20 is rolled and unrolled. Higher mount portion 86 is a mount or support for a vertical support tube 88 that, as well as engaging the higher mount 86, engages the head 16 of the base 12.

FIGS. 2B and 2C show the upper handle 48 and lower handle 50. FIG. 2B shows the flexible barrier 20 partially pulled out from the spool portion 18. FIG. 2C shows the flexible barrier 20 pulled out further than that shown in FIG. 2B.

Each of FIGS. 2B and 2C show a button 90 that is used to disengage the head 16 of the base 12 from a wall connector 106, a rotatable control knob 92 that unlocks and locks the spool portion 18 so as to control whether the flexible barrier 20 may be drawn out of the spool portion 18, and a window portion 94 that shows color codes to tell the user whether the spool portion 18 is locked or unlocked.

FIGS. 2B and 2C further show a bottom portion of metal tube 29, which bottom portion is integral with metal tube 29 and spins or rotates when the metal tube 29 spins or rotates when retracting the flexible gate 20 or letting the flexible gate 20 be drawn out.

Figure 3:
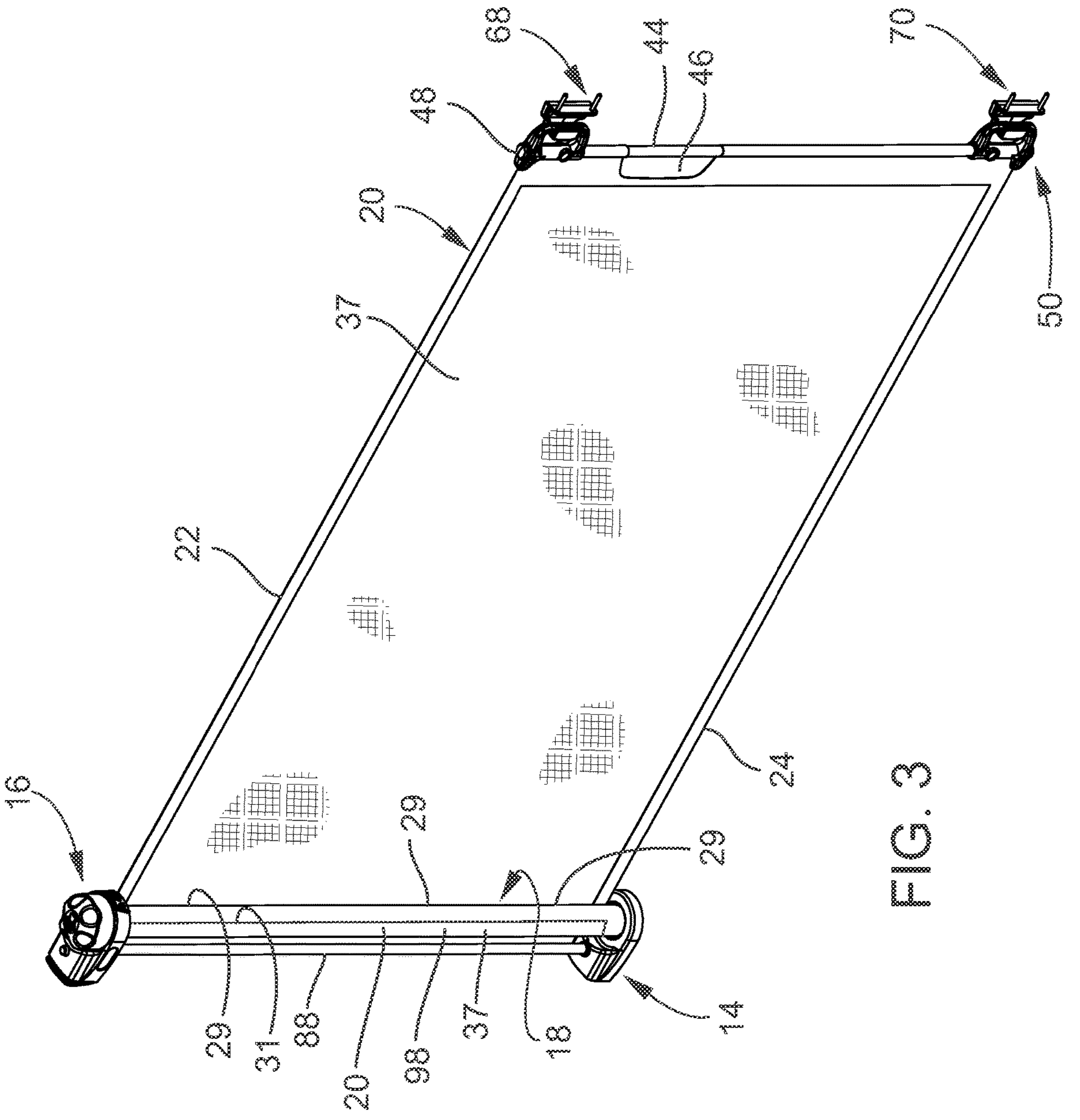
FIG. 3 is a perspective view of the retractable flexible gate of FIG. 1 when the retractable flexible gate is engaged to two spaced apart confronting surfaces, with the flexible barrier being fully pulled out or fully extended, and in which position the flexible barrier may be locked or unlocked by the base.

FIG. 3 shows the flexible barrier 20 fully extended. FIG. 3 shows the metal tube 29 onto which the flexible barrier 20 spools and from which the flexible barrier 20 spools out. FIG. 3 shows one of the two vertical edges of slot 31. Proximal edge 28 of the flexible barrier 20 is engaged in slot 31. Reference number 98 indicates a proximal edge portion of the flexible barrier 20, which proximal edge portion 98 is immediate adjacent to the proximal edge 28 of the flexible barrier 20. Proximal edge portion 98 may include a double layer, just like double layer end portion 40 on the distal end of the flexible barrier 20.

FIG. 3 further shows the upper wall connector or quick connect 68 that engages upper handle 48 and the lower wall connector or quick connect 70 that engages handle 50. FIG. 3 further shows the support tube 88 running parallel to and spaced from the metal tube 29. Support tube 88 is spaced from spool portion 18 when the flexible barrier is fully pulled out from the spool portion 18 and when the flexible barrier is fully rolled up on the spool portion 18.

Figure 4:
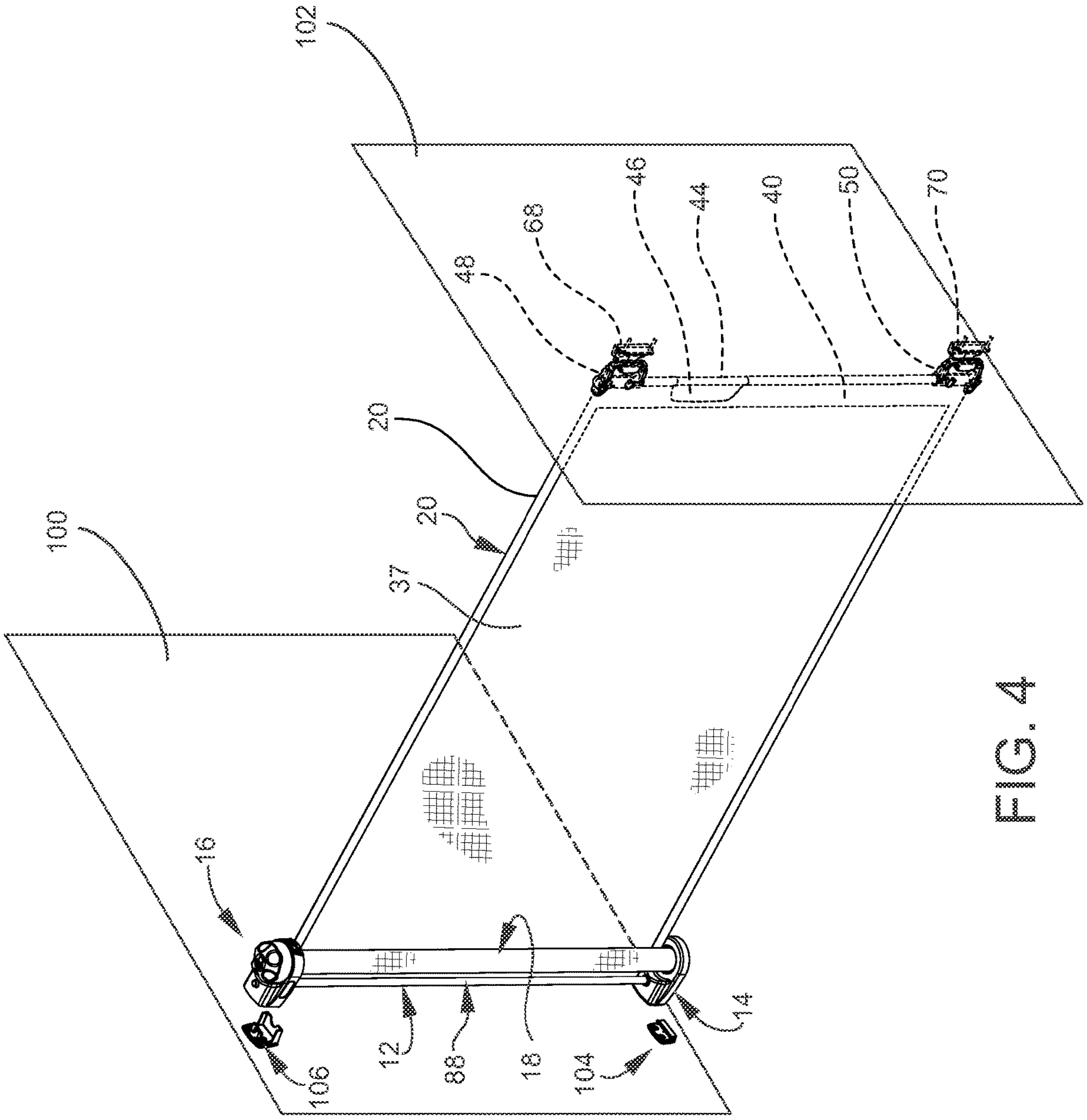
FIG. 4 is a perspective, partially phantom, partially exploded, environmental view of the retractable flexible gate of FIG. 3, albeit less spooled out, engaging first and second spaced apart confronting surfaces, and in which position the flexible barrier may be locked or unlocked by the base.

FIG. 4 shows a first wall portion 100 and a second wall portion 102. Wall portions 100 and 102 extend parallel to each other. Base 12 is engaged to first wall portion 100 by a lower wall connector or quick connect 104 and an upper wall connector or quick connect 106. Base 12 includes the foot 14 that engages lower wall connector or quick connect 104 and head 16 that engages the upper wall connector or quick connect 106. Spool portion 18 and support tube 88 are further shown in FIG. 4 engaged between the foot 14 and head 16. Each of spool portion 18 and support tube 88 is spaced from the wall portion 100.

FIG. 4 further shows features in phantom that are seen "through" the second wall portion 102. These features shown in phantom include upper handle or quick connect 48, lower handle or quick connect 50, upper wall connector or quick connect 68 that engages upper handle or quick connect 48, and lower wall connector or quick connect 70 that engages lower handle or quick connect 50. Other phantom features shown in FIG. 4 include handle 44, handle opening 46, and double layer portion 40.

Figure 5:
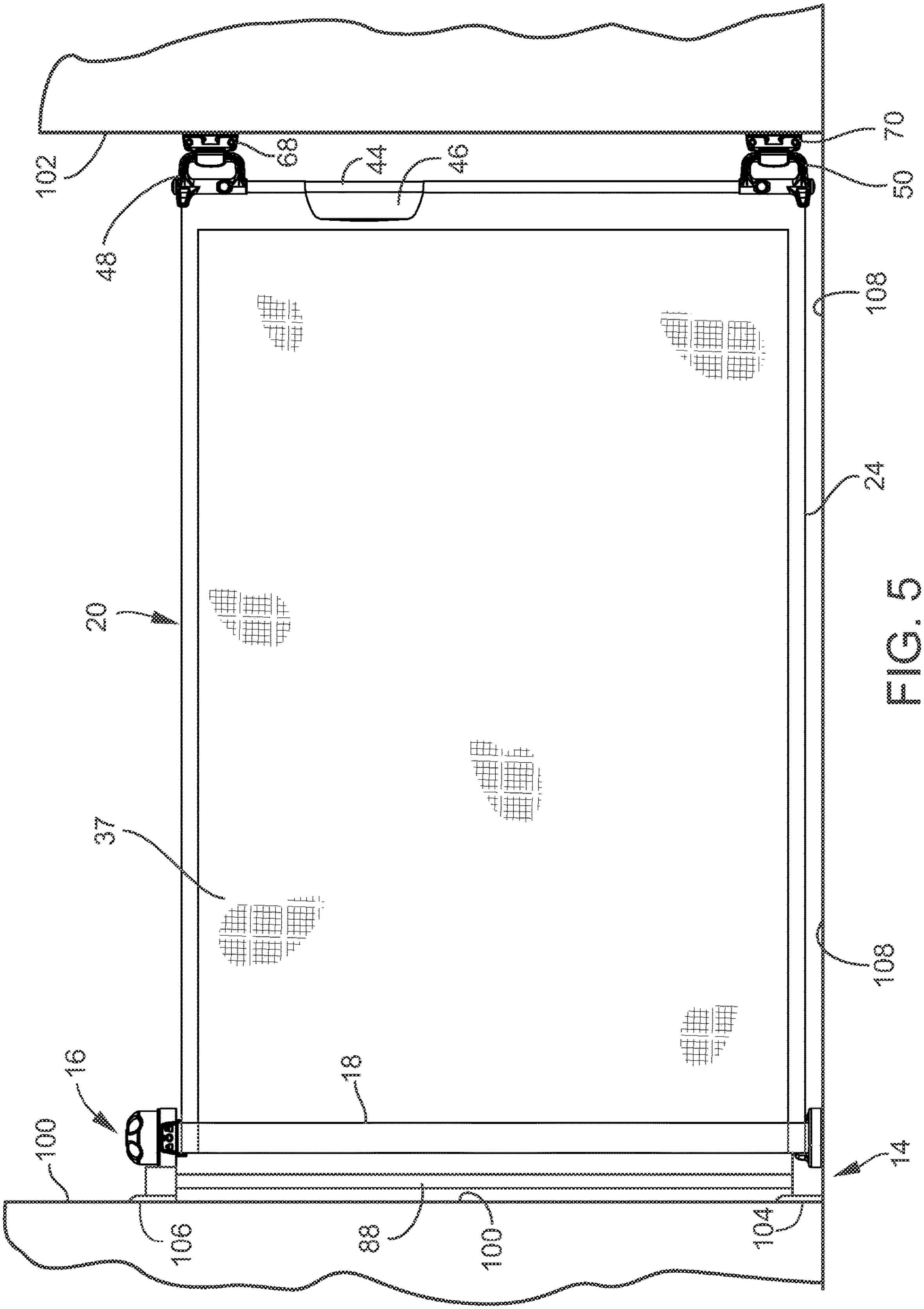
FIG. 5 is an elevation and environmental view of the retractable flexible gate of FIG. 4 engaged to first and second spaced apart confronting surfaces, and in which position the flexible barrier may be locked or unlocked by the base.

FIG. 5 shows FIG. 4 from a different perspective. FIG. 5 shows first wall portion 100 opposite of and spaced from second wall portion 102. Wall portions 100, 102 form a passageway. FIG. 5 further shows a floor surface 108 extending between wall portions 100, 102. Base 14 rests upon floor surface 108. Wall connector 104 may be on or adjacent to floor surface 108. Wall connector 70 and lower handle portion 50 are spaced from and adjacent to floor surface 108. Lower edge 24 of flexible barrier 20 is spaced from and adjacent to floor surface 108.

In the set-up orientation shown in FIGS. 4 and 5, wall portion 82 of upper and lower wall connectors 68, 70 is used. Wall portion 82 includes upper pin hole 110 and lower pin hole 112, shown in FIG. 8B, that are used in the set-up orientation of FIGS. 4 and 5 to engage the upper and lower wall connectors 68, 70 to wall portion 102. In FIGS. 4 and 5 wall portions 100, 102 oppose each other or confront each other. Wall portions 100, 102 may or may not define respective planes.

Figure 6:
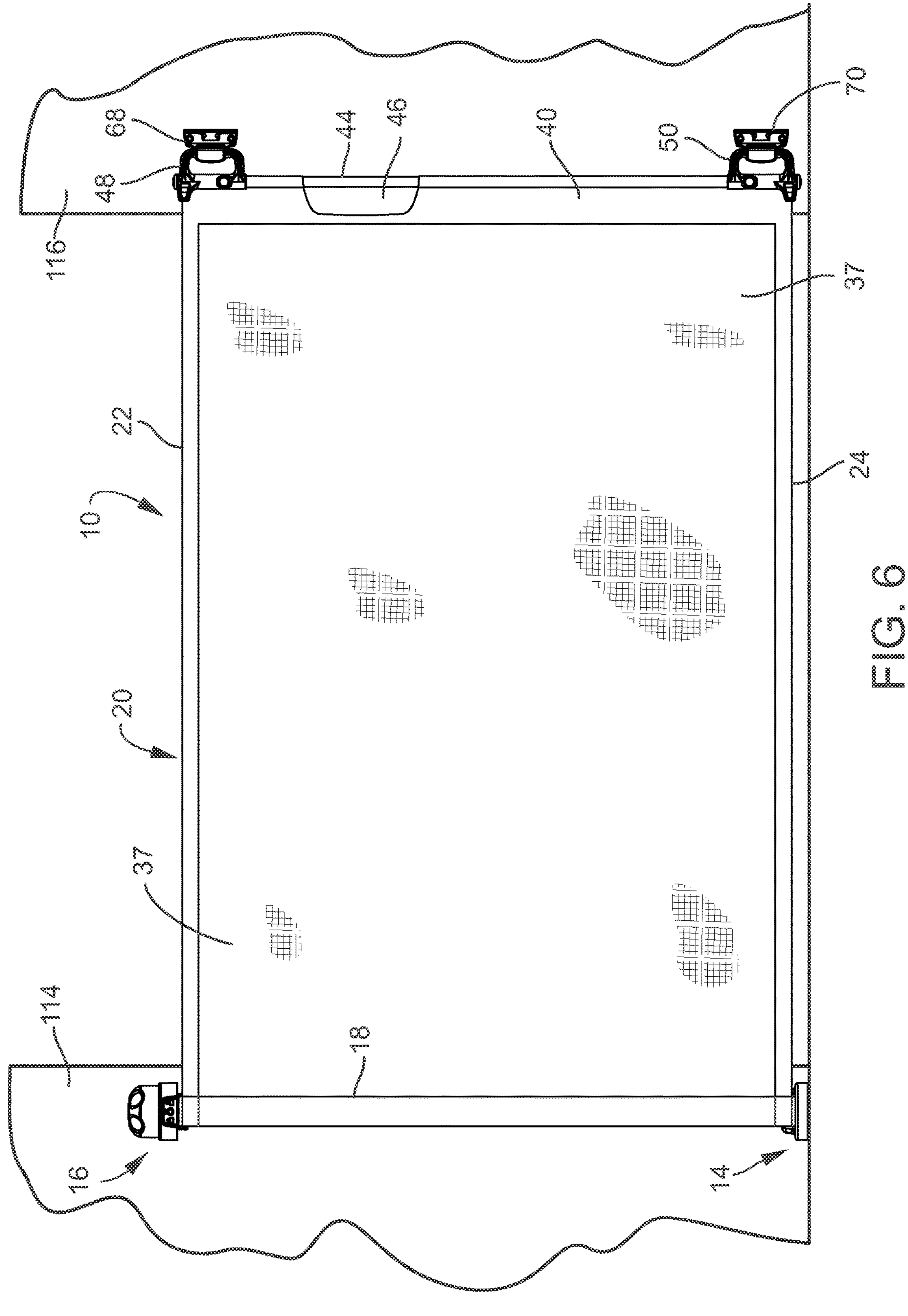
FIG. 6 is an elevation and environmental view of the retractable flexible gate of FIG. 1 engaged to first and second spaced apart co-planar surfaces, and in which position the flexible barrier may be locked or unlocked by the base.

In FIG. 6, wall portions 114, 116 may generally be co-planar. In this set-up, wall connectors 104 and 106 are employed in the same way as in the set up of FIGS. 4 and 5. However, as to wall connectors 68, 70, upper and lower pin connector holes 118, 120 are used and connector wall portion 80 confronts wall portion 116. Pin connectors holes 110, 112 are not used in the FIG. 6 orientation.

In each of the FIGS. 4, 5, and 6 orientations, upper and lower handles 48, 50 engage in the same way their respective upper and lower wall connectors 68, 70 by being engaged by a friction fit in the U-shaped catch 66 defined by front side or wall portion 72, end side or wall portion 74, and back side or wall portion 76. Upper and lower handles 48, 50 exit the U-shaped catch 66 of upper and lower wall connectors 68, 70 in the same way by being withdrawn through opening 78, with such a withdrawal being accompanied by a friction fit between surfaces forming opening 78 and the base of the U-shaped handles 48, 50. The friction fit between the handles 48, 50 and the wall connectors or quick connects 68, 70 occurs in the connection path from opening 78 to the seat or base of the U-shaped catch 66 and back to the opening 78.

Figure 7B:
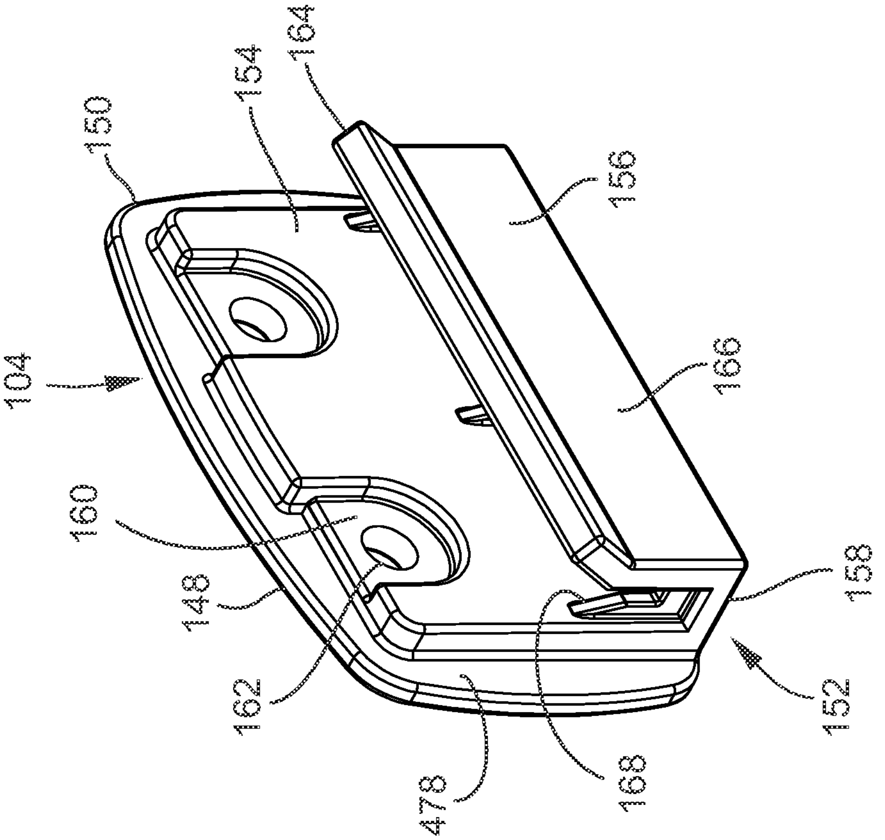
FIG. 7B is a perspective detail view of the lower wall connector or mount or quick connect that is disposed between a wall and the lower portion of the base of the retractable flexible gate of FIG. 1.
Figure 7A:
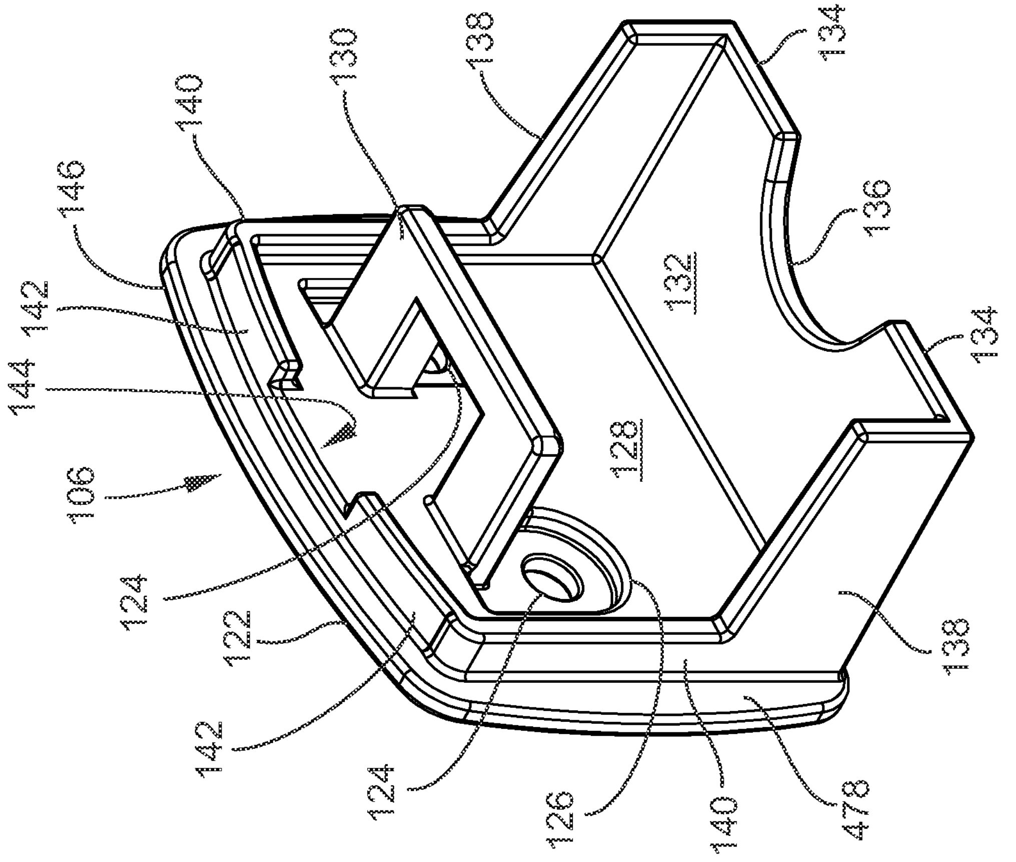
FIG. 7A is a perspective detail view of the upper wall connector or mount or quick connect that is disposed between a wall and the upper portion of the base of the retractable flexible gate of FIG. 1.

FIG. 7A shows the upper spool side wall connector 106. Wall connector 106 includes an upright wall portion 122 that abuts and confronts wall portion 100 in the FIGS. 4 and 5 orientation and wall portion 114 in the FIG. 6 orientation. Upright wall portion 122 includes a pair of pin connector holes 124 for receiving pin connectors that engage wall portions 100, 114. Each of the pin holes 124 is recessed by a cylindrical wall 126 running outwardly from an inner surface 128 of the upright wall portion 122. Protruding inwardly from the upright wall portion 122 at a right angle is a U-shaped connector 130 for catch 420 shown in FIG. 23A. Further protruding inwardly from the upright wall portion 122 is a bottom wall portion 132 having two aligned straight innermost edge portions 134. Between the edge portions 134 is a circular edge portion 136 that engages U-shaped portion 440, shown in FIG. 24A, that is the top of tube portion 312 that receives support tube 88 when U-shaped connector 130 engages catch 420. Still further protruding inwardly from the upright wall portion 122 are a pair of lower sidewall portions 138, intermediate sidewall portions 140, and upper wall portions 142. Lower sidewall portions 138 lead integrally into intermediate sidewall portions 140 that in turn lead integrally into upper wall portions 142. Lower sidewall portions 138 extend inwardly to straight edges 134. Intermediate sidewall portions 140 and upper sidewall portions 142 extend inwardly the same distance, which distance has a length beyond inner surface 128 and less than the length of the innermost part of U-shaped connector 130. A U-shaped notch 144 is formed between upper wall portions 142. Lower sidewall portions 138, intermediate sidewall portions 140, and upper sidewall portions 143 extend from upright wall portion 122 at a location that is spaced from a perimeter 146 of the upright wall portion 122.

Lower sidewall portions 138, intermediate sidewall portions 140, and intermediate sidewall portions 142 are inserted inside of the rear housing portion 295 and slidingly abut top and side inner faces of the rear housing portion 295 of FIGS. 22A, 22B, 23A, 23B, 24A, and 24B. Upright wall portion 122 abuts against U-shaped edge 412 of the rear housing portion 295. Bottom wall portion 132 closes off the rear housing portion 295 to minimize the collection of dirt, dust, water, or moisture therein. The front vertical edges of sidewalls 138 abut the rear faces of depending supports 430. The front edges of intermediate sidewall portions 140 abut tabs 454 and upright supports 428. The outer face of ceiling 324 of the rear housing portion 295 is generally flush with the top edge 122 of the upright wall portion 122. The outer faces of rear housing portion 295 adjacent to U-shaped edge 412 are generally flush with the side edges of upright wall portion 122. The horizontal front edges 134 of bottom wall portions 132 abut the rear faces of depending supports 430.

FIG. 7B shows the lower wall connector 104. Lower wall connector 104 includes an upright wall portion 148 having a perimeter 150. The rear face of the upright wall portion 148 confronts wall portion 100 or wall portion 114. Extending frontwardly or inwardly from the front face of the upright wall portion 148 is a catch 152. Catch 152 includes a rear wall portion 154, a V-shaped front wall portion 156, and a bottom wall portion 158. Rear wall portion 154 lies on and is coplanar with upright wall portion 148. Indents 160 are formed in rear wall portion 154 and pin connector through holes 162 are centered in the indents 160 and receive pin connectors that engage wall portion 100 or wall portion 114. An upper wall section 164 extends upwardly and forwardly relative to an upright wall section 166 of the V-shaped front wall portion 156 of the catch 152. Disposed within the catch 152 are a set of three friction fit receivers 168 that are spaced apart from each other. The rear wall portion 154 of catch 152 extends from a location on the front face of upright wall portion 148 that is spaced from the perimeter 150 of the upright wall portion 148.

Figure 15:
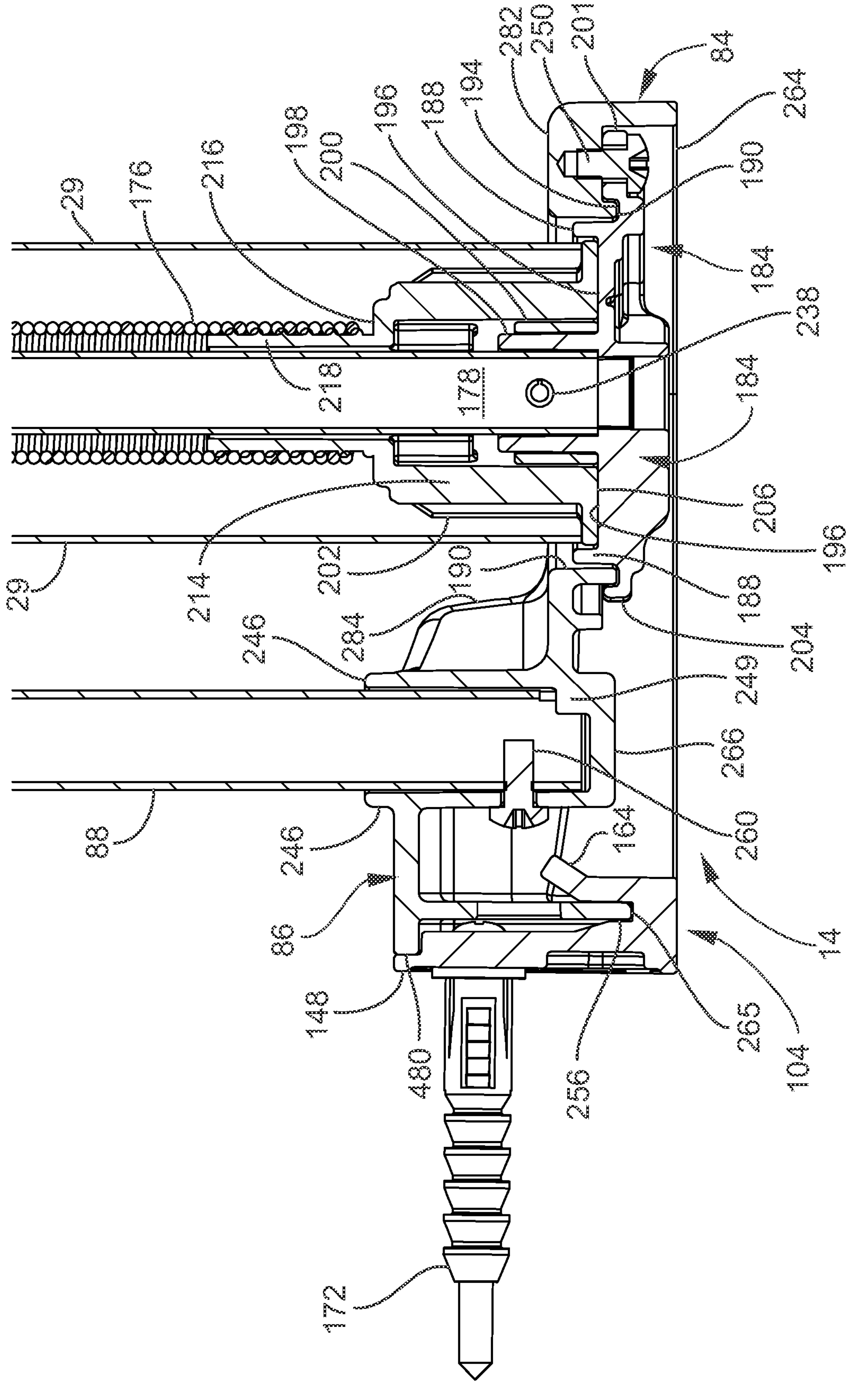
FIG. 15 is a section view of a lower portion of the spring assembly of the base of FIG. 11A.

FIG. 15 relates the lower wall connector or quick connect 104 of FIG. 7B to the foot 14. An inverted U-shaped front face edge portion 478 of upright wall portion 148 adjacent periphery 150 confronts a rear U-shaped edge 480 of foot 14 such that lower wall connector or quick connect 104 closes off an otherwise open end of foot 14 to minimize the entry therein of dirt, dust, and moisture. Except for upright wall portion 148, all other portions are disposed in the foot 14 when the lower wall connector or quick connect 104 closes off the open end of the foot 14 when the plate portion 256 is captured in the catch 152. Plate portion 256 is set forwardly of U-shaped edge 480 so as to be set inside of foot 14.

FIG. 8A shows the upper wall connector or quick connect 68. FIG. 8B shows the lower wall connector or quick connect 70. These upper and lower wall connectors 68, 70 engage the upper and lower handles or quick connects 48, 50 that are engaged to the distal end of the flexible barrier 20.

Figures 9A, 9B:
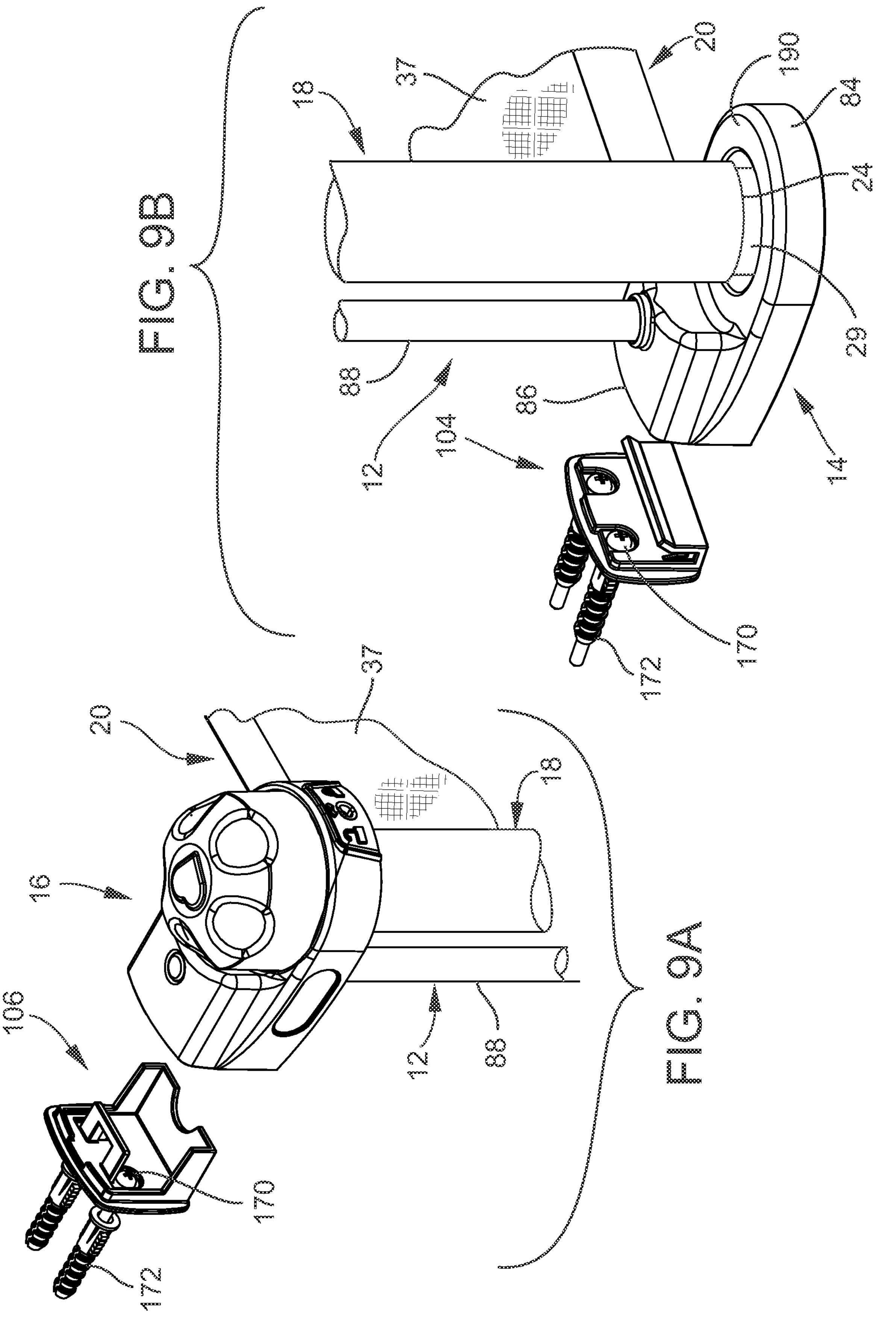
FIG. 9A is a perspective view of the upper wall connector or quick connect of FIG. 7A about to be engaged to the upper portion of the base of the retractable flexible gate of FIG. 2B, where such upper portion of the base also includes a quick connect.
FIG. 9B is a perspective view of the lower wall connector or quick connect of FIG. 7B about to be engaged to the lower portion of the base of the retractable flexible gate of FIG. 2B, where the lower portion of the base also includes a quick connect.

FIG. 9A shows the upper wall connector 106 in relation to the head 16. FIG. 9A shows pin connectors 170 engaging pin holes 124 and further engaging dry wall anchors 172 for being anchored in wall portion 100 or wall portion 114. Upper wall connector 106 engages a rear portion of the head 16.

FIG. 9B shows the lower wall connector 104 in relation to the foot 14. FIG. 9B shows pin connectors 170 engaging pin holes 162 and further engaging dry wall anchors 172 for being anchored in wall portion 100 or wall portion 114. Lower wall connector 104 engages a rear portion of foot 14.

FIG. 10A shows the upper handle 48 engaging the upper wall connector 68. FIG. 10B shows the lower handle 50 engaging the lower wall connector 70.

Figure 11C:
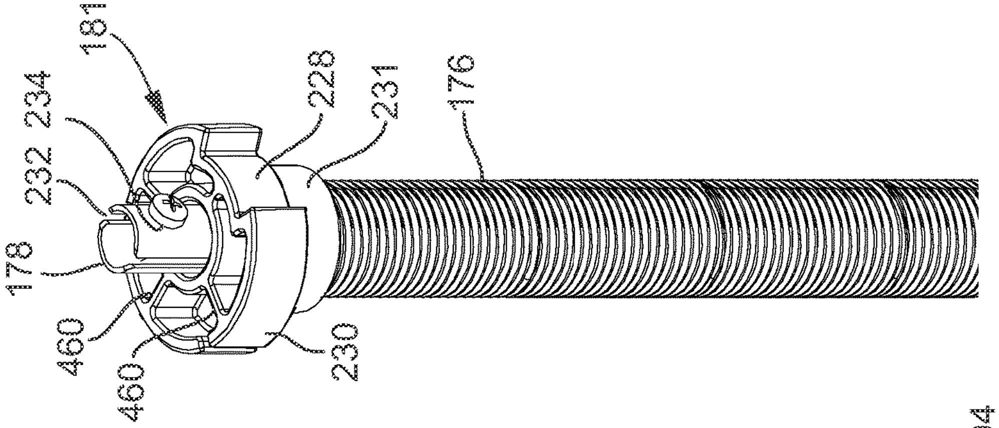
FIG. 11C is a detail perspective view of an upper portion of the spring assembly of the base of FIG. 11A.
Figure 11B:
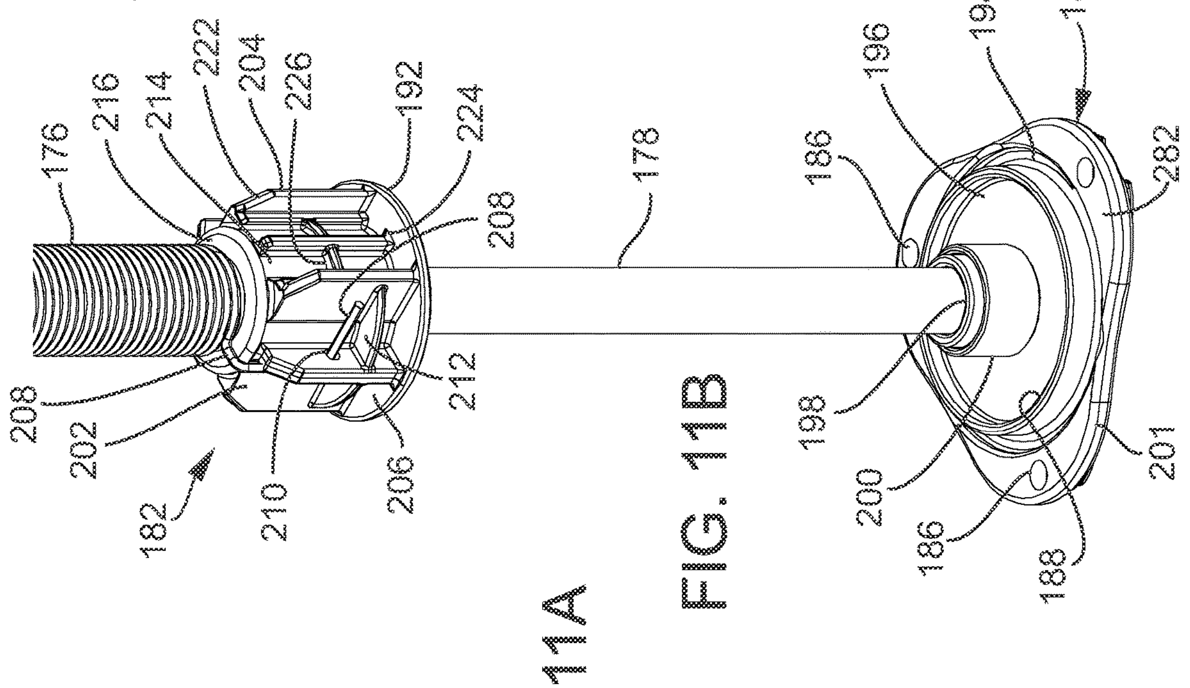
FIG. 11B is a detail perspective view of a lower portion of the spring assembly of the base of FIG. 11A.
Figure 11A:
FIG. 11A is a perspective view of the spring assembly of the base of the retractable flexible gate of FIG. 1.

FIG. 11A shows the spring assembly 174 prior to being primed. In other words, in the state shown in FIG. 11A, there is no tension in the coil spring 176 of the spring assembly 174. Along with the coil spring 176, spring assembly 174 includes a nonrotatable support tube 178 (unless wind up base 184 is disconnected from lower mount 84 of foot 14, where disconnection will lead to an intentional manual rotation of support tube 178 to increase or decrease spring pressure). Support tube 178 includes an upper end 179 shown in FIGS. 16, 17A, and 17B. The spring assembly 174 further includes a stabilizer 181, the entirety of which is disposed in metal tube 29. Stabilizer 181 is keyed to metal tube 29. When metal tube 29 rotates, the stabilizer 181 also rotates. The spring assembly 174 further includes a lower cap 182 engaged to a lower portion of the coil spring 178. At least a portion of the lower cap 182 is disposed in a lower end of metal tube 29. Most of the lower cap 182 is disposed in the lower end of the metal tube 29. FIG. 11A further shows wind up base 184. Wind up base 184 is engaged to the lower mount portion 84. Wind up base 184 integrally includes tube receptor 198, which in turn is rigidly affixed to support tube 178 by pin 238. Support tube 178 includes top integral tube portion 179 that is rigidly affixed to the top of coil spring 176. In other words, if wind up base 184 is disengaged from the lower mount portion 84 of foot 14, wind up base 184 spins under the bias or spring pressure of the coil spring 176 to spinningly return to a nontensioned state unless the metal tube 29 is manually held or the upper cap 183 of the spool portion 18 is locked by the head 16, its rotatable control knob 292, and the toothed structure 340. In still other words, to provide a given and unique pressure to the coil spring 176, wind up base 184 may be disengaged from foot 14 and turned clockwise or counter-clockwise to increase or decrease the pressure of the coil spring 176.

Figure 16:
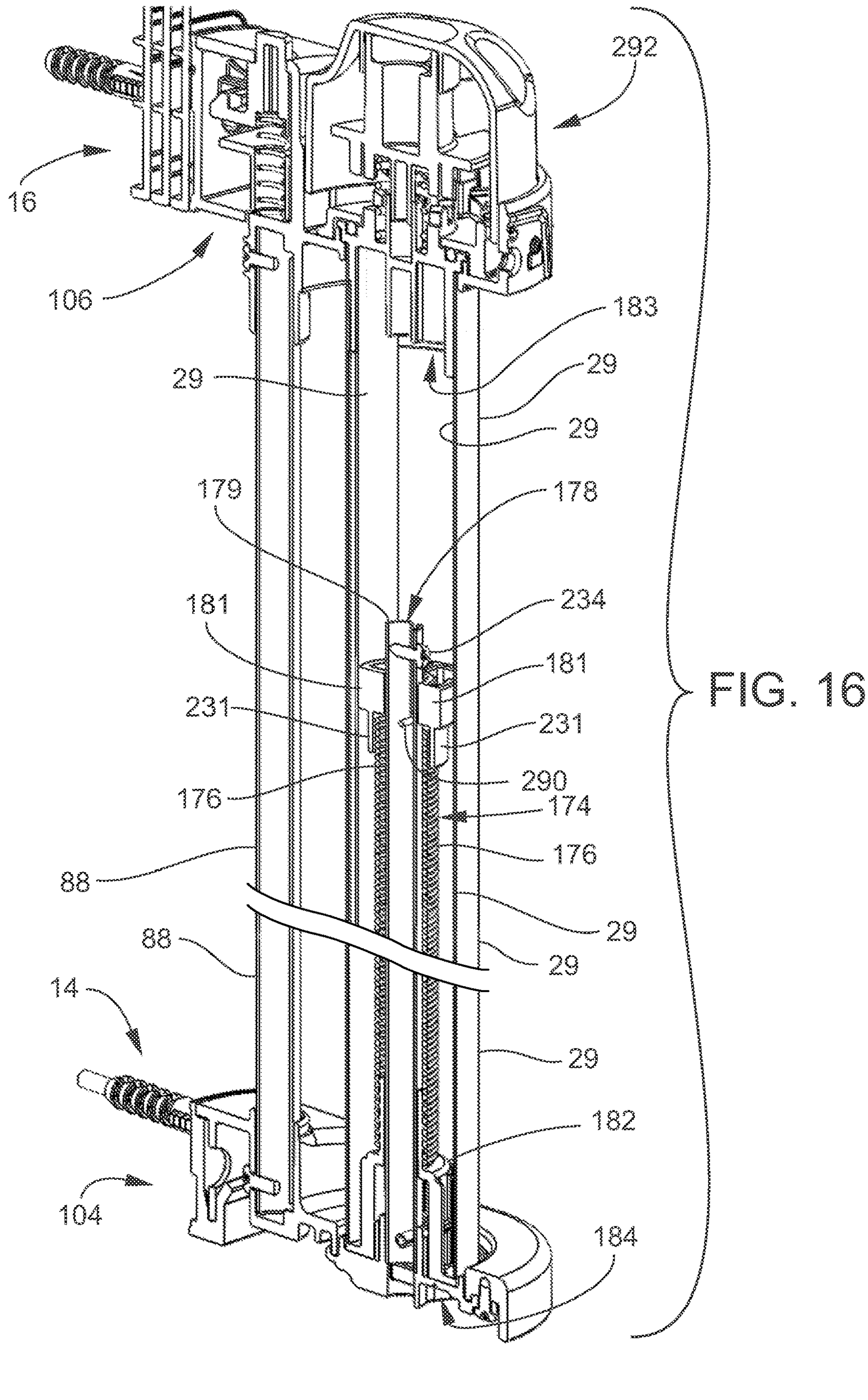
FIG. 16 is a section view of the base of the retractable flexible gate of FIG. 2A, where the foot is shown in section, where the head is shown in section, and where the spring assembly therebetween is shown in section.

What is seen in FIGS. 11A and 11C and referred to as stabilizer 181 is spaced from upper cap 183 as shown in FIG. 16. The upper cap 183 is keyed to the metal tube 29. When the metal tube 29 rotates, then the upper cap 183 also rotates. When the upper cap 183 rotates, then the metal tube 29 also rotates.

FIG. 11B shows the lower cap 182 and the wind up base 184 in greater detail. The wind up base 184 includes a set of three pin connector holes 186 for pin connectors 250 that engage the lower mount portion 84. Wind up base 184 further includes an annular retainer 188. Annular retainer 188 nestles immediately inside of a cylindrical inner surface of an annulus 190, shown in FIG. 15, of lower mount portion 84. Annular retainer 188 retains the lower portion of the metal tube 29 and further retains the circular outer edge 192 of the lower cap 182, which lower cap 182 is engaged inside of the lower portion of the metal tube 29. Wind up base 184 has a circular channel 194 that engages annulus 190 of the lower mount portion 84. Extending inwardly from annular retainer 188 of wind up base 184 is a flat circular floor 196. Floor 196 extends from annular retainer 188 to a cylindrical support tube receptor 198 that is integral with wind up base 184. Floor 196 is integral and one-piece with cylindrical support tube receptor 198 and wind up base 184. Cylindrical support tube receptor 198 extends upwardly from the floor 196. Cylindrical support tube receptor 198 is rigidly engaged to support tube 178 by pin 238 shown in FIG. 12A. A cylindrical retainer 200 rotatably surrounds the cylindrical support tube receptor 198 to retain pin 238 in tube receptor 198 and in support tube 178. The metal tube 29 and lower cap 182, that are rigidly engaged to each other, spin during spooling in and spooling out relative to the support tube 178, pin 238, cylindrical retainer 200, tube receptor 198, wind up base 184, lower mount portion 84, and foot 14. Cylindrical support tube receptor 198 has a greater height than cylindrical retainer 200. The bottom circular edge of cylindrical retainer 200 confronts, is adjacent to, and may be disposed on floor 196 of wind up base 184. FIG. 11B shows that wind up base 184 includes an undulating periphery 201.

Lower cap 182 has a set of outwardly projecting fins 202. Each of the fins 202 includes a vertically extending edge 204 that is set back slightly, about the distance of the thickness of the metal tube 29, from circular or perimeter edge 192 of a floor portion 206 of lower cap 182. Floor portion 206 is the only portion of lower cap 182 set outside of metal tube 29. The lower circular edge of metal tube 29 engages the upper face of floor portion 206 at the perimeter edge 192 such that the metal tube 29 rides on the floor or floor portion 206 of the lower cap 182. The vertically extending edge 204 engages the inner diametrical surface of the metal tube 29. Lower cap 182 is fixed in metal tube 29 by a friction fit with fins 202 and/or by an adhesive. Lower cap 182 rotates when metal tube 29 rotates. Coil spring 176 has a lower spring end 208 that engages lower cap 182 by engaging one of the fins 202 through a pin opening 210. Coil spring 176 drives a return of flexible barrier 20 from a spooled out state where the coil spring 176 has great tension to a spooled in state where the coil spring 176 has lesser tension. Lower cap 182 has horizontally extending brackets 212 between fins 202. Brackets 212 run parallel to floor portion 206. Lower cap 182 includes an inner cylindrical wall portion 214 that confronts cylindrical retainer 200 and is spaced from cylindrical tube receptor 198. Fins 202 extend outwardly from inner cylindrical wall portion 214. Inner cylindrical wall portion 214 rises integrally from floor portion 206, which floor portion 206 may be described as a foot that rides on floor 196 of wind up base 184 that is engaged to lower mount portion 84. Inner cylindrical wall portion 214 of lower cap 182 extends upwardly into a ceiling portion 216 of the lower cap 182, which ceiling portion 216 includes an opening for the support tube 178. On top of and integral with ceiling portion 216 and lower cap 182 is a threaded receptor 218, shown in FIG. 12A, for the lower end of the coil spring 176. The coil spring 176 is threaded onto threaded receptor 218 and is thereby mechanically engaged to threaded receptor 218 and lower cap 182 by the cooperating threads of threaded receptor 218 and coil spring 176 such that there is no rotation between the threaded receptor 218 and the lower portion of the coil spring 176 engaged to the threaded receptor 218 and its integral lower cap 182. Coil spring 176 may be glued to threaded receptor 218 if desired. Threaded receptor 218 includes a vertical opening 220 for receiving the support tube 178. Each of the fins 204 includes an edge 222 that tapers downwardly and outwardly that permits a guided insertion of the lower cap 182 into the metal tube 29 during assembly. Inner cylindrical wall portion 214 includes vertically extending ribs 224. Inner cylindrical wall portion 214 includes horizontally extending circular ribs 226 extending to and between a vertical rib 224 and an adjacent fin 202. Lower cap 182 includes a first set of fins 202 where two of the fins 202 in such set are coplanar and where such coplanar fins 202 are not radially extending fins 202, and where the third fin 202 in such set is a radially extending fin. Lower cap 182 includes a second set of fins 202 where two of the fins 202 in such set are coplanar and where such coplanar fins 202 are not radially extending fins 202, and where the third fin 202 in such second set is a radially extending fin 202 and is coplanar with the radially extending fin 202 of the first set.

FIG. 11C shows a portion of the keyed stabilizer 181 that stabilizes the upper end portion of the first nonrotatable support tube 178 and keeps the support tube 178 axially centered in the spool portion 18. Stabilizer 181 rotates when metal tube 29 rotates and thus is rotatable about the upper end portion of the support tube 178. Stabilizer 181 is fixed in or keyed to metal tube 29. Stabilizer 181 has a dovetail portion 228 that receives dovetail portion 33 of metal tube 29. This intermesh of dovetail portions 33 and 228 prevents rotation of the stabilizer 181 relative to the metal tube 29. Stabilizer 181 may, if desired, be rigidly or fixedly engaged in metal tube 29 such as by gluing. A cylindrical outer surface 230 of stabilizer 181 confronts, opposes, runs parallel to, is adjacent to the inner surface of metal tube 29, and may be fixedly engaged to the inner surface of metal tube 29 such as with glue. An integral cylindrical portion 231 depends from the main portion of the stabilizer 181 and has a lesser diameter than the outer cylindrical surface 230 of the main portion of stabilizer 181. A cylindrical inner surface of cylindrical portion 231 is spaced from and adjacent to the outer surfaces of the coil spring 176.

Figure 17B:
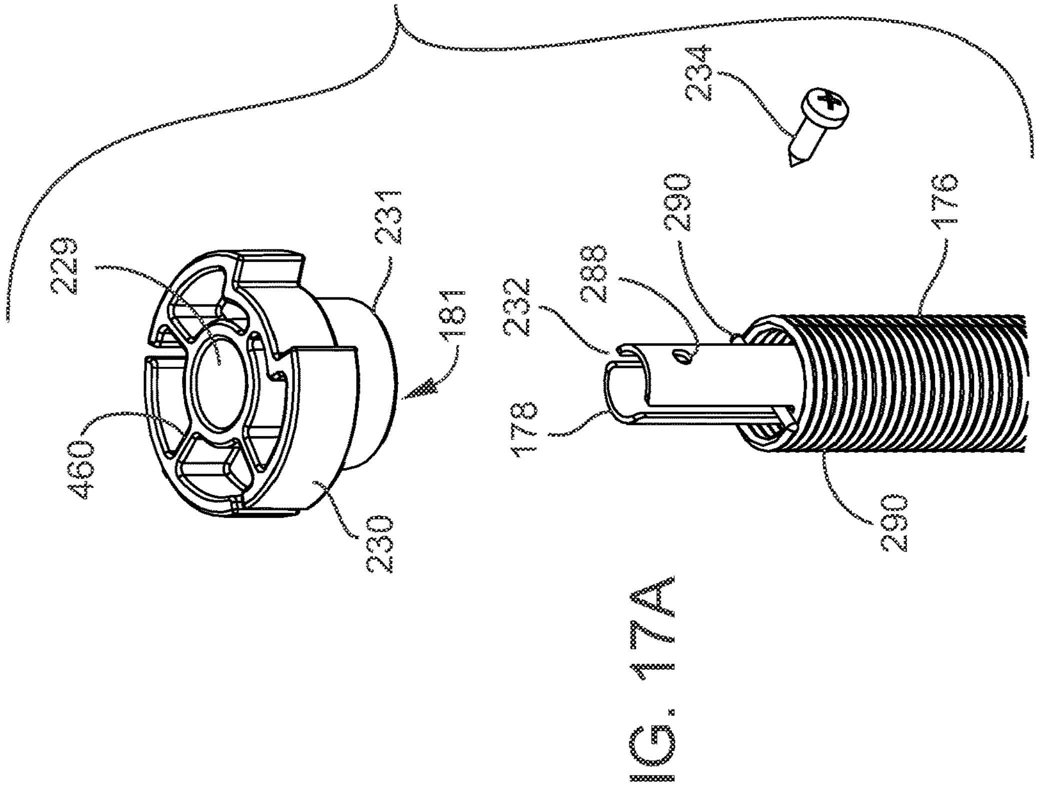
FIG. 17B is a detail exploded view of an upper portion of the spring assembly of the base of FIG. 11A.

FIG. 11C shows that the upper portion of support tube 178 includes diametrically opposing slots 232 that receive, as shown in FIG. 17B, an upper end of coil spring 176 such that coil spring 176 is fixed to the upper portion of support tube 178 and such that tension builds in coil spring 176 as the flexible barrier 20 is pulled out and thereby rotates the metal tube 29, an action which in turn rotates the lower cap 182, an action which in turn rotates the threaded receptor 218 of the lower cap 182, an action which rotates the portion of the coil spring 176 that is engaged to the threaded receptor 218, an action that rotates and twists the portions of the coil spring 176 that extend from immediately above the threaded receptor 218 to the top portion of the coil spring 176, an action that builds up tension in the coil spring 176, which twisting up is possible because the upper end of the coil spring 176 is fixed in slot 232 in the upper end of the support tube 178, which support tube 178 has a lower end that is fixedly engaged to wind up base 184, which wind up base 184 is fixedly engaged to lower mount portion 184 of foot 14. As the coil spring 176 is twisted up, the lower portion of the coil spring 176 above the threaded receptor 218 rotates to a greater degree than the middle portion of the coil spring 176, and the middle portion of the coil spring 176 rotates to a greater degree than the top portion of the coil spring 176, which top portion minimally rotates because an integral spring portion exits the top portion of the coil spring 176 to engage slots 232. A pin 234 engaged in the top portion of support tube 178 diametrically traverses the inner space of support tube 178 and is a retainer to keep the upper free end of the coil spring 176 in slots 232. Pin 234 may engage diametrically opposing portions of the top portion of the support tube 178.

Figure 12B:
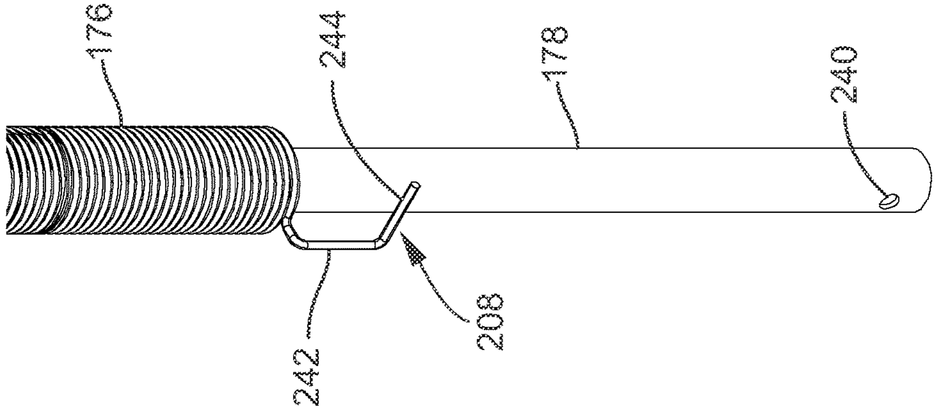
FIG. 12B is a detail perspective view of a lower portion of the spring assembly of the base of FIG. 11A.
Figure 12A:
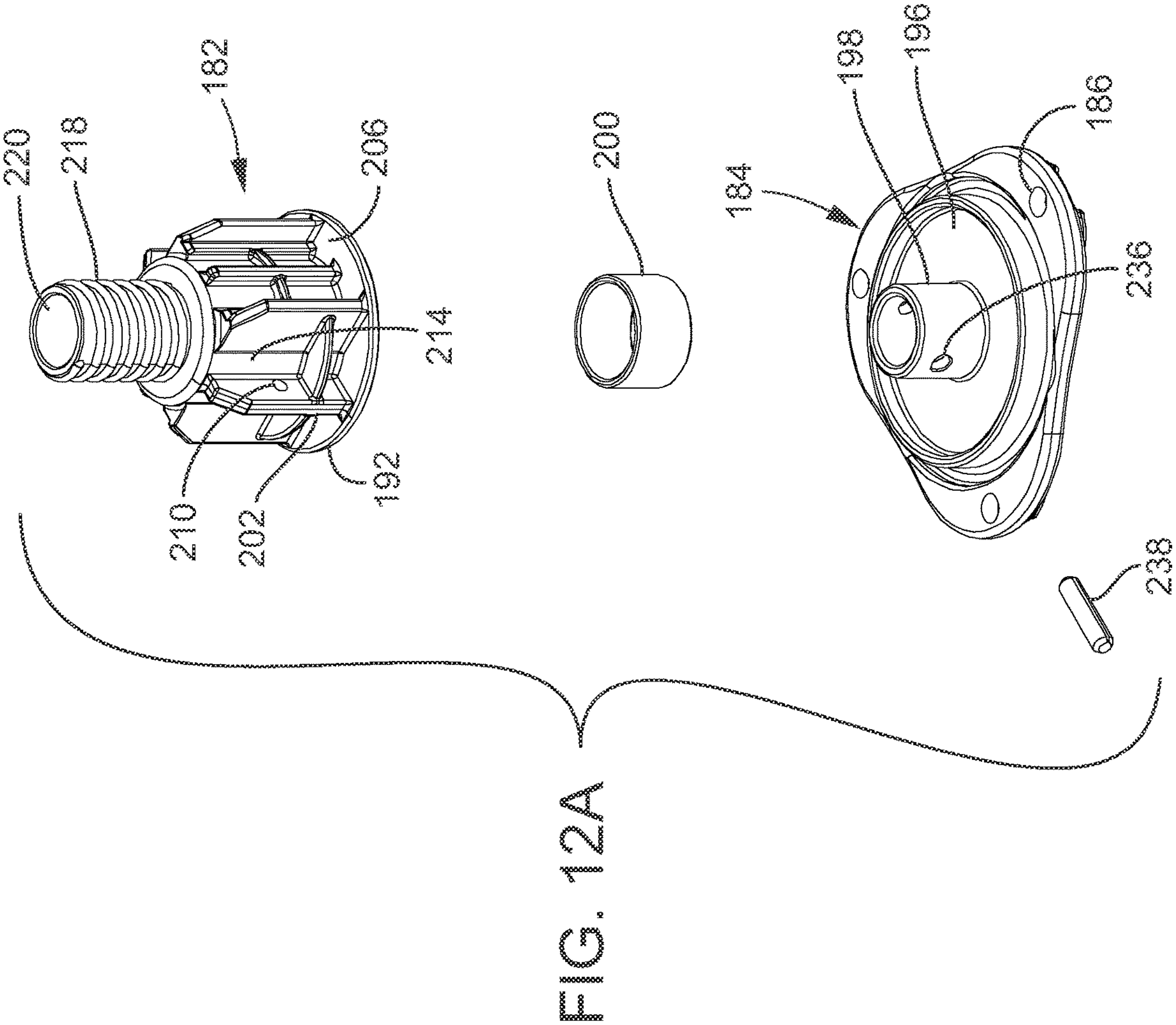
FIG. 12A is a detail perspective view of a lower portion of the spring assembly of the base of FIG. 11A.

FIG. 12A is an exploded perspective view of the lower cap 182, the cylindrical retainer 200, and the wind up base 184 engaged to the lower mount portion 84. With cylindrical retainer 200 removed, the support tube cylindrical receptor 198 of the wind up base 184 can be seen. Receptor 198 includes a pair of diametrically opposite pin holes 236 for the reception of a pin 238. Pin further engages diametrically opposing pinholes 240, shown in FIG. 12B, that are formed in the bottom portion of support tube 178. The length of pin 238 is about the distance of the outer diameter of support tube receptor 198 such that the cylindrical retainer 200 keeps the pin 238 engaged in pin holes 236, 240.

FIG. 12B shows that lower spring end 208 includes a vertical portion 242 and a horizontal portion 244. Vertical portion 242 confronts the face of one fin 202 and horizontal portion 244 engages pin hole 210 in the same fin 202. While spring end 208 may play a minor role in engaging the lower cap 182 and thus the metal tube 29 to the coil spring 176, the major engagement between the lower cap 182 and the coil spring 176 is the threaded receptor 218 threadably engaging the lower portion of the coil spring 176.

FIGS. 13A and 13B show an exploded view of wind up base 184, lower mount portion 84 and upper mount 86, lower cap 182, metal tube 29, and support tube 88. Upper mount portion 86 of foot 14 includes a receiver 246 for the bottom portion of the support tube 88. The bottom portion of the support tube 88 includes a notch 248 for receiving a tab 249 at the bottom of the receiver 246. Tab 249 is shown in FIG. 15. Locating the notch 248 in tab 249 places the support tube 88 in only one orientation and prevents rotation of support tube 88. Pin connectors 250 are used to engage the wind up base 184 to the lower mount portion 84.

Floor 196 of the wind-up base 184 through engagement with the underside 254 of lower cap 182 may take, support, or receive at least a portion of the weight of the spool portion 18 as the spool portion 18 rotates or is at rest. Upper cap 183 through engagement with head 16, its guide or retainer 358 shown in FIG. 25B, and ball bearings 332 may take, support, or receive at least another portion of the weight of spool portion 18 as the spool portion 18 rotates or is at rest.

Figure 14:
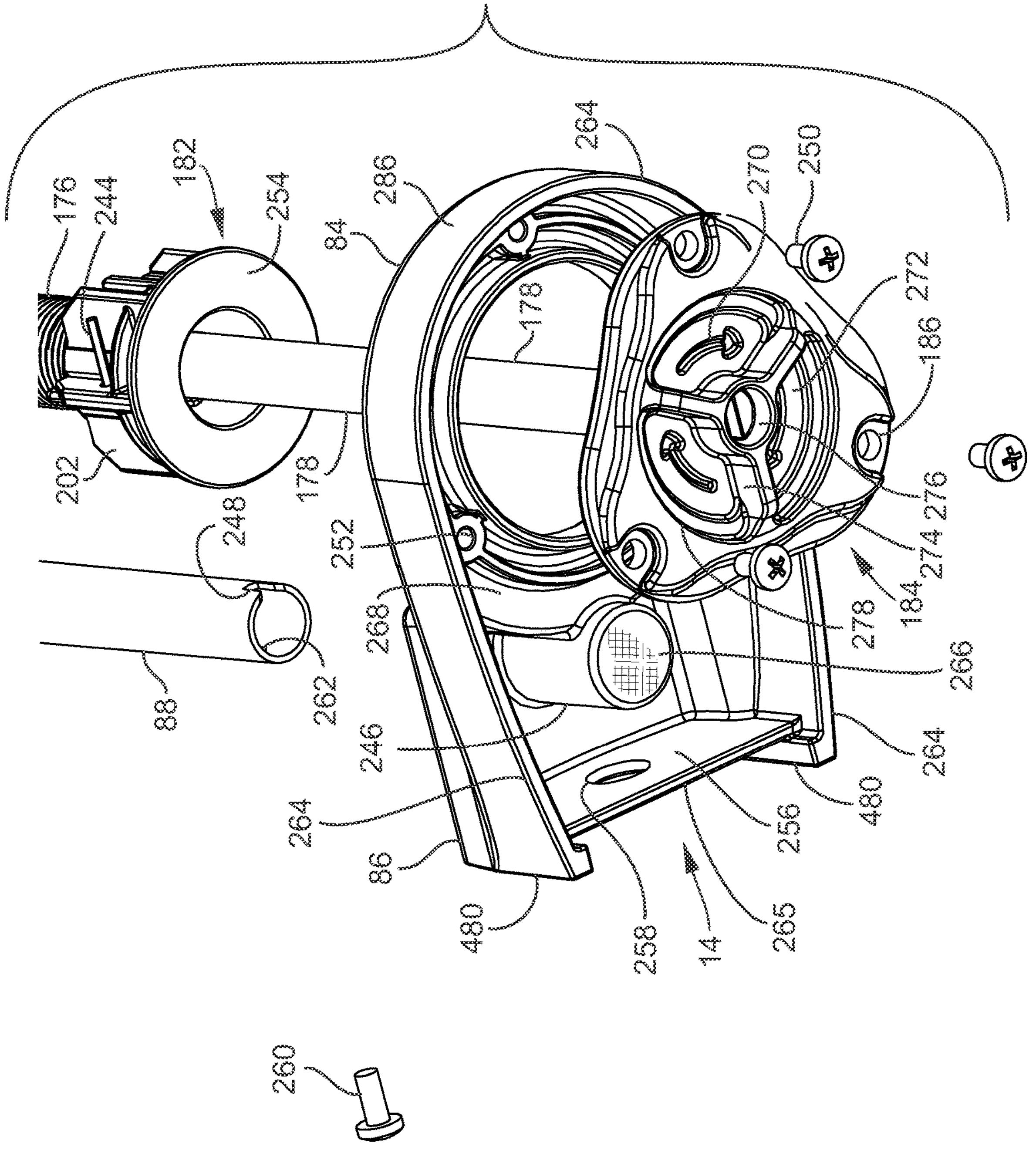
FIG. 14 is a detail perspective view of a lower portion of the spring assembly of the base of FIG. 11A.

FIG. 14 shows a bottom view of the wind up base 184, lower mount portion 84 of foot 14, upper mount portion 86 of foot 14, and lower cap 182. FIG. 14 shows that pin connectors 250 engage pin connector holes 186 formed in wind up base 184 and further engage threaded pin receptors or bosses 252 integral with the lower mount portion 84 of foot 14. Pin holes 186 are formed in indents in the underside of the wind up base 184.

FIG. 14 shows that lower cap 182 includes a flat smooth annular floor underside 254 in the shape of a wide band that confronts and spins on floor 196 of the wind up base 184 when the metal tube 29 spins. The metal tube 29, its lower cap 182 rigidly fixed therein, and the underside 254 of lower cap 182 spin when the flexible barrier 20 is spooled out or spooled in. The wide band shape of each of the floor 196 of wind up base 184 and underside 254 of the lower cap 182, and the substantially same width of both wide bands, are features that provides for a stable spinning or spooling of the metal tube 29. Wind up base 184 is normally stationary because it is engaged to lower mount portion 84 of foot 14. Metal tube 29 may be at rest in a nonspinning state or rest state or may be in a spinning state.

FIG. 14 shows that upper mount portion 86 includes a rear plate portion 256. Plate portion 256 extends vertically, with an axis parallel to support tube 88 and support tube 178. Plate portion 256 engages lower wall connector 104 by being vertically slid downwardly into friction fit receivers 168 or receiver plates 168 after being guided thereto by the inner tapered surface of front and tapered section 265. Plate portion 256 includes an access hole 258 for a screwdriver that drives a pin connector 260 into hole 262 found in the bottom portion of support tube 88. Pin connector 260 anchors the support tube 88 to the upper mount portion 86 of foot 14. As shown in FIG. 14 the bottom edge 265 of plate portion 256 is spaced from the floor and further spaced from a lowermost edge 264 such that when foot 14 rests upon a floor and the bottommost portion of lower wall connector 104 is also on such floor, the bottom edge 265 is fully received in receivers 168 when the lowermost edge 264 of foot 14 is on the floor. Lowermost edge 264 runs along bottommost portions of lower mount portion 84 of foot 14 and bottommost portions of upper mount portion 86. Lower mount portion 84, upper or higher mount portion 86, and wind up base 184 form foot 14. Wind up base 184 may be interpreted to be part of lower mount portion 84 and thus part of foot 14. With the exception of removable wind up base 184, lower mount portion 84 and upper mount portion 86 are integral and one-piece. Such is shown in FIG. 14.

FIG. 14 shows that support tube receiver 246 has a closed bottom 266 and is supported in part by curved interior wall 268 depending from the integral structure of lower and upper mounts portions 84, 86 of foot 14. Curved interior wall 268 may be integral with receiver 246 so as to provide support to receiver 246 or be abutting against receiver 246 so as to provide support to receiver 246.

Figure 2A:
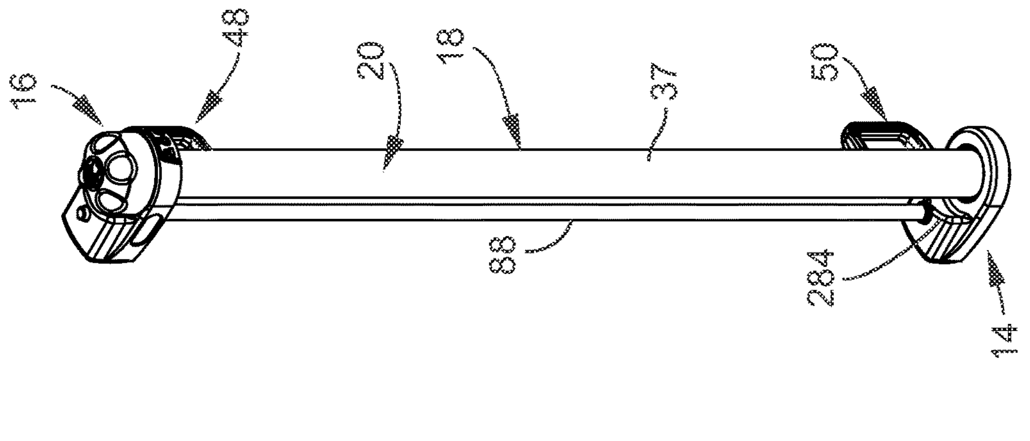
FIG. 2A is a perspective view of the retractable flexible gate of FIG. 1 where the flexible barrier has been completely spooled in and where the flexible barrier has yet to be pulled out, and in which position the flexible barrier may be locked or unlocked by the base.

During assembly, spool portion 18 is primed. That is it is wound up from having no tension, such as shown in FIG. 11A and FIG. 14, to a first state of tension, such as where spooling out has yet to begin and handles 48, 50 are adjacent to spool portion 18 and base 12 such as shown in FIG. 2A. Spool portion 18 is primed by turning the wind up base 184, prior to engagement to lower mount portion 84 of foot 14, in the direction of the set of three molded in arrow indents 270 shown in FIG. 14. This direction is clockwise when viewing the wind up base 184 from the bottom, as seen in FIG. 14. Wind up base 184 is turned clockwise, which is an action that turns the support tube receptor 198 clockwise, which is an action that turns pin 238 clockwise, which is an action that turns the bottom of support tube 178 clockwise, which is an action that turns the top 179 of support tube 178 clockwise, which is an action that turns slot 232 in the top of support tube 178 clockwise, which is an action that turns the top of coil spring 176 clockwise, which is an unsuccessful action that attempts to turn the bottom of the coil spring 176 clockwise, which action is unsuccessful because the bottom of the coil spring 176 is anchored to threaded receptor 218 of the lower cap 182 of the metal tube 29 which is held by the user or which is locked to the head 16 by the upper cap 183, fixed to the metal tube 29, being locked to the head 16, but which unsuccessful action builds up pressure in the coil spring 176 as the wind up base 184 is further wound up, until the desired coil spring pressure is obtained, whereby the wind up base 184 is engaged by pins 250 to lower mount portion 184 of foot 14. As indicated above, such unsuccessful action is unsuccessful because the bottom of the coil spring 176 is engaged to the threaded receptor 218, which is fixedly engaged to the lower cap 182, which is fixedly engaged to the metal tube 29, which is fixedly engaged to the upper cap 183, which is locked to the head 16. If the upper cap 183 is not locked to the head 16, the metal tube 29 may be held by a user when turning the wind up base 184. FIG. 14 shows that wind up base 184 includes three generally dovetailed indents 272, and the arrow indent 270 is within each of the generally dovetailed indents 272. Two adjacent generally dovetailed indents 272 are separated by a rib 274. The ribs 274 provide a push bar for the fingers to rotate the wind up base 184. The ribs 274 extend from a shared ring or annular structure 276 that is integral with the wind up base 184. Annular structure 276 is coaxial with circular outer walls 278 that define in part the generally dovetailed indents 272.

FIG. 15 shows wall connector 104 engaging plate portion 256 of the upper mount portion 86. Figurer 15 shows that, just like head 16 receives substantially the entirety of upper wall connector or quick connect 106 into an interior portion of head 16, foot 14 receives substantially the entirety of lower wall connector or quick connect 104 into an interior portion of foot 14.

FIG. 15 shows the support tube receptor 246 of upper mount portion 86 engaging the support tube 88. FIG. 15 shows tab 249 engaging support tube 88. FIG. 15 shows pin connector 260 engaging support tube 88.

FIGS. 11B and 15 show that the undulating periphery 201 of wind up base 184 and annular retainer 188 form channel 194 at three locations where the undulating periphery 201 undulates to and away from channel 194. Where periphery 201 undulates away from annular retainer 188, three ears 282 are formed to provide platforms for the pin holes 186.

FIG. 15 and FIGS. 13A and 13B show that upper mount portion 86 includes a curved sidewall 284. Curved sidewall 284 confronts the spool portion 18 as shown in FIG. 2A. Curved sidewall 284 is concentric or coaxial with a ring or ring like body 286 of lower mount portion 84. Ring or ring like body 286 of lower mount portion 84 is shown in FIG. 13B. Whereas lower mount portion 84 is ring or ring like, upper mount portion 86 is box shaped or box like.

FIG. 16 shows the metal support tube 29 and support tube 88 between the foot 14 and head 16. FIG. 16 shows that the stabilizer 181 and spring assembly 174, positioned inside of metal tube 29, are spaced vertically from the keyed upper cap 183, which is keyed or fixed to and rotatable with the metal tube 29. Operation of the retractable flexible gate apparatus 10 may be understood from FIG. 16. When flexible barrier 20 is pulled out from, for example, the position shown in FIG. 2A, the handles or quick connects 48, 50 pull on the distal end of the flexible barrier 20. The pulling out of the flexible barrier 20, through friction fit, and through the proximal end of the flexible barrier 20 being engaged in the axially extending vertical slot 31 formed in metal tube 29, begin to rotate the metal tube 29. As the metal tube 29 is turned, the lower cap 182 that is fixed to the metal tube 29 also begins to turn. As the lower cap 182 begins to turn, the threaded receptor 218, which is integral with lower cap 182, also begins to turn. As the threaded receptor 218 begins to turn, the lower end of the coil spring 176, fixed to receptor 218, also begins to turn, and then the middle portion of the coil spring 176 begins to turn, and then the top portion of the coil spring 176 begins to turn. However, the top portion of the coil spring 176 cannot turn as fully because the top portion of the coil spring 176 is fixed to the tope end portion of the stationary support tube 178, which bottom portion is in turn fixed to the stationary wind up portion 184 that is in turn fixed to the stationary foot 14. Thus, as the flexible barrier 20 is further pulled out and as the metal tube 29 further keeps turning, the bottom end of the coil spring 176 also keeps turning and keeps building up pressure in the coil spring 176 because the very top end of the coil spring 176 cannot turn. Then the handles or quick connects 48, 50 are engaged to wall connectors or quick connects 68, 70 to close off a passageway to stop the twisting up of the coil spring 176 and to stop the building up of pressure in the coil spring 176. At this time, the rotating control knob 292 is turned to lock the upper cap 183 of the metal tube 29 relative to the head 16. This locks the metal tube 29 as a whole such that there are two safeguards against the flexible barrier returning to a spooled up state, with the first safeguard being the engagement between handles 48, 50 and wall connectors 68, 70 and with the second safeguard being the locked engagement between the upper cap 183 of the metal tube 29 and the head 16. Then, to open the passageway, handles or quick connects 48, 50 are disengaged from the wall connectors or quick connects 68, 70 and the rotating control knob 292 is turned to unlock the upper cap 183 relative to the head 16, an action that unlocks the metal tube 29, whereupon the pressure in the coil spring 176 is relieved and the coil spring 176 begins to automatically untwist in the direction opposite to the direction of twist when the flexible barrier 20 was being drawn out to close off the passageway. As the coil spring 176 automatically begins to untwist, the bottom end of the coil spring 176 rotates the lower cap 182 that in turn rotates the metal tube 29 to draw in the flexible barrier 20 until the handles or quick connects 48, 50 are stopped or engaged by the head 16 and foot 14 respectively. At this point, if desired, the rotatable control knob 292 may be turned to lock the keyed upper cap 183 and thus metal tube 29 against rotating relative to the head 16.

Figure 17A:
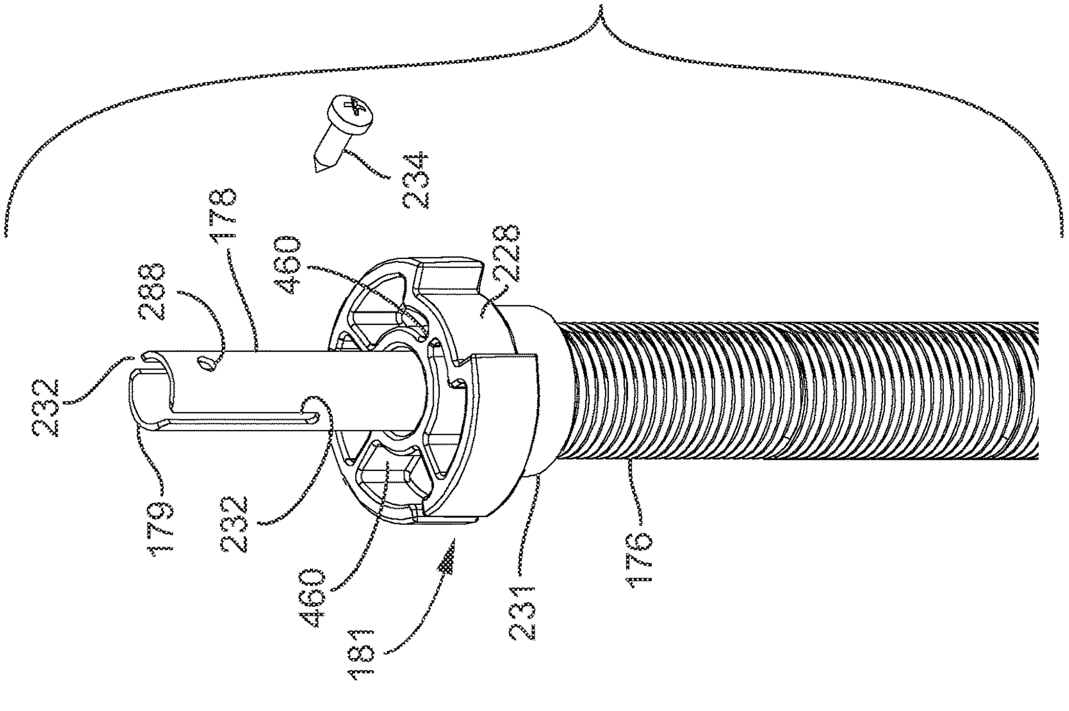
FIG. 17A is a detail perspective view of an upper portion of the spring assembly of the base of FIG. 11A.

FIG. 17A shows the full length of one of the diametrically opposed slots 232. FIG. 17A shows the pin hole 288 engaged by the pin 234 that retains stabilizer 181 on the nonrotatable support tube 178. FIG. 17B shows the upper straight end 290 of coil spring 176 in the bottoms or seats of slots 232. FIGS. 17A and 17B show the upper end of the spring assembly 174 prior to final assembly. FIG. 16 shows the assembled state of the upper end of the spring assembly 174. Cylinder portion 231 of stabilizer 181 confronts coil spring 176. Cylinder portion 229 of stabilizer 181 confronts tube 178.

Figure 18A:
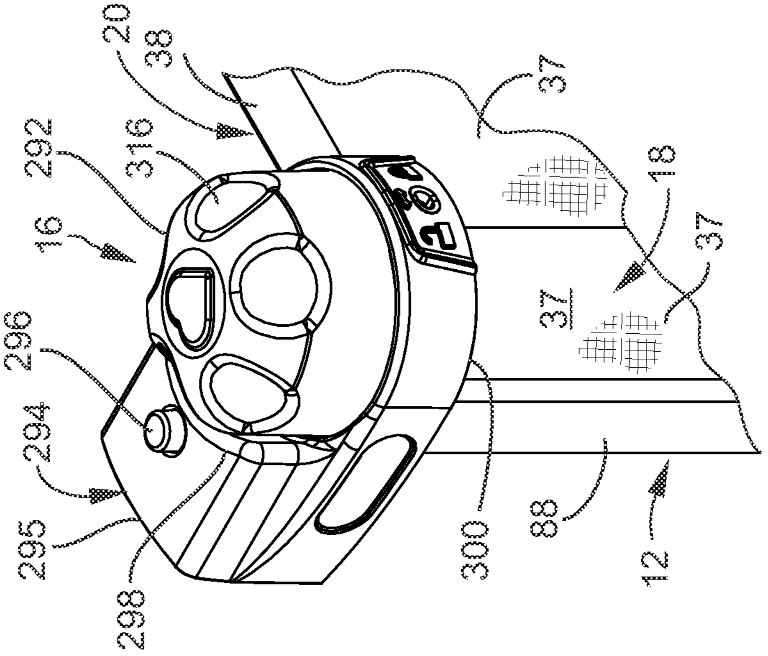
FIG. 18A is a detail view of the head of the base of the retractable flexible gate of FIG. 2B.

FIGS. 18A and 18B show a perspective view of the head 16 of the base 12. Head 16 includes a rotating control knob 292 that is set in a housing portion 294. Housing portion 294 includes a rear housing portion 295. The rear housing portion 295 is disposed to the rear of the rotating control knob 292 and houses a button 296 that is pressed to disengage the head 16 from upper wall connector 106. Rear housing portion 295 includes a front curved sidewall 298 that opposes, is adjacent to, is spaced from, and confronts the rotating control knob 292. Rear housing portion 295 engages support tube 88. Support tube 88 assists in supporting rear housing portion 295, housing portion 294, and head 16 as a whole and metal tube 29 through upper cap 183 also assists in such support of head 16. Metal tube 29 offers such support when rotating and nonrotating.

Housing portion 294 includes an integral U-shaped section 300 that extends forwardly of the rear housing portion 295 and surrounds a bottom portion of the rotating control knob 292. U-shaped section 300 includes three insignia indents 302, 304, 306. Indent 302 is formed in the shape of an open padlock. Indent 304 is formed in the shape of a closed or locked padlock. Indent 306 is formed in the shape of a double arrow, i.e., an arrow having an arrowhead at each end instead of having an arrowhead at one end and feathers at the opposite end. U-shaped section 300 further includes a window 308 that permits the user of the retractable flexible gate 10 to see inside of the head 16.

FIG. 18B shows support tube 88 disengaged from head 16 to show a notch or open ended slot 310 in a top portion of the support tube 88. Notch or slot 310 engages tab 448 of a support tube cylindrical receiver 312 shown in FIG. 25A to minimize rotation of the support tube 88. FIG. 18B shows support tube cylindrical receiver 312 depending from rear housing portion 295.

FIG. 18B shows the upper cap 183 depending from head 16. Upper cap 183 includes dovetail portion 228. Dovetail structure 314, that forms the dovetail receptor 33 for the proximal edge of the flexible barrier 20, locks into the dovetail receptor 228 of the upper cap 183 such that when metal tube 29 rotates then upper cap 183 also rotates and such that when upper cap 183 rotates then metal tube 29 also rotates. Upper cap 183 fits inside of metal tube 29, is insertable therein, and may be engaged therein by friction fit or with adhesive.

FIGS. 18A and 18B show that rotating control knob 292 includes a set of generally circular concave depressions 316 formed in a top portion of the rotating control knob 292. The centers of the concave depressions 316 define a circle. The concave depressions 316 assist in a manual gripping of the rotating control knob 292 by the fingers of a user.

FIGS. 18A and 18B show that rotating control knob 292 includes a cylindrical portion 318 and a dome shaped portion 320 on top of the cylindrical portion 318. Concave depressions 316 are formed partially in the cylindrical portion 318 and partially in the dome shaped portion 320.

Figure 19:
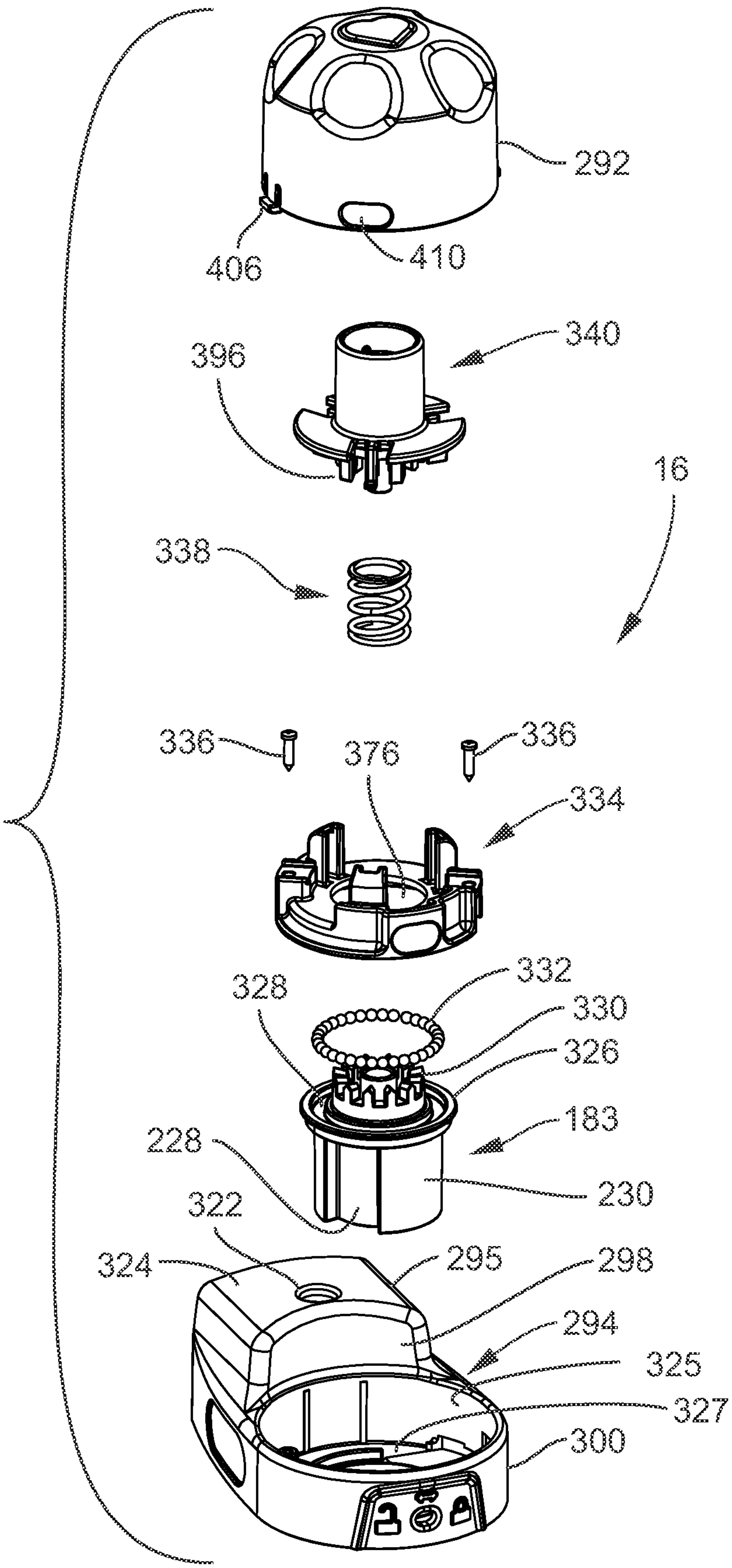
FIG. 19 is an exploded view of a portion of the head of FIG. 18A.

FIG. 19 is an exploded view of the head 16. At the bottom of the exploded view, housing portion 294 is shown. Rear housing portion 295 includes an opening 322 in a ceiling 324 of the rear housing portion 295. Opening 322 receives depressible button 296 for disengagement of the head 16 from the upper wall connector or quick connect 106. Housing portion 294 includes the exterior U-shaped sidewall portion 300. Interiorly, housing portion 294 includes an interior annular sidewall 325 and an annular floor portion 327.

FIG. 19 shows the upper cap 183 above the housing portion 294. Upper cap 183 engages the upper end of metal tube 29. Upper cap 183 spins relative to a multi-purpose structure 334, with a set of ball bearings 332 engaged between the upper cap 183 and multi-purpose structure 334. In turn, multi-purpose structure 334 is anchored to the housing portion 294 with pin connectors 336. In other words, the load of the head 16 is transferred from the housing portion 294 to the multi-purpose structure 334 to the ball bearings 332 to the upper cap 183 to the metal tube 29.

Figure 25B:
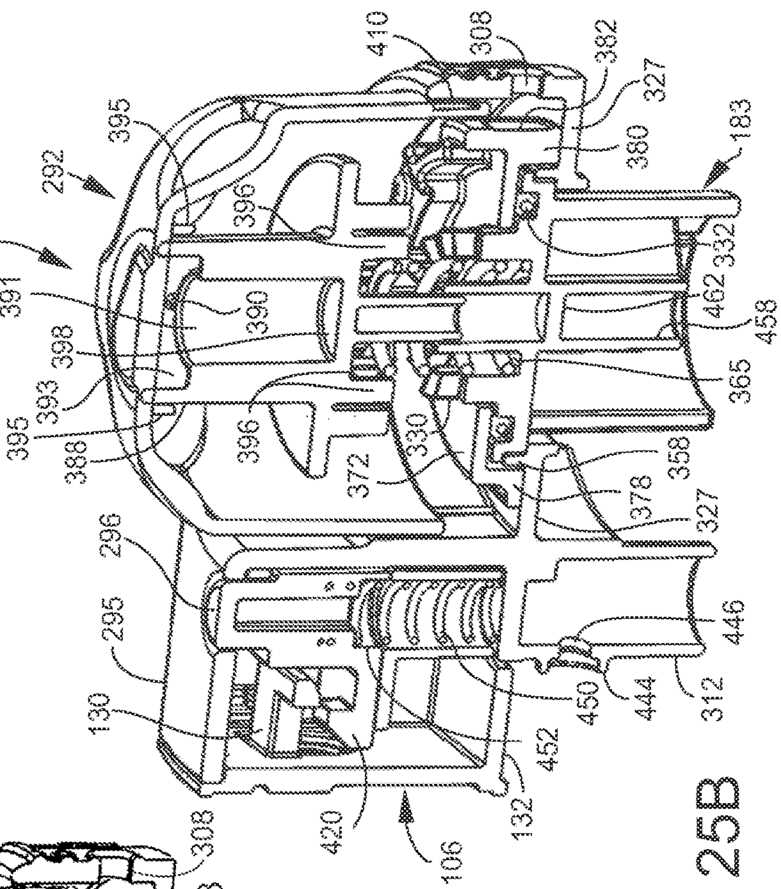
FIG. 25B is a section perspective view of the head of FIG. 24A being disengaged from a portion of the upper wall connector or quick connect of FIG. 7A.

Upper cap 183 includes a peripheral annular integral lip 326 extending outwardly from the outer cylindrical surface 230. Peripheral annular integral lip 326 engages a curved guide or retainer 358 of the housing portion 294 as shown in FIG. 25B. Such engagement is a rotatable engagement that allows the upper cap 183 and metal tube 29 to rotate relative to the floor 327 of the housing portion 294 of the head 16. Upper cap 183 includes an annular channel 328 formed inwardly of the annular lip 326. Upper cap 183 includes a set of annularly arranged teeth 330 extending upwardly beyond the height of the annular lip 326. Lip 326 and teeth 330 are integral with upper cap 183. Teeth 330 participate in locking and unlocking the spooling in and spooling out of the flexible barrier 20. Adjacent teeth 330 are spaced apart and engage teeth 396 of the toothed structure 340, which also participate in the locking and unlocking of the spooling in and spooling out of the flexible barrier 20.

FIG. 19 shows a set of individual ball bearings 332 above the upper cap 183. The individual ball bearings spin and rotate freely in annular channel 328.

FIG. 19 shows the intermediate multi-purpose structure 334 immediately above the ball bearings 332. Multi-purpose structure 334 includes an opening 376 defined by circular edge 374, shown in FIG. 21A, which retains upper cap 183 by confronting cylindrical base 360 shown in FIG. 20B of upper cap 183 when upper cap 183 rotates or is at rest. Circular guide or retainer 358 of floor 327 of housing portion 294 further retains upper cap 183 when upper cap 183 rotates or is at rest. Multi-purpose structure 334 fits within the annular sidewall 325 of the housing portion 294 and immediately adjacent to circular guide or retainer 358 of the main housing portion 294. The multi-purpose structure 334 acts as a retainer to the rotating upper cap 183, seals the ball bearings 332 in the channel 328, provides a color code to the locking and unlocking of the head 16, and participates in guiding up and down movement of the rotatable control knob 292.

FIG. 19 shows pins 336 immediately above the multi-purpose structure 334. Pins 336 engage the multi-purpose structure 334 to the floor portion 327 of the housing portion 294.

FIG. 19 shows a coil spring 338 immediately above the pins 336. The base for the coil spring 338 is a portion of the upper cap 183 between the annularly arranged teeth 330 and annulus 362, shown in FIG. 20B. Coil spring 338 biases teeth 330 and 396 apart and further biases rotating control knob 292 in the upwardly direction such that the rotating control knob 292 can either lock teeth 330 and 396 together or permit teeth 330 and 396 to remain apart, depending on whether rotating control knob tab 406 abuts the upper edge of window 344, 346, or 348.

FIG. 19 shows a toothed structure 340 that engages the teeth 330 of the upper cap 183 in a locking and unlocking function to lock and unlock a spooling in and spooling out of the flexible barrier 20. Toothed structure 340 also engages multi-purpose structure 334. Toothed structure 340 also presses the coil spring 338 downwardly against the upper cap 183 in an annular channel immediately inwardly of the annularly arranged teeth 330. Such annular channel is disposed between teeth 330 and annulus 362.

FIG. 19 shows rotatable control knob 292 immediately above the toothed structure 340. Rotatable control knob 292 includes a tab 406 for interacting with windows 344, 346, 348 of the housing portion 294 and a color coded section 410 that at times is visible through window 308.

Figure 20B:
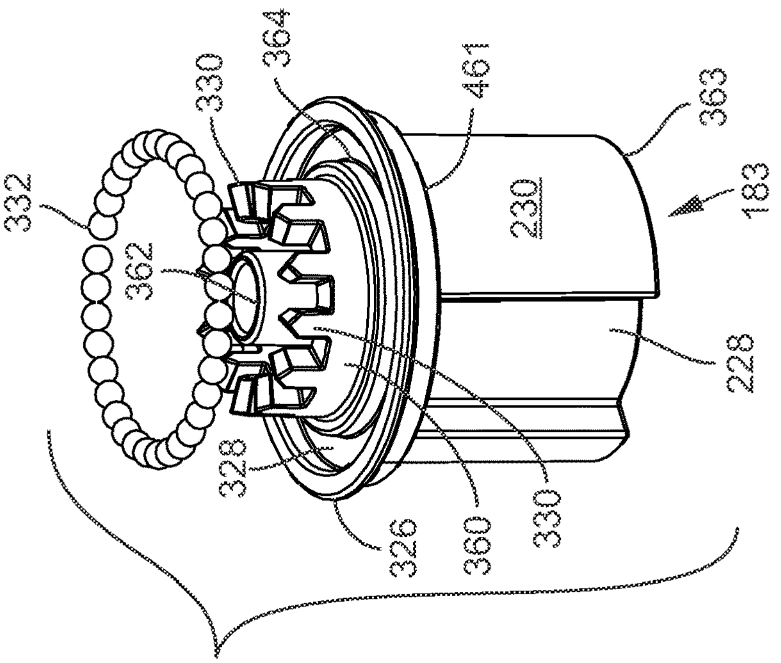
FIG. 20B is a detailed view of the upper cap portion and ball bearing portion of the head of FIG. 19.
Figure 20A:
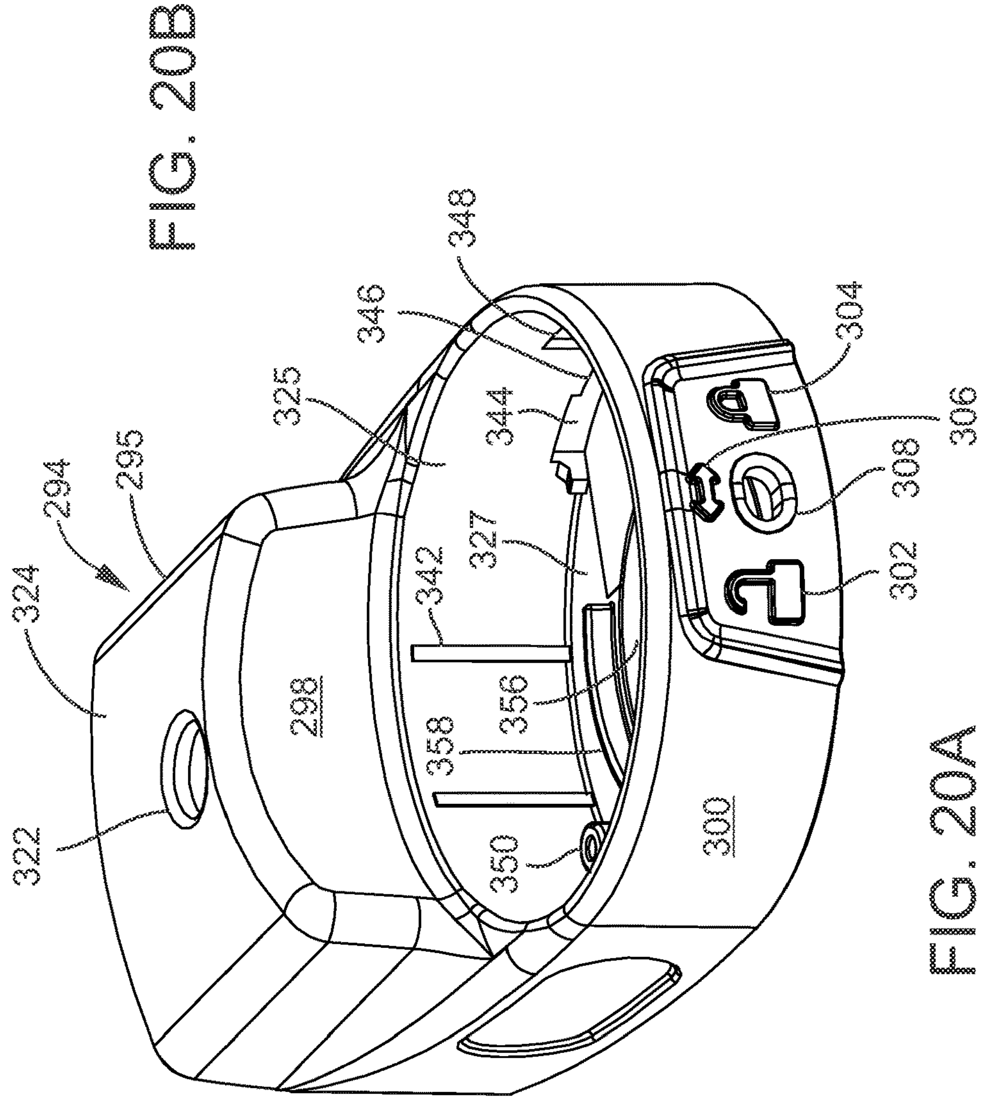
FIG. 20A is a detailed view of the housing portion of the head of FIG. 19.

FIG. 20A is a larger view of the housing portion 294 than is shown in FIG. 19. FIG. 20A shows a first pair of ribs 342 extending inwardly and vertically from the bottom of the annular sidewall 325 to terminate at a location adjacent to and spaced from the top of the annular sidewall 325. A second pair of ribs 342 are found diametrically opposite of the first pair of ribs 342, with the second pair of ribs 342 also extending inwardly and vertically from the annular sidewall 325. Ribs 342 protrude minimally inwardly and engage the rotatable control knob 292 to minimize a wobble of the rotatable control knob 292 in the main housing portion 294.

Figure 22B:
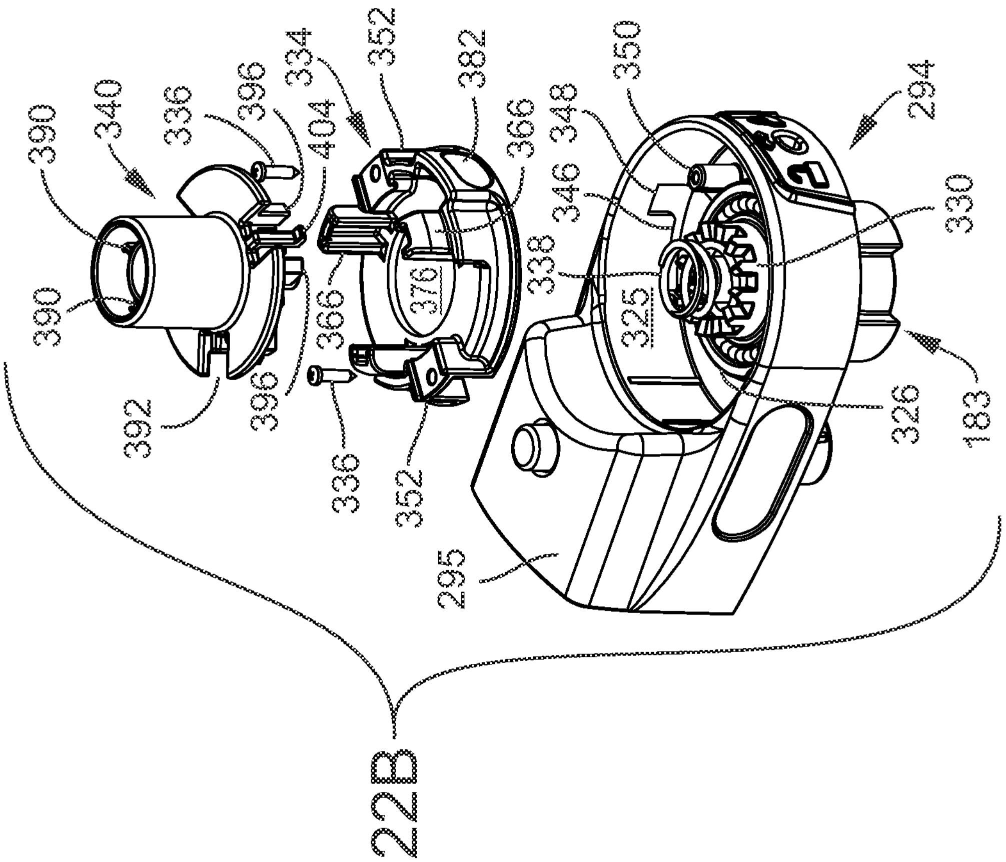
FIG. 22B is a detail exploded view of the assembled portion of the head of FIG. 22A.

FIG. 20A shows a first opening 344 formed in the annular sidewall 325. First opening 344 is open at the bottom of the annular sidewall 325 and has a first height. First opening 344 communicates with a second opening 346 that has a second height less than the first height of the first opening 344. Second opening 346 communicates with a third opening 348 that has a third height greater than the first and second heights of the first and second openings 344, 346. First, second, and third openings 344, 346, and 348 rise from what otherwise would be the bottom of inner annular sidewall 325. First, second, and third openings 344, 346, 348 extend only through interior annular sidewall 325 and do not extend through the U-shaped exterior sidewall 300. First, second, and third openings 344, 346, 348 are rectangularly shaped. First, second, and third openings 344, 346, 348 are paired with identical openings in the interior annular sidewall 325 diametrically opposite of the first, second, and third openings 344, 346, and 348. Windows 346, 348 are also shown in FIG. 22B.

FIG. 20A shows a first boss 350 that extends upwardly from floor portion 327. Housing portion 294 includes a diametrically opposite second boss 350 that is shown in FIG. 22B. First and second bosses 350 engage boss receptors 352 of multi-purpose structure 334, and pin holes 354 in boss receptors 352 line up with the pin holes in first and second bosses 350, all of which engage pin connectors 336. With pin connectors 336 and bosses 350, the housing portion 294 fixedly engages the multi-purpose structure 334.

FIG. 20A shows that floor portion 327 includes an opening 356 defined by a circular floor edge. Opening 356 receives the upper cap 183 and includes a diameter slightly greater than the diameter of cylindrical surface 230 of upper cap 183 such that upper cap 183 rotates in the opening 356. Floor portion 327 includes an upwardly extending curved guide 358 that is coaxial with opening 356 and set back outwardly slightly from the circular floor edge that defines opening 356. Annular peripheral edge or lip 326 of upper cap 183 rides on the curved guide 358 as shown in FIG. 25B.

Figure 25A:
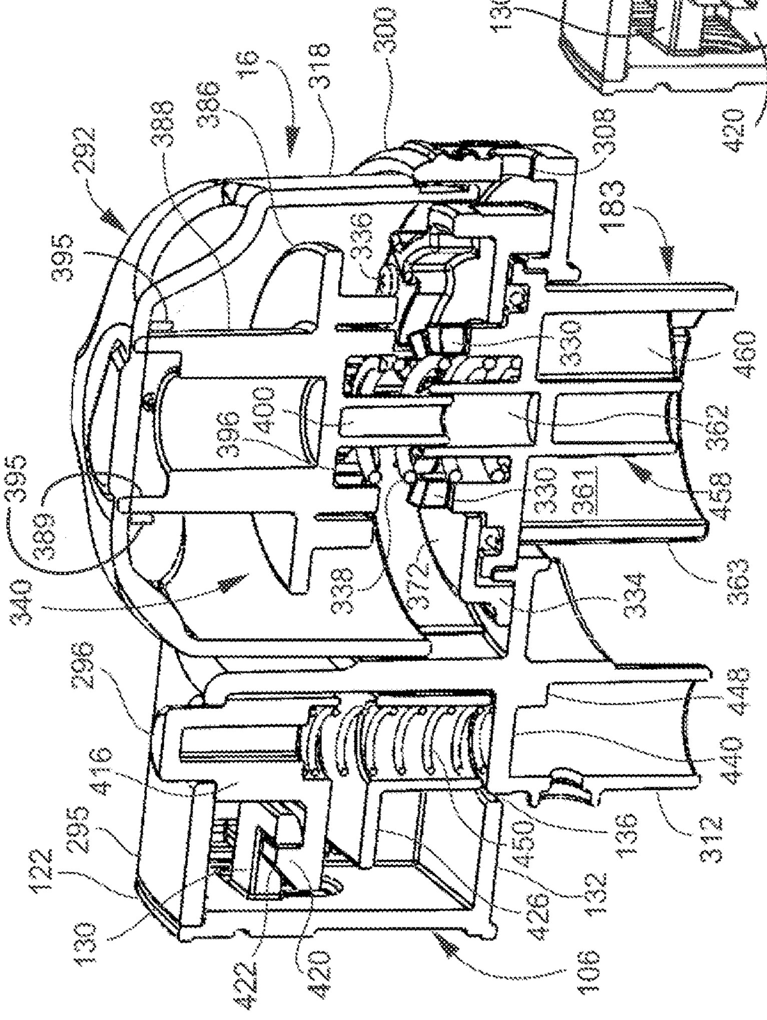
FIG. 25A is a section perspective view of the head of FIG. 24A engaging a portion of the upper wall connector or quick connect of FIG. 7A.

FIG. 20B shows a larger view of the upper cap 183 than is shown in FIG. 19. The channel or seat 328 for the ball bearings 332 is disposed between the periphery 326 and the set of annularly arranged teeth 330. Teeth 330 project upwardly from a cylindrical base 360 that is integral with upper cap 183 and teeth 330. Each tooth 330 is spaced apart from two adjacent teeth 330. More particularly, a vertical sidewall of one tooth 330 is spaced apart from a vertical sidewall of an adjacent tooth 330. Each of the teeth 330 includes an apex and two top portions tapering downwardly from the apex to the vertical sidewalls or vertically extending sides that then extend vertically downwardly to cylindrical base 360. Disposed within the set of annularly arranged teeth 330 is an open tube portion 362 or annulus 362. Cylindrical base 360 itself is set upon an integral cylindrical sub-base 364 that has a greater diameter than cylindrical base 360. Channel or ball bearing seat 328 is formed by and between sub-base 364 and perimeter or periphery 326. Between the tube portion 362 and the annularly arranged teeth 330 is a channel 365 that has a bottom at the same altitude as channel or ball bearing seat 328. Channel 365 can be seen in FIG. 25B. Channel 365 receives a lower end of the coil spring 338. An upper end of the coil spring 338 is engaged by toothed structure 340. It should be noted that outer cylindrical surface 230 is on a cylindrical portion 363 of the upper cap 183 that is inserted into metal tube 29. As shown in FIG. 25A, cylindrical portion 363 includes an inner cylindrical surface 361.

Figure 21B:
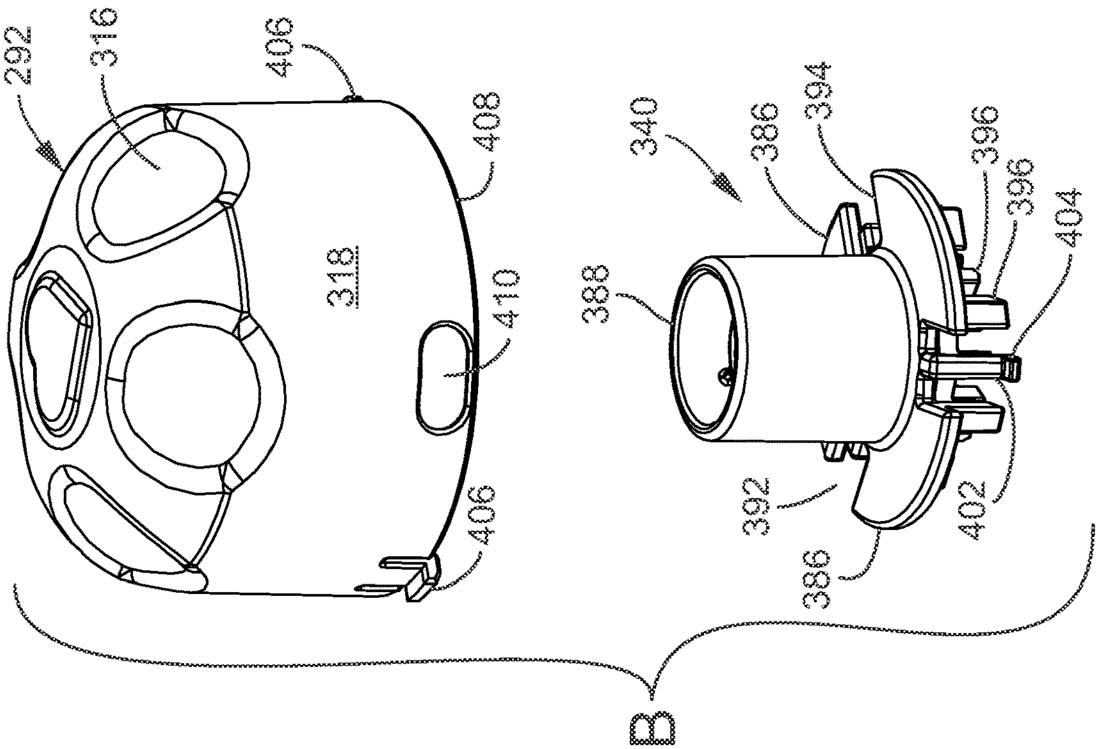
FIG. 21B is a detail view of the rotatable control knob portion and toothed portion of the head of FIG. 19.
Figure 21A:
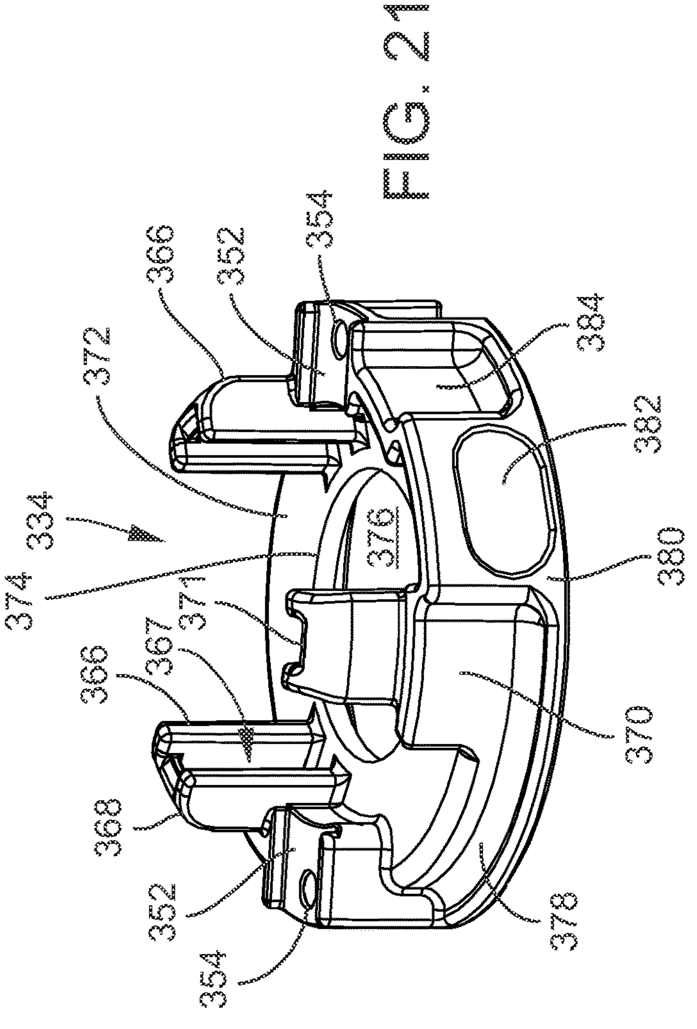
FIG. 21A is a detail view of the multi-purpose portion of the head of FIG. 19.

FIG. 21A shows a perspective isolated view of the multi-purpose structure 334. Multi-purpose structure 334 includes the boss receptors 352 having the pin holes 354. Multi-purpose structure 334 includes a set of three column like vertical guides 366. Guides 366 guide the vertical travel of the toothed structure 340 by the reception therein of feet 404 of prongs 402. Each of the guides 366 has opposing sides and an outwardly side that form a prong receptor 367. A top portion 368 of each of the guides 366 tapers downwardly and outwardly in a curvilinear fashion. Each of the guides 366 includes a lower rearwardly extending portion 370. Columnar guides 366 are integral with multi-purpose structure 334. Each of the vertical guides 366 includes a U-shaped edge 371 in the top portion 368 of the guide 366 that permit the feet 404 to pass during assembly of the head 16 into the receptor 367 of the vertical guide 366.

FIG. 21A further shows that multi-purpose structure 334 includes a floor portion 372 that includes a circular edge 374 that defines an opening 376. Opening 376 receives the cylindrical portion 360 of the upper cap 183 and cylindrical edge 374 is spaced from, adjacent to, and confronts the cylindrical portion 360 to permit the cylindrical portion 360 to rotate when the upper cap 183 and spool portion 18 rotates. Floor portion 372 closes off circular channel or circular ball bearing seat 328 to seal the ball bearings 332 between the upper cap 183 and the multi-purpose structure 334. Floor portion 372 engages the top of sub-base 364 of the upper cap 183 and further engages the top of peripheral lip or periphery 326 of the upper cap 183, as shown in FIG.

25B. FIG. 21A shows that multi-purpose structure 334 includes a peripheral L-shaped portion 378 that engages the outer side of one of the ribs or guides 358 of housing portion 294 and that further engages the floor portion 327 of the housing portion 294. FIG. 21A shows that multi-purpose structure 334 includes a block like peripheral structure 380 that also engages the outer side of the other of the ribs or guides 358 of the housing portion 294 and that further engages the floor portion 327 of the housing portion 294. Block like peripheral structure 380 includes on an outermost portion an oblong or elliptical flat area 382, which flat area is colored, and is preferably colored red to indicate that the head 16 is unlocked, that the flexible barrier 20 may be quickly drawn in automatically, that the user may wish to take care drawing the flexible barrier 20 out and in because doing so builds up tension in the flexible barrier 20. Block like peripheral structure 380 extends further outwardly than rearward portion 370. Multi-purpose structure 334 includes a peripheral indent 384 that is adjacent to block like portion 380 and on the other side of block like portion 380 than rearward extension 370. Indent 384 and rearward extension 370 have outer faces that are coaxial with each other.

FIG. 21B shows an enlarged view of toothed structure 340. Toothed structure 340 includes a set of three ears 386 and a cylindrical portion 388. Ears 386 extend integrally from the cylindrical portion 388. When knob 292 is slidingly pushed down then knob 292 sliding pushes down toothed structure 340, and such that when coil spring 338 pushes up on toothed structure 340 then toothed structure 340 pushes up on the knob 292. Cylindrical portion 388 includes a top peripheral L-shaped portion 389 that engages the underside of the rotatable knob 292. L-shaped portion 389 is shown in FIGS. 25A and 25B. As further shown in FIGS. 25A and 25B, cylindrical portion 388 includes therein a lower cylindrical space 391 and an upper cylindrical space 393, the latter being formed by L-shaped portion 389. Cylindrical portion 388, particularly its L-shaped portion, is slidingly received in a cylindrical seat 395 that is integral with control knob 292. Cylindrical seat 395 depends from the ceiling of control knob 292.

Toothed structure 340 includes a set of three spaces 392, where each of the spaces 392 is formed by opposing edges 394 and a bottom section of the cylinder portion 388. Vertical guides 366 of multi-purpose structure 334 are received in such spaces 392.

FIGS. 21B, 25A, and 25B show that toothed structure 340 includes a set of downwardly extending teeth 396 that engage teeth 330 of the upper cap 183 when spring 338 is compressed by the toothed structure 340. The set of teeth 330 of upper cap 183 is identical to the set of teeth 396 of the toothed structure 340 but the sets of teeth 330, 396 are opposite in orientation since one set extends upwardly and one set extends downwardly. Teeth 396 extend integrally downwardly from a floor portion 398 of the toothed structure 340. Floor portion 398 forms a bottom portion of cylinder portion 388. A tube portion 400 extends downwardly from floor portion 398. The outside diameter of tube portion 400 is slightly less than the inside diameter of tube portion 362 of upper cap 183. Tube portion 400 is slideably vertically engaged in tube portion 362. The upper end of coil spring 338 is compressed by the floor portion 398 of the toothed structure 340. Cylindrical seat 395 engages tube portion 388 and tube portion 400 engages tube portion 362 to provide upper and lower sliding engagements for the toothed structure 340.

FIG. 21B shows that toothed structure 340 includes an L-shaped portion or prong 402 having a foot 404. First, second, and third L-shaped portions 402 equally spaced apart integrally depend from floor portion 398. L-shaped portion or prong 402 begins its journey downwardly at an elevation about equal to the elevation of the ears 386. L-shaped portion or prong 402 then extends downwardly from such elevation to an elevation about the elevation of the lower ends of teeth 396. Foot 404 engages prong receptor 367 of vertical guides 366. Foot 404 travels vertically in prong receptor 367 when the rotatable knob 292 is pushed down manually and when the rotatable knob 292 is pushed up by the coil spring 338. Ears 386 rise to an elevation above the topmost ends of guides 366 when tab 406 is against the upper edge of high window 348 and ears 386 are pushed to such elevation by the spring 338. At such an elevation, toothed structure 340 is unlocked from the teeth 330 of the upper cap 183 such that the flexible barrier 20 may be spooled in or spooled out.

FIG. 21B shows a larger view of the rotatable knob 292 than shown in FIG. 19. Rotatable knob 292 is rotatable on a vertical axis in housing portion 294, namely, within annular interior sidewall 325. Rotatable knob 292 is slideable vertically in housing portion 294, namely, within annular interior sidewall 325. Rotatable knob 292 includes tab 406 extending outwardly from a peripheral circular lower edge 408 of the rotatable knob 292. Rotatable knob 292 includes the cylindrical portion 318. When rotatable knob 292 rotates, toothed structure 340 does not rotate. Toothed structure 340 slides up and down, but is not rotatable and does not rotate. When rotatable knob 292 slides downwardly, toothed structure 340 slides downwardly. When toothed structure 340 slides upwardly under the bias of the coil spring 338, then rotatable knob 292 slides upwardly pushed by spring 338. Rotatable knob 292 includes an indent 410 having an interior flat area that is colored, and that is preferably colored green to indicate that the head 16 is locked and safe and that the flexible barrier 20 is not pullable out of the spool portion 18. The color on indent 410 may be seen through window 308 when the head 16 is locked.

Figure 22A:
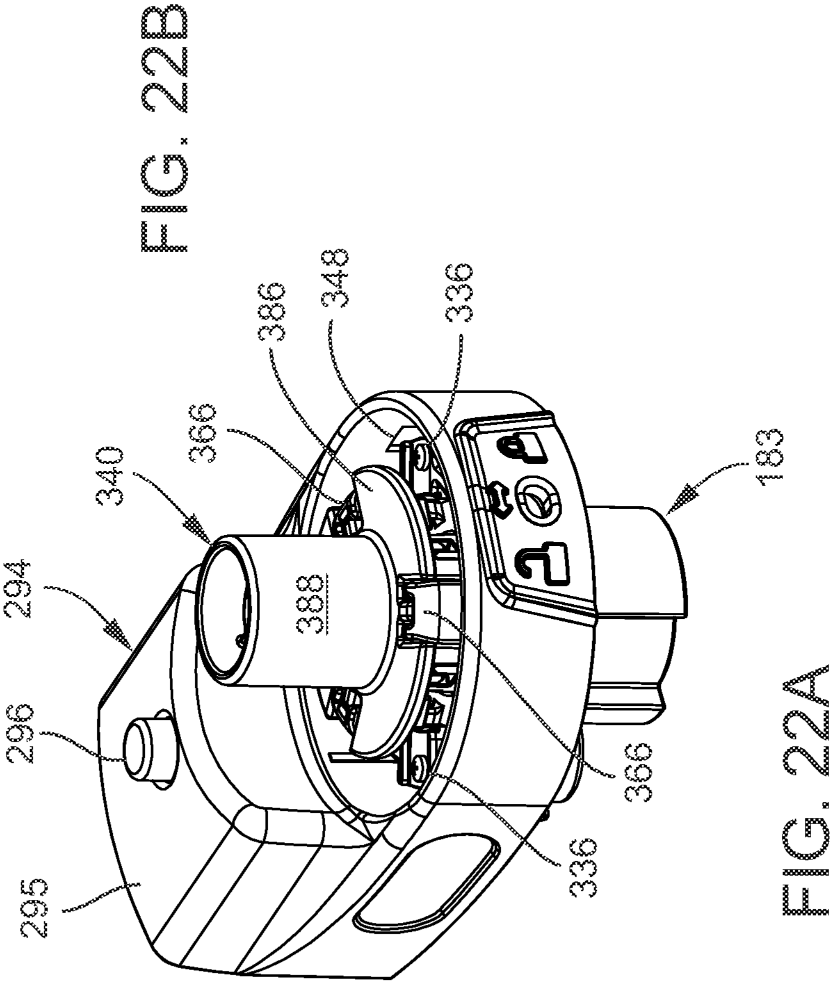
FIG. 22A is a detail view of an assembled portion of the head of FIG. 19.

Tab 406 of the rotatable cap 292 engages first, second, and third windows 344, 346, 348 of interior annular sidewall 325 of housing portion 294 shown in FIG. 20A and further shown in FIGS. 22A and 22B. When tab 406 is in highest window 348 and against the top edge of the highest window 348, the coil spring 338 is pushing the tab 406 against the top edge of highest window 348 and at such position the ears 386 are disposed above the vertical guides 366. Further at such position where the coil spring 338 is pushing the tab 406 against the top edge of the highest window 348, the teeth 396 of the toothed structure 340 are above and free of teeth 330 of the upper cap 183, which teeth 330 and upper cap 183 may rotate freely such that the flexible barrier 20 may be drawn out and spooled in. Still further at such position where the coil spring 338 is pushing the tab 406 against the top edge of the highest window 348, the feet 404 of prongs 402 reside in the prong receiver 367 of the vertical guides 366. Yet further at such position where the coil spring 338 is pushing the tab 406 against the top edge of the highest window 348, the rotatable knob 292 is not rotatable because the width of the tab 406 is about the width or slightly less than the width of the highest window 348. Even further at such position where the coil spring 338 is pushing the tab 406 against the top edge of the highest window 348, the rotatable knob 292 and the toothed structure 340 is pushable downwardly.

When the tab 406 is pushed downwardly in the highest window 348 to the elevation of the lowest window 346, the teeth 396 of the toothed structure 340 engage the teeth 330 of the upper cap 183 such that the teeth 330, 396 are not rotatable relative to each other such that the flexible barrier 20 may not be significantly drawn out or significantly spooled in. Tab 406 is rotatable through the lowest window 346 to the intermediate window 344.

When the tab 406 has been pushed out of the lowest window 346 and into the intermediate window 344, the coil spring 338 automatically pushes the tab 406 against the top edge of the intermediate window 344. In this position where the tab 406 is at the top edge of the intermediate window 344, teeth 330, 396 remain engaged to each other such that the flexible barrier 20 cannot be significantly drawn out or significantly spooled in. In this position, feet 404 of prongs 402 remain in the prong receptors 367 of the vertical guides 366. In this position, the ears 386 remain in spaces between guides 366 and the guides 366 remain in spaces 392 of the toothed structure 340. In this position where the tab 406 is at the top edge of the intermediate window 344, the rotatable knob 292 is not rotatable because the width of the knob tab 406 is about equal to or slightly less than the width of the intermediate window 344. In this position where the tab 406 is at the top edge of the intermediate window 344, the rotatable control knob 292 is pushable or slideably downwardly such that then the rotatable control knob 292 is rotatable and the tab 406 circumferentially rotatable through lowest window 346, such that then the tab 406 exits the lowest window 346 and enters the highest window 348, whereupon the tab 406 is pushable upwardly against the top edge of the highest window 348 by the forces of the coil spring 338, whereupon the ears 386 are above the guides 366, the guides 366 are out of the spaces 392, and teeth 330, 396 are spaced vertically from each other and may rotate freely relative to each other such that the flexible barrier 20 may be drawn out or spooled in.

FIG. 22A shows the head 16 with the rotatable knob 292 removed. FIG. 22A shows the ears 386 between topmost portions of the vertical guides 366, at which position the upper cap 183 and thus metal tube 29 are not rotatable. FIG. 22A shows the highest window 348. FIG. 22A shows the pin connectors 336 that engage the multi-purpose structure 334 to the bosses 350 of the housing portion 294.

FIG. 22B shows the alignment of the toothed structure 340 with the multi-purpose structure 334 with the housing portion 294 and upper cap 183. Feet 404 of prongs 402 of the toothed structure 340 are poised to engage the vertical guides 366 of the multi-purpose structure 334. Boss seats or receptors 352 of the multi-purpose structure 334 are poised to engage the bosses 350 of the housing portion 294. FIG. 22B shows the ball bearings 332 engaged in the ball bearing seat or channel 328. FIG. 22B shows the coil spring 338 engaged on the tubular portion 362 of the upper cap 183. FIG. 22B shows the highest window 348 and the lowest window 346. FIG. 22B shows bosses 350 spaced from and adjacent to the interior annular sidewall 325 of the housing portion 294.

Figure 23A:
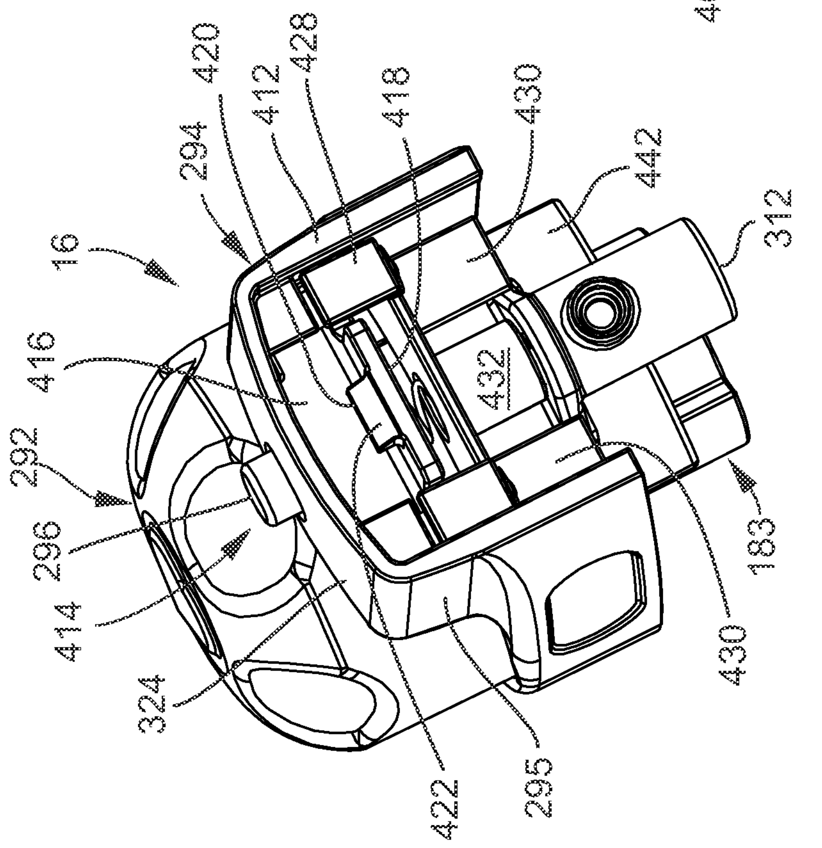
FIG. 23A is a rear perspective view of the head of FIG. 18B.
Figure 23B:
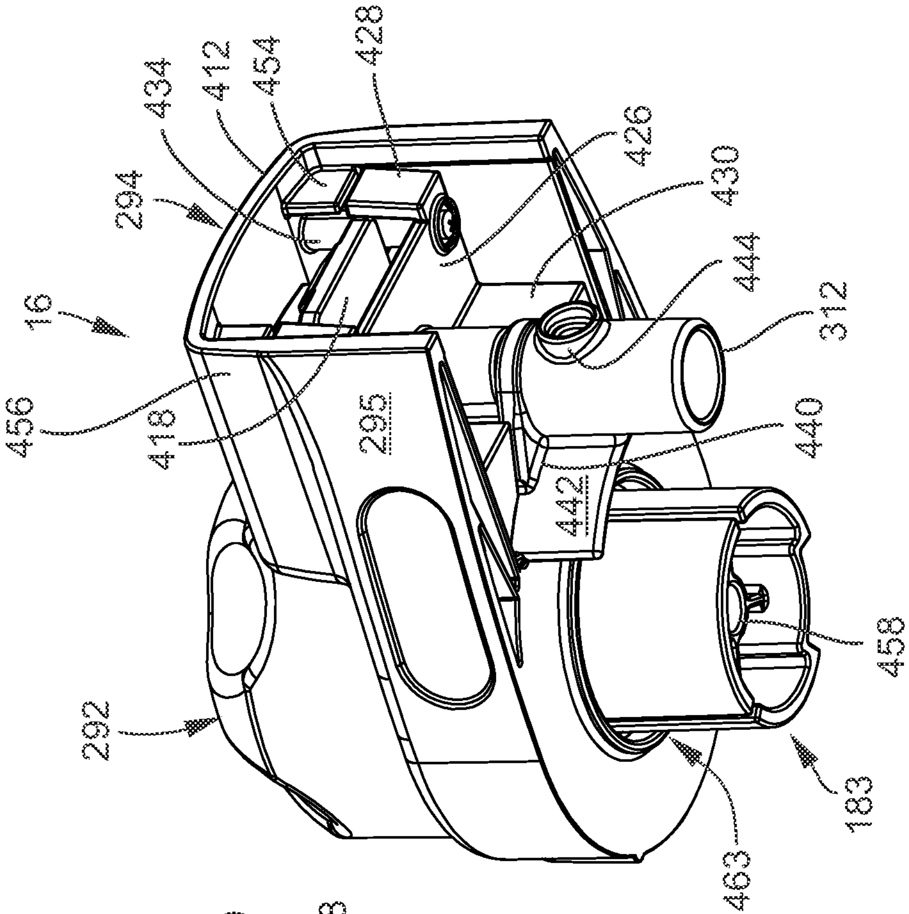
FIG. 23B is a bottom perspective view of the head of FIG. 18B.

FIG. 23A shows a perspective rear view of the head 16 and FIG. 23B shows a perspective side view of the head 16. FIGS. 23A and 23B show the rotatable knob 292, housing portion 294, and upper cap 183. FIGS. 23A and 23B further shows that the housing portion 294 includes a rearmost inverted U-shaped edge 412 for abutting against the front face of upright wall portion 122 of wall mount or quick connect 106. FIGS. 23A and 23B further show a depressible unit 414 having the depressible button 296, which is integral with a block like portion 416, which is disposed underneath ceiling portion 324 of rear housing portion 295 and frontwardly of rearmost U-shaped edge 412. Depressible unit 414 further includes horizontally extending plate portion 418 that extends rearwardly from and is integral with block like portion 416. Plate portion 418 includes an integral catch 420 on a rearward most section of the plate portion 418. Integral catch 420 has a tapered rear face 422 that extends upwardly and forwardly. The front face of integral catch 420 extends vertically or at a right angle to the upper face of plate portion 418.

FIGS. 23A, 23B, 24A, and 24B show a stationary unit 424 opposing the depressible unit 414. Stationary unit 424 includes a plate portion 426, rear upright supports 428 integral with plate portion 426 and extending upwardly from a rear section of the plate portion 426, and front depending supports 430 integral with plate portion 426 and extending downwardly from a front section of the plate portion 426.

Upright supports 428 are plate portions. Each of the depending supports 430 includes a rear side, a bottom side, and an inner side. Stationary unit 424 further includes a tube portion 432 depending from the plate portion 426. Rear housing portion 295 includes vertical bosses 434 that are engaged by pin connectors 436, which pin connectors 436 also engage pin holes 438 so as to engage the stationary unit 424 to the rear housing portion 295 such that plate portion 426 is disposed below, parallel to, and adjacent to plate portion 418. Rear edge of the plate portion 418 is disposed slightly rearwardly of the rear edge of plate portion 426.

Rear housing portion 295 includes tube portion 312. Tube portion 312 is integral with rear housing portion 295 and depends from a U-shaped portion 440. U-shaped portion 440 extends integrally and rearwardly from a vertically extending U-shaped stop 442 that is coaxial with front curved sidewall 298. U-shaped stop 442 is also integrally engaged to a rear portion of the tube portion 312. Tube portion 312 receives the top end of the support tube 88. Tube portion 312 further engages the top end of support tube 88 by a pin connector engaged in boss 444 and passing through pin hole 446 formed in tube portion 312 to engage tube portion 312. Notch 310 of support tube 88 shown in FIG. 18B engages tab 448 shown in FIG. 25A to minimize rotation of support tube 88 and aid in the proper rotary orientation of support tube 88. U-shaped portion 440 closes off the top end of tube portion 312. U-shaped portion 440 also closes off the bottom end of tube portion 432.

Tube portion 432 engages and houses a coil spring 450 as shown in FIGS. 24A, 24B, 25A, and 25B. The bottom end of coil spring 450 engages U-shaped portion 440. The top end of coil spring 450 is received in an indent 452 formed in block like portion 416. Block like portion 416 is a mount for button 296 and is integral with button 296. Coil spring 450 is compressed or pinched between U-shaped portion 440 and block like portion 416 in tube 432. Rear housing portion 295 includes a tab 454 depending from and integral with the ceiling 324. Tab 454 also extends from sidewall 456 and is integral therewith. Tab 454 is disposed inside the rear housing portion 295 at the junction of sidewall 456 and ceiling 324.

FIG. 25A shows that the coil spring 450 normally pushes the depressible unit 414 into the closed position where the catch 422 engages the U-shaped connector 130 of the upper wall connector 106. FIG. 25B shows the button 296 being pushed down to push down the catch 422 such that the head 16 can be removed from the upper wall connector 106. The head 16 can simply be pushed back onto the upper wall connector 106 because the front end of the upper wall connector 130 hits the tapered face 422 of the catch 420, an action that pushes the depressible unit 414 downwardly such that the U-shaped connector 130 slides over the catch 420, whereupon the coil spring 452 automatically snaps the catch 420 upwardly such that the front vertical face of the catch 420 engages the U-shaped connector 130, whereupon the head 16 is locked to the upper wall connector 106.

FIG. 25A shows that the cylindrical portion 388 of the toothed structure 340 engages the cylindrical seat 395 of the underside of the top portion of the rotatable knob 292. Such engagement permits rotatable knob 292 to rotate or slide down relative to toothed structure 340, which slides up and down but which does not rotate. When toothed structure 340 is slid up by the coil spring 338, this action pushes the rotatable knob 292 to also slide upwardly. The cylindrical portion 318 of the rotatable knob 292 is spaced apart from the outer edges of the ears 382 of the toothed structure 340. The green colored area 410 of the cylindrical portion 318 is disposed between the red colored area 382 of the multi-purpose structure 334 and the through window 308 when rotatable knob 292 is slid down and locked such that the green colored area 410 may be viewed by the user, i.e., when the tab 406 is in the intermediate window 344 and when the teeth 330, 396 are engaged. When the rotatable knob 292 is pressed down and rotated to move the tab 406 to the highest window 348 having the highest top edge, the peripheral lower edge 408 of the rotatable knob 292 rises above the through window 308 so as to expose to the user's view the red colored area 382 of the multi-purpose structure 334, i.e., when the tab is in the highest window 348 and the teeth 330, 396 are not engaged and the spool portion 18 may be spooled in or spooled out. This configuration is shown in FIGS. 25A and 25B.

In other words, the green colored area 410 of the rotatable knob 292 closes off the user's view through window 308 of the red colored area 382 of the multi-purpose structure 340. In this configuration, the peripheral lower edge 408 of the rotatable knob 292 is adjacent to the annular floor portion 327 of the housing portion 294, is further adjacent to the inside lower portion of the cylindrical portion 318, and is further adjacent to outermost portions of the multi-purpose structure 334 such as the L-shaped portion 378 and block like portion 380.

Figure 24B:
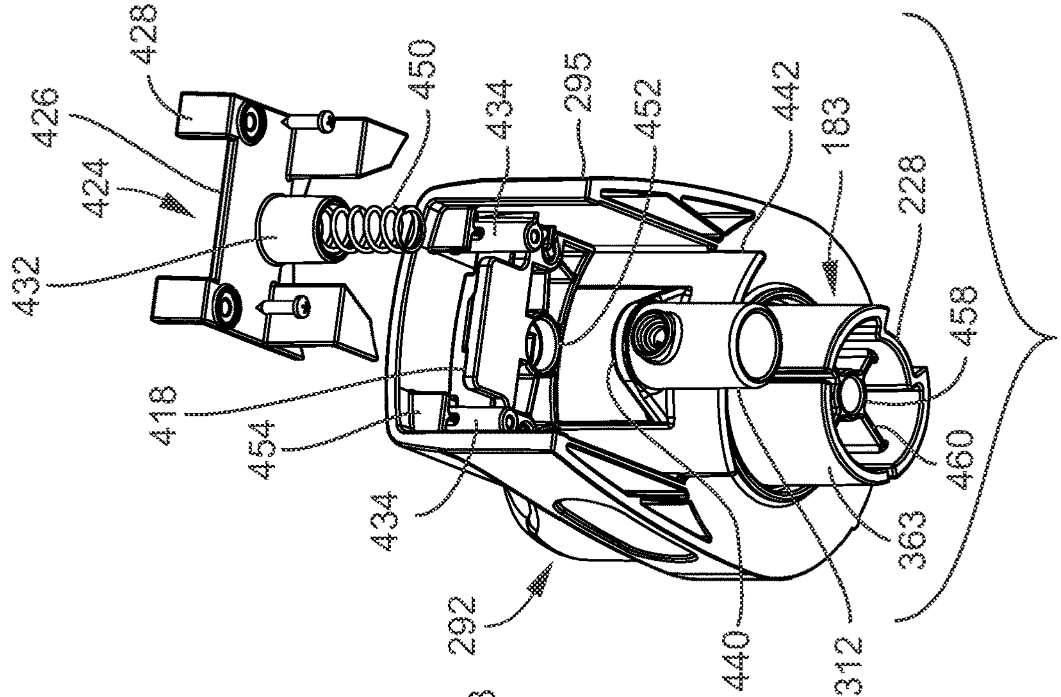
FIG. 24B is a bottom rear perspective exploded view of the head of FIG. 18B.
Figure 24A:
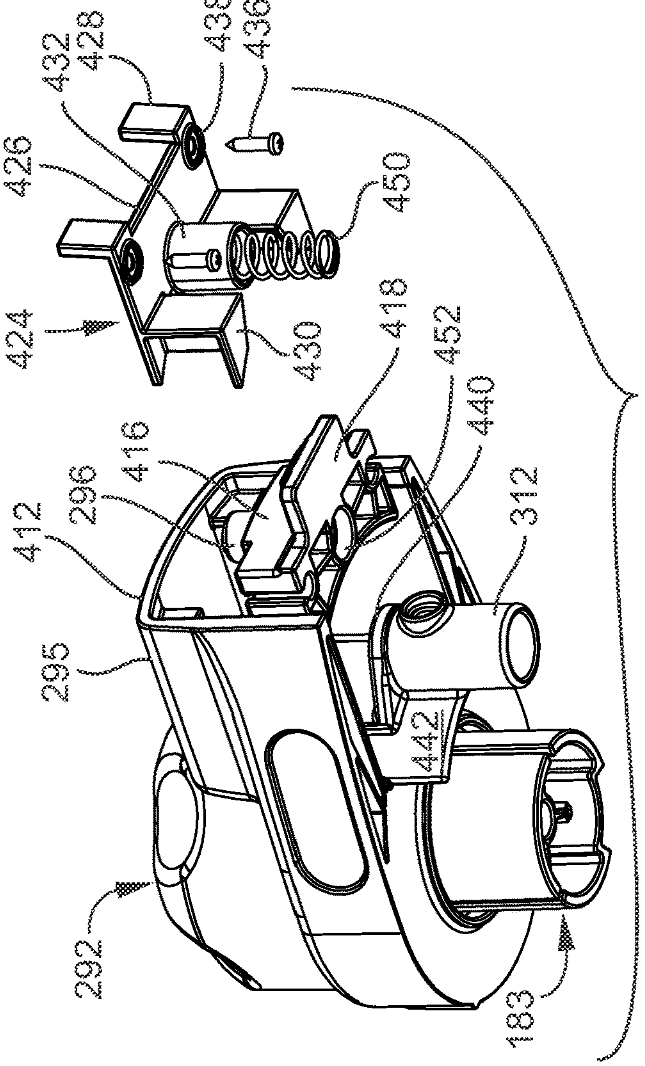
FIG. 24A is a bottom side perspective exploded view of the head of FIG. 18B.

FIGS. 25A and 25B show that the upper cap 183 includes an integral interior tube portion 458. Tube portion 458 is coaxial with and integral with tube portion 362 of an upper section of upper cap 183. Tube portions 458 and 362 are coaxial with tube portion 400 of toothed structure 340. As shown in FIG. 24B, tube portion 458 is anchored in upper cap 183 by radially extending ribs 460 that extend from tube portion 458 to the inner cylindrical surface 361 of cylindrical portion 363 and from tube portion 458 to the inner face of dovetail portion 228 of upper cap 183. Stabilizer 181 also includes like ribs 460 as shown in FIG. 11C and FIG. 17B. Tube portion 458 includes an integral closed top 462, which closed top 462 also serves as the closed bottom for tube portion 362. The upper peripheral edge of metal tube 29 is spaced from and adjacent to annular floor portion 327 of housing portion 294 such that relatively great portions of the cylindrical portion 363 and associated dovetail portion 228 are inserted into metal tube 29. FIG. 23B shows an annular space 463 that receives the upper peripheral edge of metal tube 29. A lower annular edge 461, shown in FIG. 20B, of peripheral lip 326 of upper cap 183 abuts the upper peripheral edge of the metal tube 29. Upper cap 183 and lower cap 182 are rigidly engaged in metal tube 29 such as by gluing or mechanically fixed therein such as with pin connectors.

Figure 26B:
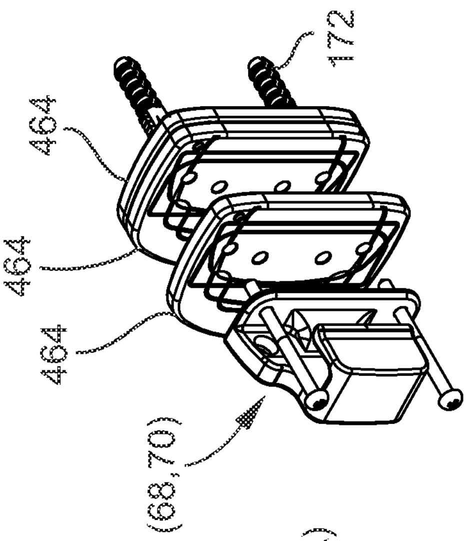
FIG. 26B is a perspective view of the spacer in use with the upper wall mount or quick connect of FIG. 8A.
Figure 26C:
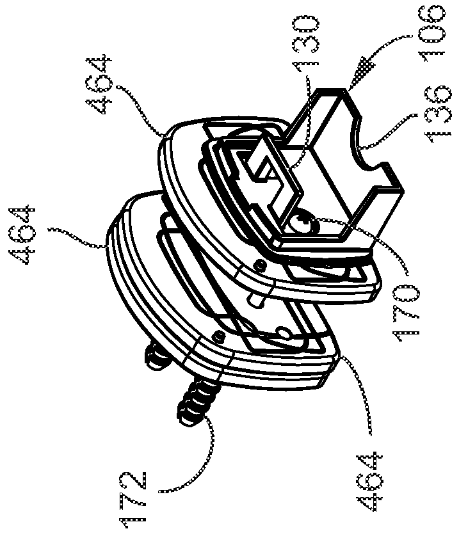
FIG. 26C is a perspective view of the spacer in use with the upper wall mount or quick connect of FIG. 7A.
Figure 26A:
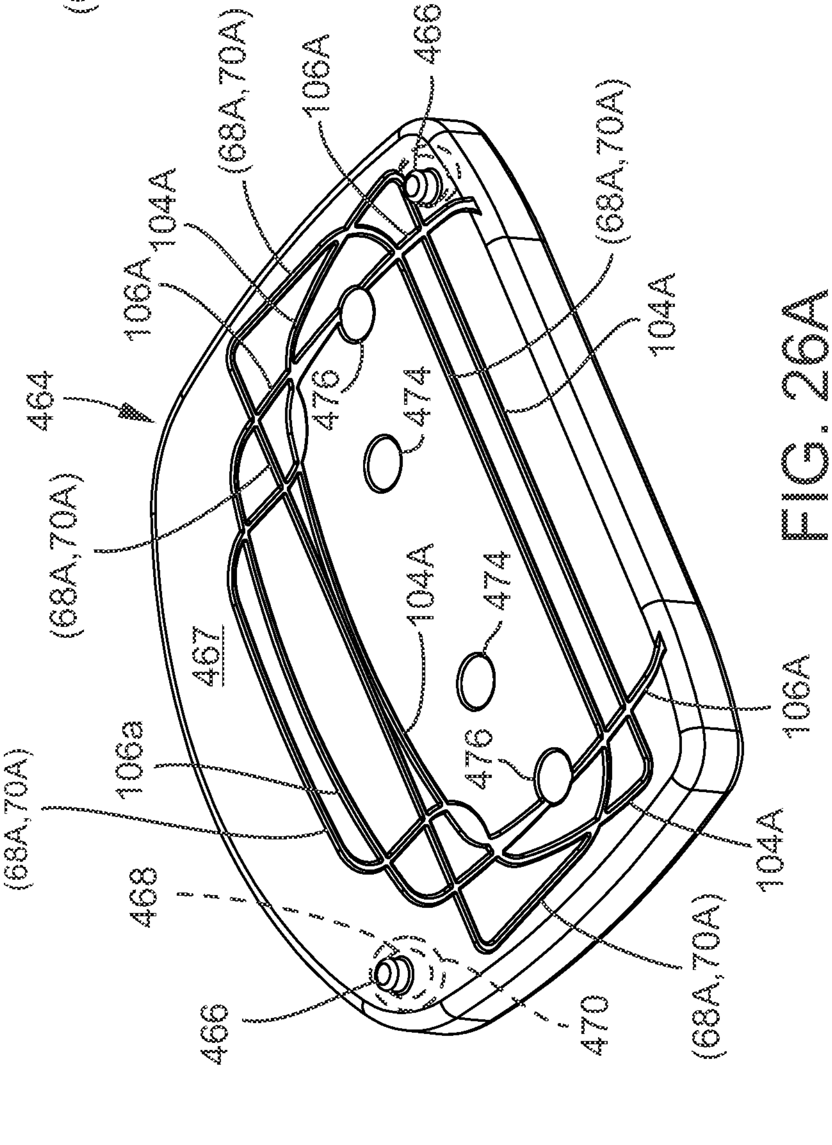
FIG. 26A is a detail front view of a spacer for the upper wall mount or quick connect of FIG. 7A, the lower wall mount or quick connect of FIG. 7B, the upper wall mount or quick connect of FIG. 8A, or the lower wall mount or quick connect of FIG. 8B.

FIG. 26A shows a spacer 464 for the upper wall mount or connector 106 of FIG. 7A, the lower wall mount or connector 104 of FIG. 7B, the upper wall mount or connector 68 of FIG. 8A, or the lower wall mount or connector 70 of FIG. 8B. FIG. 26B shows the spacer 464 in use with the upper wall mount 68 (FIG. 8A) or lower wall mount 70 (FIG. 8B). FIG. 26C shows the spacer 464 in use with the upper wall mount 106 of FIG. 7A. Spacer 464 is intended for use between any of such mounts 106, 104, 68, 70 and the vertical surface, such as a wall, to which such mount 106, 104, 68, or 70 is connected. Spacer 464 is generally a plate portion having some thickness but not a great thickness. Spacer 464 is intended to be used to place upper and lower wall mounts 106, 104 in vertical planes such that the base 12 is disposed vertically, such that the axis of spool portion 18 is disposed vertically, and such that flexible barrier 20 when unfurled or spooled out defines a vertical plane. Spacer 464 is intended to place upper and lower wall mounts 106, 104 or upper and lower wall mounts 68, 70 in a common vertical plane by disposing one or more spacers 464 between the wall and the mounts 68, 70 to account for runners at the junction between the wall and floor.

Spacer 464 includes short projections 466 extending from a front face 467 of spacer 464 and from corner portions of the spacer 464. Each of the projections 466 is engagable in a hole 468 formed by a boss 470, which holes 468 and bosses 470 are formed on a rear face of the spacer 464, which holes 468 and bosses 470 are found in an adjacent spacer 464. The projections 466 and holes 468 minimize adjacent spacers 464 from sliding relative to each other.

Spacers 464 further provide protection to the wall by covering a larger surface area than any of the mounts 106, 104, 68, 70. A periphery 472 of spacer 464 encompasses a greater area than a periphery of any of the mounts 106, 104, 68, 70. In other words, any of the peripheries of mounts 106, 104, 68, 70 fit inside of periphery 472 of spacer 464. Such is shown, except in the case of the periphery 106A for mount 106, for mounts 104, 68, and 70. However, mount 106 as well fits inside periphery 472 of spacer 464.

References numbers 106A, 104A, 68A, 70A in FIG. 25A indicate scores formed in the face 467 that define the peripheries of mounts 106, 104, 68, and 70, respectively. The scores 106A, 104A, 68A, and 70A make it easy for the user to relate or align the pair of through holes 474 or the pair of holes through 476 with the mount 106, 104, 68, or 70 that is being used with the spacer 464. For example, if mount 106 is being used, mount 106 is placed on score 106A and the pin holes of mount 106 align with the pair of holes 474. Or, if mount 68 or 70 is being used, mount 68 or 70 is placed on score 68A, 70A and the pin connector holes in mount 68 or 70 align with the pair of holes 476. If mount 104 is being used, mount 104 is placed on score 104A and the pin holes of mount 104 align with the pair of holes 474. Score 68A, 70A is endless and includes two right angle corners with a small radius and two curved corners and four straight lines. Score 106A is not endless and includes three curved lines and two corners. Score 104A is endless and includes three curved lines and one straight line. It should be noted that there are two scores for wall connectors 68, 70 where one score is used when pin holes 110, 112 are used, and where the other score is used when pin holes 118, 120 are used.

In operation, wall connectors or wall mounts 106, 104, 68, 70 are engaged to vertical surfaces such as walls such that mounts 106, 104 are disposed in a common vertical plane and such that mounts 68, 70 are disposed in a common vertical plane. Then the foot 14 is engaged with lower wall mount 104 by sliding plate portion 256 of the foot 14 into the catch 152 of the lower wall mount 104. Then the head 16 is pushed onto upper wall mount 106 such that U-shaped connector 130 engages catch 420 and such that circular edge

136 engages U-shaped portion 440 that is the top of tube portion 312 that in turn engages support tube 88. Such foot and head connections may be referred to as quick connects. Each is quickly engagable and disengageable. Such head connection is quickly disengageable by pushing button 296 to depress catch 420 whereupon the head 16 may be withdrawn from upper wall mount 106. Such foot connection is quickly disengageable by lifting plate portion 256 out of the catch 152 of lower wall mount 104. Except for their respective rear walls 122 and 148, upper and lower wall mounts 106 and 104 are substantially entirely received in an inner portion of the respective head 16 or foot 14 so as to minimize the collection of dirt, dust, and moisture in the respective head 16 or foot 14.

Then, in operation, flexible barrier 20 is drawn out of the spool portion 18 by first unlocking the head 16. This is done by pushing the rotatable knob 292 down to push its tab 406, shown in FIG. 21B, from the top edge of intermediate window 344, shown in FIG. 20A, to the bottom edge of intermediate window 344. Then the rotatable knob 292 is rotated in the clockwise direction to rotate the tab 406 through the lower window 346, shown in FIG. 20A, and into the higher window 348, also shown in FIG. 20A, whereupon the rotatable knob 292 is pushed from the lower edge of higher window 348 to the top edge of higher window 348 by the coil spring 338 pushing on the toothed structure 340 that in turn pushes upwardly on the rotatable knob 292, whereupon the toothed structure 340 having teeth 396 is disengaged from upper cap 183 having teeth 330 such that upper cap 183 and metal tube 19 may rotate freely of the head 16. It should be noted that lower and higher windows 346, 348 are also shown in FIG. 22B. It should be noted that, when tab 406 is in intermediate window 344, the color green appears in window 308 to, for example, let the user know that the flexible barrier 20 is locked. It should be noted that, when tab 406 is in the higher window 348, the color red appears in window 308 to, for example, let the user know that the flexible barrier 20 may be pulled out or, more importantly, is spring loaded and may be spooled in. Then, in operation, handle 44 may be grasped and the flexible barrier 20 pulled out of the spool portion 18. As the handle 44 is pulled, the proximal edge 28 of the flexible barrier 20 pulls on the metal tube 29. The proximal edge 28 is engaged in the receptor 33 of the metal tube 29. Then, as the metal tube 29 starts to rotate, the lower end of the metal tube 29 starts to rotate. As the lower end of the metal tube 29 starts to rotate, the lower cap 182 starts to rotate. As the lower cap 182 starts to rotate relative to and on normally stationary wind up portion 184, the threaded receptor 218 starts to rotate, an action that starts a twisting of the coil spring 176. As the coil spring 176 starts to twist, pressure is placed on the upper end of the coil spring 176 to twist. However, the upper coil spring end 290 is held against such twisting by the upper coil spring end 290 being engaged in slot 232 of the upper end of support tube 178 because support tube 178 is held in place against rotation by pin 238 that engages both the lower end of support tube 178 and tube portion 198 of wind up portion 184, which is held in place against rotation by pin connectors 250 engaging the wind up portion 184 to the foot 14. Thus, as the flexible barrier 20 is further drawn out, the metal tube 29 further rotates, and more pressure builds up in coil spring 176. Then, when flexible barrier 20 reaches the desired length, upper and lower barrier handles 48, 50 are engaged by upper and lower wall mounts 68, 70 by the user holding just the handle 44, whereupon the flexible barrier 20 slightly retracts automatically until the handles 48, 50 move rearwardly from opening 78 to end 74. At this point in time, and when the flexible barrier 20 is so spooled out and the rotatable control knob 292 is unlocked, the color red is shown through window 308. Thus, a residential passageway is closed by the flexible barrier 20.

In operation, in the extended form where the flexible barrier 20 closes the residential passageway and where the handles 48, 50 are engaged to the wall connectors 68, 70, the flexible barrier 20 may be locked against retraction by pushing down on the rotatable knob 292 such that teeth 330, 396 mesh and lock, turning the rotatable knob 292 to move tab 406 from higher window 348 to lower window 346 to intermediate window 344 with teeth 330 and 396 remaining meshed and locked during this rotation since the control knob 292 pivots relative to the toothed structure 340 and multi-purpose structure 334, with the rotatable upper cap 183 at this time also being stationary. Then the user lets up on the rotatable knob 292 when the tab 406 hits the far upper edge of intermediate window 344 to stop such rotation such that, with such step of letting up, the tab 406 is pushed up by coil spring 338 to the top edge of intermediate window 344, which action does not disturb the locked and meshed engagement of teeth 330 and 396, which remain meshed and locked. However, this locking step when handles 48, 50 are engaged to wall connectors 68, 70, is not necessary and is merely a matter of preference of the user.

In operation, to open up the residential passageway, the handles 48, 50 are removed from upper and lower wall mounts 68, 70 by, for example, the user holding handle 44. Then the user keeps holding handle 44 and allows tension in coil spring 176 to slowly draw in the flexible barrier 20 automatically if the rotatable knob 292 is in the unlocked position where the color red is shown through window 308. Since the bias in the coil spring 176 is to an untensioned state that strives to have pressure relieved, the coil spring 176 automatically starts to untwist such that the threaded receptor 218 starts to rotate in the untwisting direction, such that lower cap 182 starts to rotate to in turn start the rotation of metal tube 29 to in turn rotate receptor 33 to in turn draw in proximal edge 28 of the flexible barrier 20 to in turn draw in and spool in the flexible barrier 20. Then, the flexible barrier 20 comes to a stop by the upper handle 68 abutting the vertical edge of U-shaped stop 442 of head 16 and by the lower handle 70 abutting an end of sidewall 284 of foot 14. At this point in time, and when the flexible barrier 20 is so spooled in, the color red is shown through window 308. Then, the rotatable knob 292 is depressed and rotated counter-clockwise to make the color green show through window 308, whereupon the coil spring 338 pushes the tab 406 to the top of intermediate window 344, whereupon the rotatable knob 292 is locked in intermediate window 344 and locked against rotation. It should be noted that when the rotatable knob 292 is depressed teeth 330 and 396 engage each other to prevent rotation. It should be noted that, when coil spring 338 pushes the toothed structure 340 upwardly to push up the ceiling of the knob 292 to push up the tab 406 of knob 292, the tab 406 is pushed against the top edge of intermediate window 344. At this position the teeth 330, 396 are still engaged so as to prevent rotation of the teeth 330, which in turn prevents rotation of the upper cap 183, which in turn prevents rotation of the metal tube 29 and drawing in or drawing out of the flexible barrier 20.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A manually pullable out and automatically retractable flexible barrier apparatus for engagement between first and second surfaces, comprising:

a) a base having a foot portion, a head portion, and a spool portion, the base being engagable to the first surface;

b) a flexible barrier having proximal and distal ends, the proximal end of the flexible barrier being engaged to the spool portion and the distal end being engagable to the second surface;

c) the flexible barrier having a retracted form and an extended form, the flexible barrier in the retracted form being rolled up about the spool portion, the flexible barrier in the extended form being engaged to the second surface and defining a plane;

d) the spool portion having upper and lower caps, the upper cap being rotatable with the spool portion and engaging the head portion, the lower cap being rotatable with the spool portion and engaging the foot portion;

e) a first nonrotatable support member, the first nonrotatable support member being in the spool portion and engaging the foot portion, the first nonrotatable support member having an upper end portion and a lower end portion;

f) a coil spring wound about the first nonrotatable support member and being fixedly engaged to the upper end portion of the first nonrotatable support member and fixedly engaged to the lower cap of the spool portion;

g) such that when the flexible barrier is drawn out from the retracted form the lower cap rotates to twist the coil spring and build up pressure in the coil spring prior to when the distal end of the flexible barrier is engaged to the second surface;

h) such that when the flexible barrier is disengaged from the second surface the coil spring automatically retracts the flexible barrier into the retracted form where the flexible barrier is rolled up about the spool portion;

i) wherein the head portion includes a rotatable knob;

j) wherein the rotatable knob includes first, second, third, and fourth positions, the rotatable knob being axially slidable from the first position to the second position, the rotatable knob being rotatable from the second position to the third position, the rotatable knob being axially slideable from the third position to the fourth position;

k) wherein the flexible barrier is drawable in and drawable out when the rotatable knob is in the first position; and l) wherein the flexible barrier is locked when the rotatable knob is in the second, third, and fourth positions.

2. The manually pullable out and automatically retractable flexible barrier apparatus of claim 1, wherein the upper cap is lockable to the head portion such that the flexible barrier is locked against being drawn out from the retracted form to the extended form.

3. The manually pullable out and automatically retractable flexible barrier apparatus of claim 1, wherein the upper cap is lockable to the head portion such that the flexible barrier is locked against being drawn in from the extended form to the retracted form.

4. The manually pullable out and automatically retractable flexible barrier apparatus of claim 1, wherein the spool portion includes a tube, at least a portion of the upper cap being engaged in an upper portion of the tube, and at least a portion of the lower cap being engaged in a lower portion of the tube, the upper and lower caps being fixedly engaged in the tube such that when the tube rotates the upper and lower caps rotate and such that when the upper and lower caps rotate the tube rotates.

5. The manually pullable out and automatically retractable flexible barrier apparatus of claim 1:

a) wherein the spool portion includes an axially extending slot extending from a top portion of spool portion to a bottom end of the spool portion;

b) wherein the flexible barrier includes a proximal end and a distal end, the proximal end being engaged in the axially extending slot; and c) the axially extending slot being defined by first and second axially extending integral edge portions adjacent to the axially extending slot; and d) a byway support extending from the first axially extending integral edge portion to the second axially extending integral edge portion, the byway support being in the spool portion, the byway support extending inwardly into the spool portion from the first axially extending integral edge portion, the byway support extending inwardly into the spool portion from the second axially extending integral edge portion.

6. The manually pullable out and automatically retractable flexible barrier apparatus of claim 1, and further comprising a second nonrotatable support member, the second nonrotatable support member being outside of and spaced from the spool portion and first nonrotatable first support member, the second nonrotatable support member being parallel to the first nonrotatable support member, and the second nonrotatable support member extending from the foot portion to the head portion.

7. The manually pullable out and automatically retractable flexible barrier apparatus of claim 1, wherein the flexible barrier includes a distal end portion, the distal end portion being engagable to the second surface, the distal end portion including a rigid support extending from an upper edge of the flexible barrier to a lower edge of the flexible barrier, the flexible barrier including a hand opening at a location immediately adjacent to the rigid support such that one hand of a user can hold the rigid support at the location and draw the flexible barrier out of the spool portion, such that the rigid support exerts pressure up and down the distal end portion to and between the upper and lower edges of the flexible barrier when the flexible barrier is drawn out of the spool portion by said one hand.

8. The manually pullable out and automatically retractable flexible barrier apparatus of claim 1, wherein when in the retracted form the flexible barrier is lockable from being drawn out, and wherein when in the extended form when engaged to the second surface the flexible barrier is lockable from being drawn out further or from being retracted in to the retracted form.

9. The manually pullable out and automatically retractable flexible barrier apparatus of claim 1, and further including a wind up piece, the wind up piece being removably engaged to the foot portion, the wind up piece being fixedly engaged to a lower end portion of the first nonrotatable support member such that, when the wind up piece is disengaged from the foot portion and the lower cap is held stationary, the wind up piece may be rotated to rotate an upper end portion of the first nonrotatable support member to in turn rotate an upper end portion of the coil spring to in turn twist the coil spring to a greater or lesser degree of tension, with the wind up piece then being engaged back on the foot portion to fix the coil spring at said greater or lesser degree of tension.

10. The manually pullable out and automatically retractable flexible barrier apparatus of claim 1, and further comprising first, second, third, and fourth wall mounts and respective first, second, third, and fourth connections, the first connection being engaged to the foot portion and engaging the foot portion to the first wall mount, the second connection being engaged to the head portion and engaging the head portion to the second wall mount, the third connection being engaged to a distal upper end portion of the flexible barrier and engaging the distal upper end portion of the flexible barrier to the third wall mount, and the fourth connection being engaged to a distal lower end portion of the flexible barrier and engaging the distal lower end portion of the flexible barrier to the fourth wall mount.

11. The manually pullable out and automatically retractable flexible barrier apparatus of claim 1, wherein the head portion includes a sidewall and a window in the sidewall, a first part being viewable through the window when the flexible barrier may be drawable in or drawable out, a second part being viewable through the window when the flexible barrier is locked against being drawn in or drawn out.

12. The manually pullable out and automatically retractable flexible barrier apparatus of claim 11, wherein the second part is viewable through the window after the second part has been pushed downwardly and rotated relative to the first part, the second part being rotated between the window and the first part.

13. The manually pullable out and automatically retractable flexible barrier apparatus of claim 1:

a) wherein the first nonrotatable support member includes a lower end portion engaging the foot portion;

b) wherein the first nonrotatable support member includes an upper end portion spaced from the upper cap of the spool portion;

c) wherein the upper cap of the spool portion rotatably engages a first piece that in turn rigidly engages the head portion such that the spool portion supports the head relative to the foot portion; and d) wherein the upper end portion of the first nonrotatable support member is engaged by a stabilizer that in turn engages an inner cylindrical surface of the spool portion.

14. A manually pullable out and automatically retractable flexible barrier apparatus for engagement between first and second surfaces, comprising:

a) a base having a foot portion, a head portion, and a spool portion, the base being engagable to the first surface;

b) a flexible barrier having proximal and distal ends, the proximal end of the flexible barrier being engaged to the spool portion and the distal end being engagable to the second surface;

c) the flexible barrier having a retracted form and an extended form, the flexible barrier in the retracted form being rolled up about the spool portion, the flexible barrier in the extended form being engaged to the second surface and defining a plane;

d) the spool portion having upper and lower caps, the upper cap being rotatable with the spool portion and engaging the head portion, the lower cap being rotatable with the spool portion and engaging the foot portion;

e) a first nonrotatable support member, the first nonrotatable support member being in the spool portion and engaging the foot portion, the first nonrotatable support member having an upper end portion and a lower end portion;

f) a coil spring wound about the first nonrotatable support member and being fixedly engaged to the upper end portion of the first nonrotatable support member and fixedly engaged to the lower cap of the spool portion;

g) such that when the flexible barrier is drawn out from the retracted form the lower cap rotates to twist the coil spring and build up pressure in the coil spring prior to when the distal end of the flexible barrier is engaged to the second surface;

h) such that when the flexible barrier is disengaged from the second surface the coil spring automatically retracts the flexible barrier into the retracted form where the flexible barrier is rolled up about the spool portion;

i) wherein the head portion includes a rotatable knob;

j) wherein the rotatable knob includes first, second, third, and fourth positions, the rotatable knob being axially slidable from the first position to the second position, the rotatable knob being rotatable from the second position to the third position, the rotatable knob being axially slideable from the third position to the fourth position;

k) wherein the rotatable knob is engaged to a first set of teeth that slide axially with the rotatable knob;

l) wherein the upper cap includes a second set of teeth; and m) wherein the first and second sets of teeth include a disengagement state where 360 degree rotation of the second set of teeth is permitted to permit the flexible barrier to be drawn in to or out from the spool portion, the first and second sets of teeth being in the disengagement state when the rotatable knob is in the first position.

15. A manually pullable out and automatically retractable flexible barrier apparatus for engagement between first and second surfaces, comprising:

a) a base having a foot portion, a head portion, and a spool portion, the base being engagable to the first surface;

b) a flexible barrier having proximal and distal ends, the proximal end of the flexible barrier being engaged to the spool portion and the distal end being engagable to the second surface;

c) the flexible barrier having a retracted form and an extended form, the flexible barrier in the retracted form being rolled up about the spool portion, the flexible barrier in the extended form being engaged to the second surface and defining a plane;

d) the spool portion having upper and lower caps, the upper cap being rotatable with the spool portion and engaging the head portion, the lower cap being rotatable with the spool portion and engaging the foot portion;

e) a first nonrotatable support member, the first nonrotatable support member being in the spool portion and engaging the foot portion, the first nonrotatable support member having an upper end portion and a lower end portion;

f) a coil spring wound about the first nonrotatable support member and being fixedly engaged to the upper end portion of the first nonrotatable support member and fixedly engaged to the lower cap of the spool portion;

g) such that when the flexible barrier is drawn out from the retracted form the lower cap rotates to twist the coil spring and build up pressure in the coil spring prior to when the distal end of the flexible barrier is engaged to the second surface;

h) such that when the flexible barrier is disengaged from the second surface the coil spring automatically retracts the flexible barrier into the retracted form where the flexible barrier is rolled up about the spool portion; and i) wherein the head portion includes:

i) a rotatable and axially slideable knob and a toothed piece engaged inwardly of and to the rotatable and axially slideable knob, the toothed piece including teeth that engages teeth of the upper cap to lock and unlock rotation of the spool portion, the toothed piece including at least one prong having at least one foot portion; and ii) a structure nonrotatably fixed in the head portion, the structure having a retainer that receives the foot portion of the prong, the retainer guiding up and down movement of the foot portion, toothed piece, and rotatable and axially slideable knob.

* * * * *